United States Patent
Kruh et al.

(10) Patent No.: US 10,390,234 B2
(45) Date of Patent: *Aug. 20, 2019

(54) IMPLEMENTING A LIVE DISTRIBUTED ANTENNA SYSTEM (DAS) CONFIGURATION FROM A VIRTUAL DAS DESIGN USING AN ORIGINAL EQUIPMENT MANUFACTURER (OEM) SPECIFIC SOFTWARE SYSTEM IN A DAS

(71) Applicant: Corning Optical Communications Wireless Ltd, Airport (IL)

(72) Inventors: Lior Michael Kruh, Kfar Saba (IL); Bryan Ray Roark, New Bern, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/984,521

(22) Filed: May 21, 2018

(65) Prior Publication Data

US 2018/0279132 A1    Sep. 27, 2018

Related U.S. Application Data

(63) Continuation of application No. 15/332,603, filed on Oct. 24, 2016, now Pat. No. 9,794,795.

(Continued)

(51) Int. Cl.
   *H04W 16/24*   (2009.01)
   *H04W 16/18*   (2009.01)
   (Continued)

(52) U.S. Cl.
   CPC ........... *H04W 16/18* (2013.01); *H04W 16/24* (2013.01); *H04W 24/02* (2013.01); *H04W 88/085* (2013.01)

(58) Field of Classification Search
   CPC ..... H04W 16/14; H04W 16/18; H04W 16/24; H04W 16/10; H04W 16/26; H04W 16/28;
   (Continued)

(56) References Cited

U.S. PATENT DOCUMENTS 7,035,594 B2  4/2006  Wallace et al.
7,224,170 B2  5/2007  Graham et al.
(Continued)

FOREIGN PATENT DOCUMENTS

EP    2224782 A1    9/2010

OTHER PUBLICATIONS

International Search Report of the Internaitonal Searching Authority; PCT/IL2017/050474; dated Sep. 12, 2017; 9 Pages; European Patent Office.

*Primary Examiner* — Jean A Gelin
(74) *Attorney, Agent, or Firm* — C. Keith Montgomery

(57) ABSTRACT

Implementing a live wireless communication system configuration from a virtual wireless communication system design using an original equipment manufacturer (OEM) specific software system in a real wireless communication system is disclosed herein. In exemplary aspects disclosed herein, the OEM specific software system enables a designer to create, save, import, modify and/or preconfigure a virtual wireless communication system in a virtual wireless communication system configuration file(s) using OEM specific software tools resident in the real wireless communication system. The OEM specific software tools could include functionality such as the ability to incorporate and enforce OEM design constraints of the real wireless communication system. The configuration file(s) can then be subsequently implemented to modify and/or configure live equipment of a real wireless communication system.

18 Claims, 40 Drawing Sheets

Related U.S. Application Data

(60) Provisional application No. 62/329,592, filed on Apr. 29, 2016.

(51) Int. Cl.
  *H04W 24/02* (2009.01)
  *H04W 88/08* (2009.01)

(58) Field of Classification Search
  CPC ........... H04W 72/0406; H04W 72/042; H04W 52/143; H04W 52/346; H04W 88/085
  USPC ............ 455/403, 412.1, 418, 419, 420, 447, 455/550.1, 561, 562.1
  See application file for complete search history.

(56) References Cited

U.S. PATENT DOCUMENTS

| | | |
|---|---|---|
| 7,324,837 B2 | 1/2008 | Yamakita |
| 7,385,384 B2 | 6/2008 | Rocher |
| 7,627,250 B2 | 12/2009 | George et al. |
| 7,848,770 B2 | 12/2010 | Scheinert |
| 2007/0286599 A1 | 12/2007 | Sauer et al. |
| 2008/0026765 A1 | 1/2008 | Charbonneau |
| 2008/0166094 A1 | 7/2008 | Bookbinder et al. |
| 2009/0169163 A1 | 7/2009 | Abbott, III et al. |
| 2010/0018895 A1 | 1/2010 | Gorbaty et al. |
| 2010/0265848 A1 | 10/2010 | Kummetz et al. |
| 2011/0223878 A1 | 9/2011 | Lin et al. |
| 2011/0268446 A1 | 11/2011 | Cune et al. |
| 2012/0004014 A1 | 1/2012 | Ding et al. |
| 2012/0127878 A1 | 5/2012 | Kim et al. |
| 2013/0077580 A1 | 3/2013 | Kang et al. |
| 2013/0114486 A1 | 5/2013 | Spedaliere et al. |
| 2013/0128810 A1 | 5/2013 | Lee et al. |
| 2013/0128832 A1 | 5/2013 | Kang et al. |
| 2014/0010168 A1 | 1/2014 | Stapleton et al. |
| 2014/0016583 A1 | 1/2014 | Smith |
| 2014/0370884 A1 | 12/2014 | Kummetz et al. |
| 2015/0019979 A1 | 1/2015 | Alden et al. |
| 2015/0365502 A1 | 12/2015 | Uyehara et al. |
| 2016/0007205 A1 | 1/2016 | Hasarchi et al. |
| 2016/0022678 A1 | 1/2016 | Clozel |
| 2016/0127101 A1 | 5/2016 | Hanson et al. |
| 2016/0226784 A1 | 8/2016 | Stapleton et al. |
| 2016/0302172 A1 | 10/2016 | Phan et al. |
| 2016/0337050 A1 | 11/2016 | Melester et al. |
| 2016/0352612 A1 | 12/2016 | Daniel |
| 2017/0142699 A1 | 5/2017 | Kang et al. |

IMPLEMENTING A LIVE DISTRIBUTED ANTENNA SYSTEM (DAS) CONFIGURATION FROM A VIRTUAL DAS DESIGN USING AN ORIGINAL EQUIPMENT MANUFACTURER (OEM) SPECIFIC SOFTWARE SYSTEM IN A DAS

PRIORITY APPLICATION

This application is a continuation of U.S. application Ser. No. 15/332,603, filed Oct. 24, 2016, which claims the benefit of priority under 35 U.S.C. § 119 of U.S. Provisional Application No. 62/329,592, filed on Apr. 29, 2016, the contents of which are relied upon and incorporated herein by reference in their entireties.

BACKGROUND

The disclosure relates to implementing distributed antenna systems (DAS), and more particularly to implementing a live DAS configuration from a virtual DAS design using an original equipment manufacturer (OEM) specific software system in a DAS.

Wireless customers are increasingly demanding wireless communications services, such as cellular communications services and Wi-Fi services. Thus, small cells, and more recently Wi-Fi services, are being deployed indoors. At the same time, some wireless customers use their wireless communication devices in areas that are poorly serviced by conventional cellular networks, such as inside certain buildings or areas where there is little cellular coverage. One response to the intersection of these two concerns has been the use of distributed antenna systems (DASs). A DAS usually includes a head-end unit (HEU) connected to remote equipment (e.g., remote access units (RAU), remote hub units (RHU), etc.) thereby creating antenna coverage areas for establishing communications with wireless client devices located therein. In particular, the RAUs are configured to receive and transmit communications signals to client devices within the antenna range of the RAUs. DASs can be particularly useful when deployed inside buildings or other indoor environments where the wireless communication devices may not otherwise be able to effectively receive radio frequency (RF) signals from a source.

In this regard, FIG. 1 illustrates a wireless distributed communications system (WDCS) 100 that is configured to distribute communications services to remote coverage areas 102(1)-102(N), where 'N' is the number of remote coverage areas. The WDCS 100 in FIG. 1 is provided in the form of a DAS 104. The DAS 104 can be configured to support a variety of communications services that can include cellular communications services, wireless communications services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 102(1)-102(N) are created by and centered on RAUs 106(1)-106(N) connected to a centralized equipment 108 (e.g., a head-end controller, a central unit, or a head-end unit). The centralized equipment 108 may be communicatively coupled to a source transceiver 110, such as for example, a base transceiver station (BTS) or a baseband unit (BBU). In this regard, the centralized equipment 108 receives downlink communications signals 112D from the source transceiver 110 to be distributed to the RAUs 106(1)-106(N). The downlink communications signals 112D can include data communications signals and/or communication signaling signals, as examples. The centralized equipment 108 is configured with filtering circuits and/or other signal processing circuits that are configured to support a specific number of communications services in a particular frequency bandwidth (i.e., frequency communications bands). The downlink communications signals 112D are communicated by the centralized equipment 108 over a communications link 114 (e.g., one or more communication links) over their frequency to the RAUs 106(1)-106(N).

With continuing reference to FIG. 1, the RAUs 106(1)-106(N) are configured to receive the downlink communications signals 112D from the centralized equipment 108 over a communications link 114. The downlink communications signals 112D are configured to be distributed to the respective remote coverage areas 102(1)-102(N) of the RAUs 106(1)-106(N). The RAUs 106(1)-106(N) are also configured with filters and other signal processing circuits that are configured to support all or a subset of the specific communications services (i.e., frequency communications bands) supported by the centralized equipment 108. In a non-limiting example, the communications link 114 may be a wired communications link, a wireless communications link, or an optical fiber-based communications link. Each of the RAUs 106(1)-106(N) may include an RF transmitter/receiver (not shown) and a respective antenna 116(1)-116(N) operably connected to the RF transmitter/receiver to wirelessly distribute the communications services to user equipment (UE) 118 within the respective remote coverage areas 102(1)-102(N). The RAUs 106(1)-106(N) are also configured to receive uplink communications signals 112U from the UE 118 in the respective remote coverage areas 102(1)-102(N) to be distributed to the source transceiver 110.

Designers of DAS systems use third party software to create RF designs that provide recommended configurations for placement and settings of remote equipment (e.g., RAUs or RHUs). These RF designs are used by installers to perform initial installations of equipment for a DAS. This remote equipment include remote units, including remote access units that contains electronics (e.g., fiber transceivers, filters, power amplifiers, built in antenna(s) or port(s)) to connect the remote equipment to external antenna(s) that propagate RF signals. Among other things, the RF designs provide predicted output power per Wireless Operator (e.g., Wireless Carrier), and predicted individual channel powers for various Wireless Operator protocols or technologies (e.g., LTE, UMTS, CDMA, EVDo, GSM, etc.) at each remote device.

Once the RF design is complete, the DAS system installer and/or commissioner (e.g., who commission and/or optimize the DAS system) attempts to construct and/or commission the DAS system to closely match the RF design. The installer connects the remote equipment at or near the locations indicated in the design. The commissioner can calibrate settings for the DAS system components (e.g., remote equipment) per the manufacturer specific instructions. Placement and settings can be varied from the RF design according to the environment and experience of the commissioner. The commissioner integrates (e.g., connects) the equipment to distribute live signals (provided from wireless operator signal source equipment (and/or other equipment)) into DAS head-end components (e.g., the Radio Interface Module(s) (RIM), power conditioner(s), etc.). The commissioner also optimizes output power of the remote equipment (e.g., RAUs or RHUs) per the wireless operator technology and/or protocol.

The third party RF design software may allow designers to complete system designs that violate DAS manufacturer specific software and hardware configuration requirements. Such RF design errors can lead to unplanned delays and/or unplanned systems costs from an inability to implement the system as originally designed. For example, the installer and/or commissioner may be required to obtain additional components to complete DAS installation and/or commissioning. Further, the layout and location of the HEU and other components within the equipment racks and modules within the cassis are left to the discretion of the installer. The installer may mount and install system components in a way that is different than the intended design (whether or not properly documented by the designer). As a result, it may be required to re-rack equipment or reposition modules within the cassis, which could invalidate commissioning of the system. Further, the DAS system design may not include information regarding how to configure DAS manufacturer specific system components through DAS manufacturer specific software interfaces (e.g., web-accessible graphical user interface (GUI), local GUI, etc.). Thus, the commissioner may configure the DAS equipment settings in a suboptimal manner (e.g., signal(s) does not reach the intended remote location(s), RF propagated at unintended power levels, etc.).

SUMMARY

Embodiments of the disclosure are directed to implementing a live distributed antenna system (DAS) configuration from a virtual DAS design using an original equipment manufacturer (OEM) specific software system in a real DAS. The OEM specific software can be resident software in the DAS or accessible by the DAS. In exemplary aspects disclosed herein, the OEM specific software system enables a designer to create, save, import, modify and/or preconfigure a virtual DAS in a virtual DAS configuration file(s) using OEM specific software tools resident in the real DAS. The OEM specific software tools could include functionality such as the ability to incorporate and enforce data, information, specifications, and/or limitations of the real DAS (e.g., OEM design constraints) for example, to facilitate design and optimization of the virtual DAS for improved and optimized performance of the real DAS. The configuration file(s) can then be subsequently implemented to modify and/or configure live equipment of a real DAS (e.g., to automatically calibrate the live equipment). Additionally, the configuration file(s) could guide a user through installation of the real DAS equipment to ensure proper installation thereof. The OEM specific software tools and local execution of the virtual DAS facilitates, improves, and optimizes DAS design and execution, and ensures that the real DAS substantially matches the DAS design. Thus, errors associated with design, installation, commissioning, and/or optimization may be reduced, and performance improved and optimized.

One embodiment is a system for implementing a live DAS configuration from a virtual DAS design using an OEM specific software system in a real DAS. The system comprises a real DAS comprising signal distribution equipment and an OEM specific software system. The signal distribution equipment includes a head-end unit that comprises a processor, a memory coupled to the processor, and a display device coupled to the processor. The OEM specific software system is electronically stored in the memory of the real DAS, and is configured to execute processing steps. The processor is configured to configure at least one virtual DAS setting for a virtual DAS. The processor is also configured to enforce upon the at least one virtual DAS setting OEM, design constraints of at least one real setting of signal distribution equipment in the real DAS. The processor is further configured to generate at least one virtual DAS configuration file comprising the at least one virtual DAS setting for the virtual DAS. The processor is further configured to store the at least one virtual DAS configuration file in the memory at the real DAS. The processor is further configured to modify the at least one real setting of the signal distribution equipment in the real DAS based on the at least one virtual DAS setting in the at least one virtual DAS configuration file.

An additional embodiment of the disclosure relates to a method for implementing a live DAS configuration from a virtual DAS design using an OEM specific software system in a real DAS. The method comprises configuring, by an OEM specific software system in a real DAS, at least one virtual DAS setting for a virtual DAS, and enforcing, by the OEM specific software system, upon the at least one virtual DAS setting OEM design constraints of at least one real setting of signal distribution equipment in the real DAS. The method further comprises generating, by the OEM specific software system, at least one virtual DAS configuration file comprising the at least one virtual DAS setting for the virtual DAS, and storing, by the OEM specific software system, the at least one virtual DAS configuration file in memory at the real DAS. The method further comprises modifying, by the OEM specific software system, the at least one real setting of the signal distribution equipment in the real DAS based on the at least one virtual DAS setting in the at least one virtual DAS configuration file.

An additional embodiment of the disclosure relates to a non-transitory computer readable medium comprising program instructions for implementing a live DAS configuration from a virtual DAS design using an OEM specific software system in a real DAS. The program instructions, when executed, comprise the processing steps of configuring, by an OEM specific software system in a real DAS, at least one virtual DAS setting for a virtual DAS, and enforcing, by the OEM specific software system, upon the at least one virtual DAS setting OEM design constraints of at least one real setting of signal distribution equipment in the real DAS. The program instructions, when executed, further comprise the processing steps of generating, by the OEM specific software system, at least one virtual DAS configuration file comprising the at least one virtual DAS setting for the virtual DAS, and storing, by the OEM specific software system, the at least one virtual DAS configuration file in memory at the real DAS. The program instructions, when executed, further comprise the processing steps of modifying, by the OEM specific software system, the at least one real setting of the signal distribution equipment in the real DAS based on the at least one virtual DAS setting in the at least one virtual DAS configuration file.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
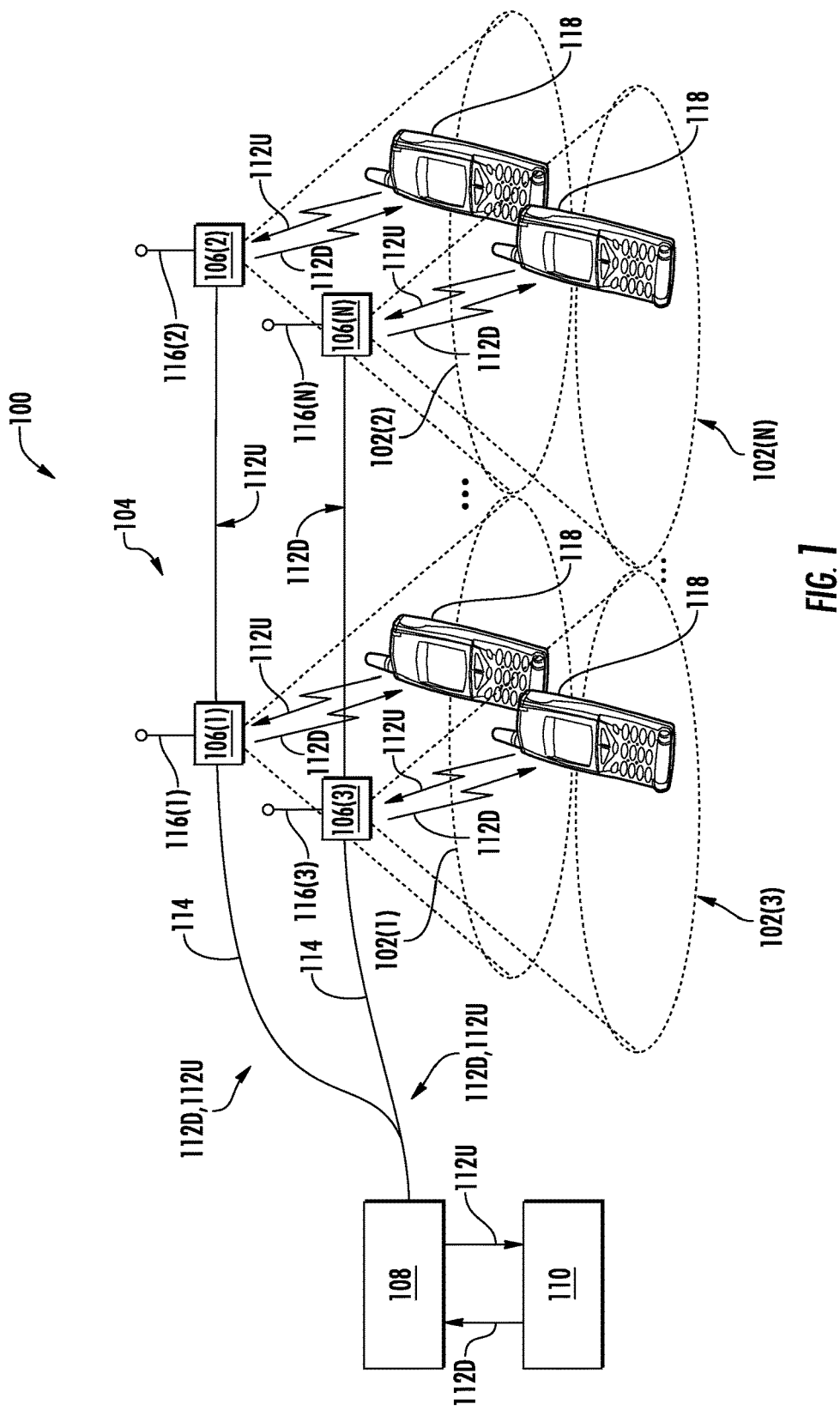
FIG. 1 is a schematic diagram of an exemplary wireless distributed communications system (WDCS) in the form of a distributed antenna system (DAS)
Figure 2:
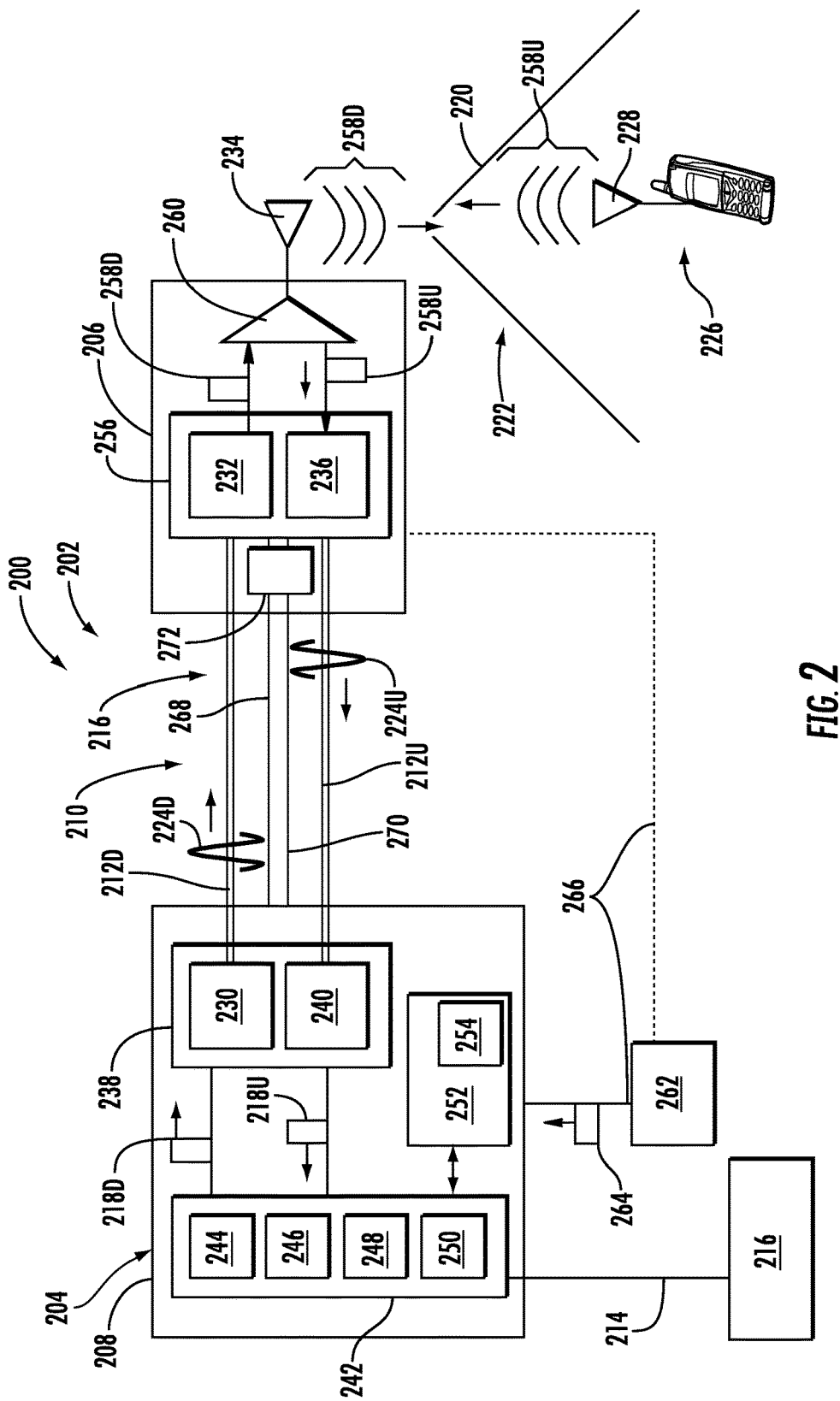
FIG. 2 is a schematic diagram of an exemplary optical fiber-based DAS, including an exemplary head-end unit (HEU) configured to distribute radio-frequency (RF) signals to a remote access unit (RAU)

Reference will now be made in detail to the present preferred embodiments, examples of which are illustrated in the accompanying drawings. Whenever possible, the same reference numerals will be used throughout the drawings to refer to the same or like parts. One embodiment of an original equipment manufacturer (OEM) specific software system is shown in FIG. 2, and is designated generally throughout by the reference numeral 200.

Embodiments of the disclosure are directed to implementing a live distributed antenna system (DAS) configuration from a virtual DAS design using an OEM specific software system in a real DAS. The OEM specific software can be resident software in the DAS or accessible by the DAS. In exemplary aspects disclosed herein, the OEM specific software system enables a designer to create, save, import, modify and/or preconfigure a virtual DAS in a virtual DAS configuration file(s) using OEM specific software tools resident in the real DAS. The OEM specific software tools could include functionality such as the ability to incorporate and enforce data, information, specifications, and/or limitations of the real DAS (e.g., OEM design constraints) for example, to facilitate design and optimization of the virtual DAS for improved and optimized performance of the real DAS. The configuration file(s) can then be subsequently implemented to modify and/or configure live equipment of a real DAS (e.g., to automatically calibrate the live equipment). Additionally, the configuration file(s) could guide a user through installation of the real DAS equipment to ensure proper installation thereof. The OEM specific software tools and local execution of the virtual DAS facilitates, improves, and optimizes DAS design and execution, and ensures that the real DAS substantially matches the DAS design. Thus, errors associated with design, installation, commissioning, and/or optimization may be reduced, and performance improved and optimized.

In aspects disclosed herein, the OEM specific software system (e.g., DAS manufacturer OEM specific software system) enables a DAS designer to create a virtual DAS (e.g., which could be referred to as a "Profile") and/or upload or import an existing real DAS to create a virtual DAS. The DAS designer can then modify the virtual DAS (e.g., adding or removing buildings or DAS components, reconfiguring user definable settings for the virtual DAS or DAS components, etc.). The user definable settings of the virtual DAS include equipment layout and physical connectivity between (1) system components and/or (2) modules within rooms, racks, or chassis. The virtual DAS can include components being physically located in multiple buildings or structures as well as outdoor locations. The OEM specific software system may further enable pre-configuration of some or all user definable settings in the virtual DAS in advance of the virtual DAS being activated on a real DAS (e.g., live DAS, active DAS, etc.), or prior to the real DAS being otherwise deployed.

The virtual design profile within the DAS OEM specific software can be created at one location or on one system, and can be loaded onto another system at the same or different location either locally at a DAS system site(s) or through internet connections. A bill of materials of system components may be generated automatically or manually for the virtual components within the virtual DAS, or from modifications to the virtual DAS (e.g., of an existing system), such as if a virtual component moves, is added, or otherwise changes. This can simplify procurement of equipment (e.g., signal distribution equipment, real equipment, etc.) for the real DAS.

The OEM specific software system may further enable a user (e.g., designer) to create virtual placeholders for equipment (e.g., Radio Interface Module(s) (RIMs), Optical Interface Module(s) (OIMs), Remote Access Units, which may be Remote Antenna Units (RAUs) for example or other remote equipment, fiber connectivity module(s) (FCMs), etc.) to reserve and preconfigure settings for future planned equipment to be added later to the real DAS. For example, if only one wireless operator joins the system after the initial commissioning, but another wireless operator is expected to join the system at a later date, having virtual placeholders for equipment (e.g., gear) would allow additional equipment to be seamlessly added to the real DAS at a later date without the need for a change to most, if not all, of the system configuration settings.

The OEM specific software system enables a user to adjust or preset any of the user definable virtual settings in a virtual placeholder component (e.g., like equipment). The virtual settings for equipment (e.g., RAU, FCM link, other remote equipment, etc.) would be automatically uploaded (e.g., applied, activated, etc.) to equipment once connected or otherwise put in communication with the OEM specific software system (e.g., positioned inside of a slot(s) in a chassis, connected by optical fiber(s), upon manual activation of the component, etc.). Virtual placeholders for future equipment could be configured to not generate or mask associated system monitoring alarms, such as those for missing active equipment. The OEM specific software system may also automatically calculate and/or modify (e.g., compensate or adjust) attenuator or gain settings within placeholder and existing components to automatically compensate for anticipated gains or losses in equipment for reasons such as amplifier sharing in advance of placeholder components being replaced by equipment, or if placeholder or existing components are removed from the system.

Once completed, the virtual DAS can be uploaded onto and activated into the memory of the real DAS (e.g., real DAS manufacturer specific system controller hardware, new or existing equipment, etc.), whether on a new or existing system. In certain embodiments, the virtual DAS (e.g., profile, virtual design profile, etc.) has no impact on active or live system settings until the user "activates" or uploads the virtual settings into the live or active system hardware. The OEM specific system user interface or graphical user interface (GUI) could guide the installer(s) through the installation process of the DAS components so that the real DAS (e.g., active DAS, live DAS, etc.) matches that of the virtual DAS, such as by guiding an installer through connection of equipment (e.g., DAS components, DAS modules, etc.), their physical location(s) (e.g., placement of components within an equipment rack, placement of equipment modules within a chassis or chassis slot, etc.), etc. The OEM specific software system could also guide an installer as to RF, optical, and communication cable connections between multiple chassis and head-end to remote location or multi-building connections, where to physically place remote equipment on a map or building floor plan diagram, etc.

In particular, the OEM specific software system could provide feedback (e.g., confirmation messages, error messages, successful installation messages, unsuccessful installation messages, etc.) if the installer correctly or incorrectly installs or connects equipment (e.g., whether the equipment or module(s) are in the proper physical location, chassis, or chassis slot). Monitoring of installation by the OEM specific software system could be from electrical or optical connections between components, from location based service detection (e.g., Bluetooth transceivers, RFID, GPS), etc. Such feedback could include visual indicators such as text, symbols, color coded indicators, or audible indicators. The OEM specific software system could also provide guidance on installation of individual components, or multiple components simultaneously. For example, the installation instruction or guidance from the user interface could show a diagram of all modules that are to be installed inside of a chassis simultaneously. As the user slides modules individually inside of the chassis, the user could receive feedback that the installation of those modules was successful or unsuccessful.

The commissioning process (e.g., integration and/or optimization of live signals or protocols) for the real DAS could be simplified and completed more efficiently. For example, user definable downlink (DL) maximum expected input power settings or attenuator settings at the point of interface equipment could be commissioned through the OEM specific software system. DAS manufacturer specific settings can include single or multiple RF path configurations, power amplifier settings, attenuator settings, and expected maximum and idle RF input power settings at point of interface modules, such as RIM(s) or conditioners that connect with incoming signals provided by Wireless Operator equipment (e.g., Base Station(s), Small Cell(s), BBU(s), Remote Radio Head(s) (RRH) or Metro Cell(s), etc.). The RF path configuration settings can open and close switches within the electronics at the head-end, directing digital, RF, or optical signals within head-end components to remote equipment.

In this regard, FIG. 2 is a schematic diagram of an exemplary embodiment of an optical fiber-based distributed antenna system (DAS) 200 (hereinafter "real DAS 200") with equipment 202 (e.g., signal distribution equipment, real equipment, etc.) that includes exemplary head-end equipment 204 and a remote access unit (RAU) 206. A real DAS 200 and equipment 202 mean that they are tangible (as opposed to a virtual DAS and virtual equipment which are non-tangible). Note that the real DAS 200 can include multiple RAUs although only one RAU 206 is shown in FIG. 2. In this embodiment, the real DAS 200 that is configured to create one or more antenna coverage areas for establishing communications with wireless client devices located in the RF range of the antenna coverage areas. The real DAS 200 provides RF communications services (e.g., cellular services). In this embodiment, the real DAS 200 includes the head-end equipment 204 in the form of a head-end unit (HEU) 208, one or more of the RAUs 206, and a communications medium in the form of an optical fiber 210 that communicatively couples the HEU 208 to the RAU 206 in this example. In one example, the HEU 208 is provided as a chassis with electronic equipment installed therein. The HEU 208 is configured to receive communications over downlink network link 214 (e.g., communications medium, connection, wire, etc.) from a source or sources, such as a network 216 or carrier as examples, and provide such communications to the RAU 206. The HEU 208 is also configured to return uplink electrical RF communications signals 218U received from the RAU 206, via network link 214, back to the source or sources. In this regard, in this embodiment, the optical fiber 210 includes at least one downlink optical fiber 212D to carry signals communicated from the HEU 208 to the RAU 206, and at least one uplink optical fiber 212U to carry signals communicated from the RAU 206 back to the HEU 208. One downlink optical fiber 212D and one uplink optical fiber 212U could be provided to support multiple channels each using wavelength-division multiplexing (WDM), as discussed in U.S. patent application Ser. No. 12/892,424 filed Sep. 28, 2010 entitled "Providing Digital Data Services in Optical Fiber-Based Distributed Radio Frequency (RF) Communications Systems, and Related Components and Methods," incorporated herein by reference in its entirety. Other options for WDM and frequency-division multiplexing (FDM) are also disclosed in U.S. patent application Ser. No. 12/892,424, any of which can be employed in any of the embodiments disclosed herein.

The real DAS 200 (e.g., optical fiber-based) has an antenna coverage area 220 that can be substantially centered about the RAU 206. The antenna coverage area 220 of the RAU 206 forms an RF coverage area 222. The HEU 208 is adapted to perform or to facilitate any one of a number of wireless applications, including but not limited to Radio-over-Fiber (RoF), radio frequency identification (RFID), wireless local-area network (WLAN) communication, public safety, cellular, telemetry, and other mobile or fixed services. Shown within the antenna coverage area 220 is a client device 226 in the form of a mobile device as an example, which may be a cellular telephone as an example. The client device 226 can be any device that is capable of receiving RF communication signals. The client device 226 includes an antenna 228 (e.g., a wireless card) adapted to receive and/or send electromagnetic RF communications signals.

With continuing reference to FIG. 2, to communicate the RF communications signals 218D over the downlink optical fiber 212D to the RAU 206, to in turn be communicated to the client device 226 in the antenna coverage area 220 formed by the RAU 206, the HEU 208 includes an electrical-to-optical (E/O) converter 230. The E/O converter 230 converts the downlink electrical RF communications signals 218D to downlink optical RF communications signals 224D to be communicated over the downlink optical fiber 212D. The RAU 206 includes an optical-to-electrical (O/E) converter 232 to convert received downlink optical RF communications signals 224D back to electrical RF communications signals to be communicated wirelessly through an antenna 234 of the RAU 206 to client devices 226 located in the antenna coverage area 220.

Similarly, the antenna 234 is also configured to receive wireless RF communications from the client devices 226 in the antenna coverage area 220. In this regard, the antenna 234 receives wireless RF communications from the client devices 226 and communicates electrical RF communications signals representing the wireless RF communications to an E/O converter 236 in the RAU 206. The E/O converter 236 converts the electrical RF communications signals into uplink optical RF communications signals 224U to be communicated over the uplink optical fiber 212U. An 0/E converter 240 provided in the HEU 208 converts the uplink optical RF communications signals 224U into uplink electrical RF communications signals, which can then be communicated as uplink electrical RF communications signals 218U back to a network or other source. The HEU 208 in this embodiment is not able to distinguish the location of the client devices 226. The client device 226 could be in the range of any antenna coverage area 220 formed by an RAU 206.

With continuing reference to FIG. 2, the HEU 208 includes a service unit 242, which may be a remote interface module (RIM), that provides electrical RF service signals by passing (or conditioning and then passing) such signals from one or more outside networks 216 via a network link 214. In a particular exemplary embodiment, this includes providing WLAN signal distribution as specified in the Institute of Electrical and Electronics Engineers (IEEE) 802.11 standard, i.e., in the frequency range from 2.4 to 2.5 GigaHertz (GHz) and from 5.0 to 6.0 GHz. Any other electrical RF communications signal frequencies are possible. In another exemplary embodiment, the service unit 242 provides electrical RF service signals by generating the signals directly. In another exemplary embodiment, the service unit 242 coordinates the delivery of the electrical RF service signals between client devices 226 within the antenna coverage area 220.

With continuing reference to FIG. 2, the service unit 242 is electrically coupled to the E/O converter 232 that receives the downlink electrical RF communications signals 218D from the service unit 242 and converts them to corresponding downlink optical RF communications signals 224D. In an exemplary embodiment, the E/O converter 232 includes a laser suitable for delivering sufficient dynamic range for RoF applications, and optionally includes a laser driver/amplifier electrically coupled to the laser. Examples of suitable lasers for the E/O converter 232 include, but are not limited to, laser diodes, distributed feedback (DFB) lasers, Fabry-Perot (FP) lasers, and vertical cavity surface emitting lasers (VCSELs).

With continuing reference to FIG. 2, the HEU 208 also includes the O/E converter 240, which is electrically coupled to the service unit 242. The O/E converter 240 receives the uplink optical RF communications signals 224U and converts them to corresponding uplink electrical RF communications signals 218U. In an exemplary embodiment, the O/E converter 240 is a photodetector, or a photodetector electrically coupled to a linear amplifier. The E/O converter 232 and the O/E converter 240 are provided in an optical interface module (OIM) 238 in this example.

In accordance with an exemplary embodiment, the service unit 242 in the HEU 208 can include an RF communications signal conditioner unit 240 for conditioning the downlink electrical RF communications signals 218D and the uplink electrical RF communications signals 218U, respectively. The service unit 242 can include a digital signal processing unit ("digital signal processor") 246 for providing to the RF communications signal conditioner unit 244 an electrical signal that is modulated onto an RF carrier to generate a desired downlink electrical RF communications signal 218D. The digital signal processor 246 is also configured to process a demodulation signal provided by the demodulation of the uplink electrical RF communications signal 218U by the RF communications signal conditioner unit 244. The service unit 242 in the HEU 208 can also include an optional central processing unit (CPU) 248 for processing data and otherwise performing logic and computing operations, and a memory unit 250 for storing data, such as data to be transmitted over a WLAN or other network for example. The HEU 208 also includes the OEM specific software system 252, which could be stored in the memory unit 250 and accessed and processed by the CPU 248.

With continuing reference to FIG. 2, the RAU 206 also includes a converter pair 256 comprising the O/E converter 232 and the E/O converter 236. The O/E converter 232 converts the received downlink optical RF communications signals 224D from the HEU 208 back into downlink electrical RF communications signals 258D. The E/O converter 236 converts uplink electrical RF communications signals 258U received from the client device 226 into the uplink optical RF communications signals 224U to be communicated to the HEU 208. The O/E converter 232 and the E/O converter 236 are electrically coupled to the antenna 234 via an RF signal-directing element 260, such as a circulator for example. The RF signal-directing element 260 serves to direct the downlink electrical RF communications signals 258D and the uplink electrical RF communications signals 258U, as discussed below. In accordance with an exemplary embodiment, the antenna 234 can include one or more patch antennas, such as disclosed in U.S. patent application Ser. No. 11/504,999, filed Aug. 16, 2006 entitled "Radio-over-Fiber Transponder With A Dual-Band Patch Antenna System," now issued U.S. Pat. No. 7,627,250, and U.S. patent application Ser. No. 11/451,553, filed Jun. 12, 2006 entitled "Centralized Optical-Fiber-Based Wireless Picocellular Systems and Methods," both of which are incorporated herein by reference in their entireties.

With continuing reference to FIG. 2, the real DAS 200 also includes a power supply 262 that generates an electrical power signal 264. The power supply 262 is electrically coupled to the HEU 208 for powering the power-consuming elements therein. In an exemplary embodiment, an electrical power line 266 runs through the HEU 208 and over to the RAU 206 to power the O/E converter 232 and the E/O converter 236 in the converter pair 256, the optional RF signal-directing element 260 (unless the RF signal-directing element 260 is a passive device such as a circulator for example), and any other power-consuming elements provided. In an exemplary embodiment, the electrical power line 266 includes two wires 268 and 270 that carry a single voltage and that are electrically coupled to a DC power converter 272 at the RAU 206. The DC power converter 272 is electrically coupled to the O/E converter 232 and the E/O converter 236 in the converter pair 256, and changes the voltage or levels of the electrical power signal 264 to the power level(s) required by the power-consuming components in the RAU 206. In an exemplary embodiment, the DC power converter 272 is either a DC/DC power converter or an AC/DC power converter, depending on the type of electrical power signal 264 carried by the electrical power line 266. In another exemplary embodiment, the electrical power line 266 (dashed line) runs directly from the power supply 262 to the RAU 206 rather than from or through the HEU 208. In another exemplary embodiment, the electrical power line 266 includes more than two wires and carries multiple voltages.

Figure 3:
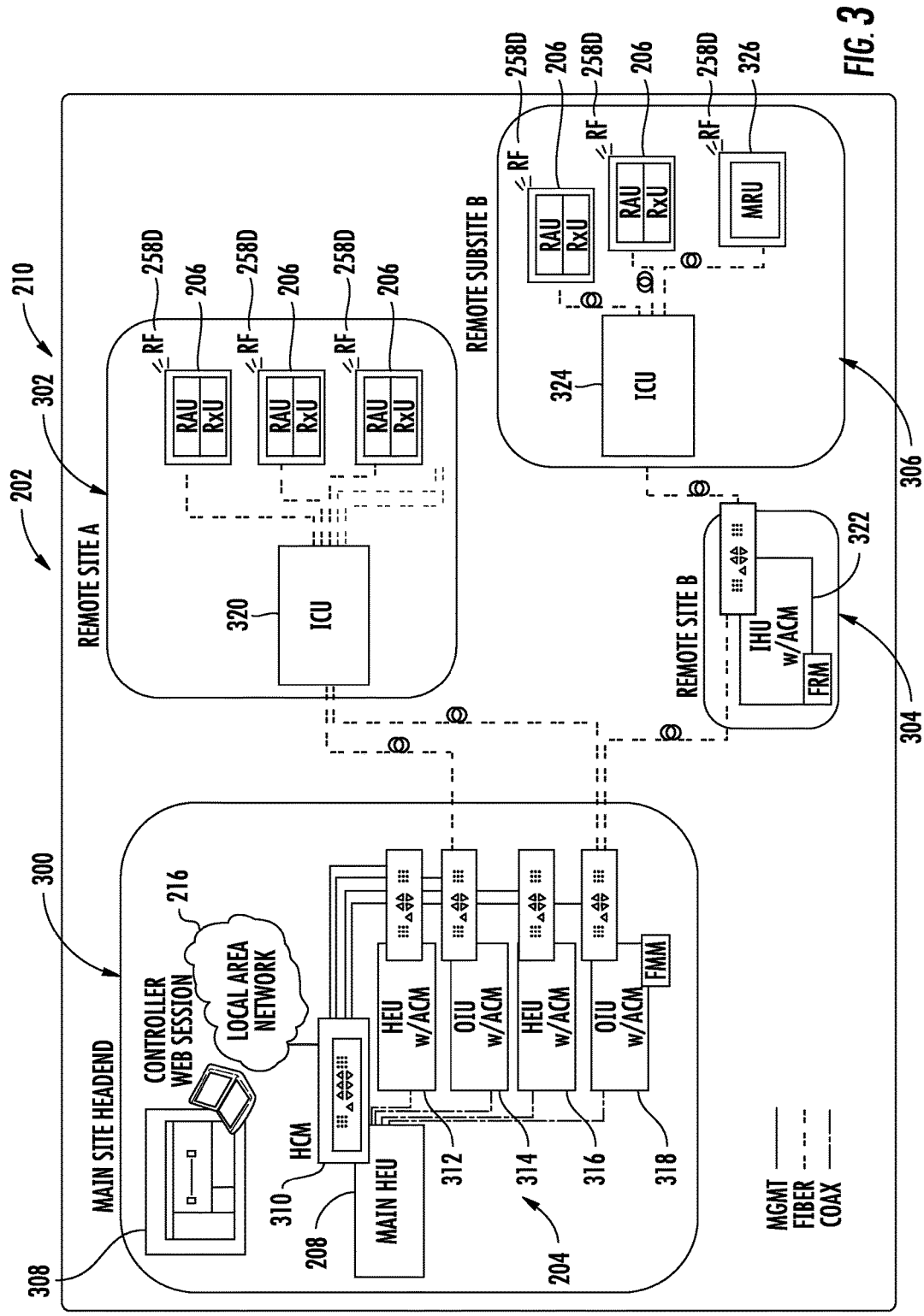
FIG. 3 is a schematic diagram of an exemplary real DAS system that includes a head-end control module configured to provide head-end equipment for distributing and receiving RF communications signals to and from RAUs.

FIG. 3 provides additional information and equipment of the real DAS 200 discussed above with respect to FIG. 2. More specifically, FIG. 3 is a schematic diagram of an exemplary real DAS 200 that includes a head-end control module (HCM) 310 configured to provide head-end equipment for distributing and receiving RF communications signals to and from RAUs 206. The HCM 310 enables centralized, single-source local and remote management of DAS equipment (e.g., ACMs). This particular embodiment of the real DAS 200 comprises a main site head-end 300, a remote site A 302, a remote site B 304, and remote subsite B 306 (e.g., at remote site B or proximate thereto). The main site head-end 300 comprises a controller web session 308, used to access the OEM specific software system 252 via the HCM 310 over the network 216 (e.g., local area network (LAN)). In certain embodiments, the HCM 310 is a part of the main HEU 208. The HCM 310 is connected to a first HEU 312 (with auxiliary control modules (ACMs)), a first optical interface unit (OIU) 314 (with ACM), a second HEU 316 (with ACM), and a second OIU 318 (with ACM) via management (MGMT) cables. The main HEU 208 is connected to a first HEU 312 (with ACM), a first OIU 314 (with ACM), a second HEU 316 (with ACM), and a second OIU 318 (with ACM) via coaxial cables. Connection of the HCM with four ACMs enables centralized management for all connected head-end and remote-end site elements.

The first OIU 314 and second OIU 218 are connected via a fiber optic cable(s) to a first ICU 320 at remote site A 302. The ICU 320 is configured to provide power for powering the RAUs 206. The ICU 320 may be configured to provide the power in a composite cable along with the optical fibers carry signals from the HEU 208 to the RAUs 206. The first ICU 320 is connected to one or more RAUs 206 that transmit downlink electrical RF communications signals 258D (each RAU 206 may include RF expansion (remote expansion unit (RxU))). The second OIU 218 is also connected to an integrated head-end unit (IHU) 322 (with ACM) at remote site B 304 via an FMM-to-FRM fiber optic link. The IHU 322 (with ACM) is connected to an ICU 324 at remote subsite B 306 by a fiber optic cable(s). The ICU 324 is connected via a fiber optic cable(s) to one or more RAUs 206 that transmit downlink electrical RF communications signals 258D (each RAU 206 may include RF expansion (RxU)). The ICU 324 could also be connected via a fiber optic cable to a mid-power remote unit (MRU) 326 which then transmits downlink electrical RF communications signals 258D.

Figure 4:
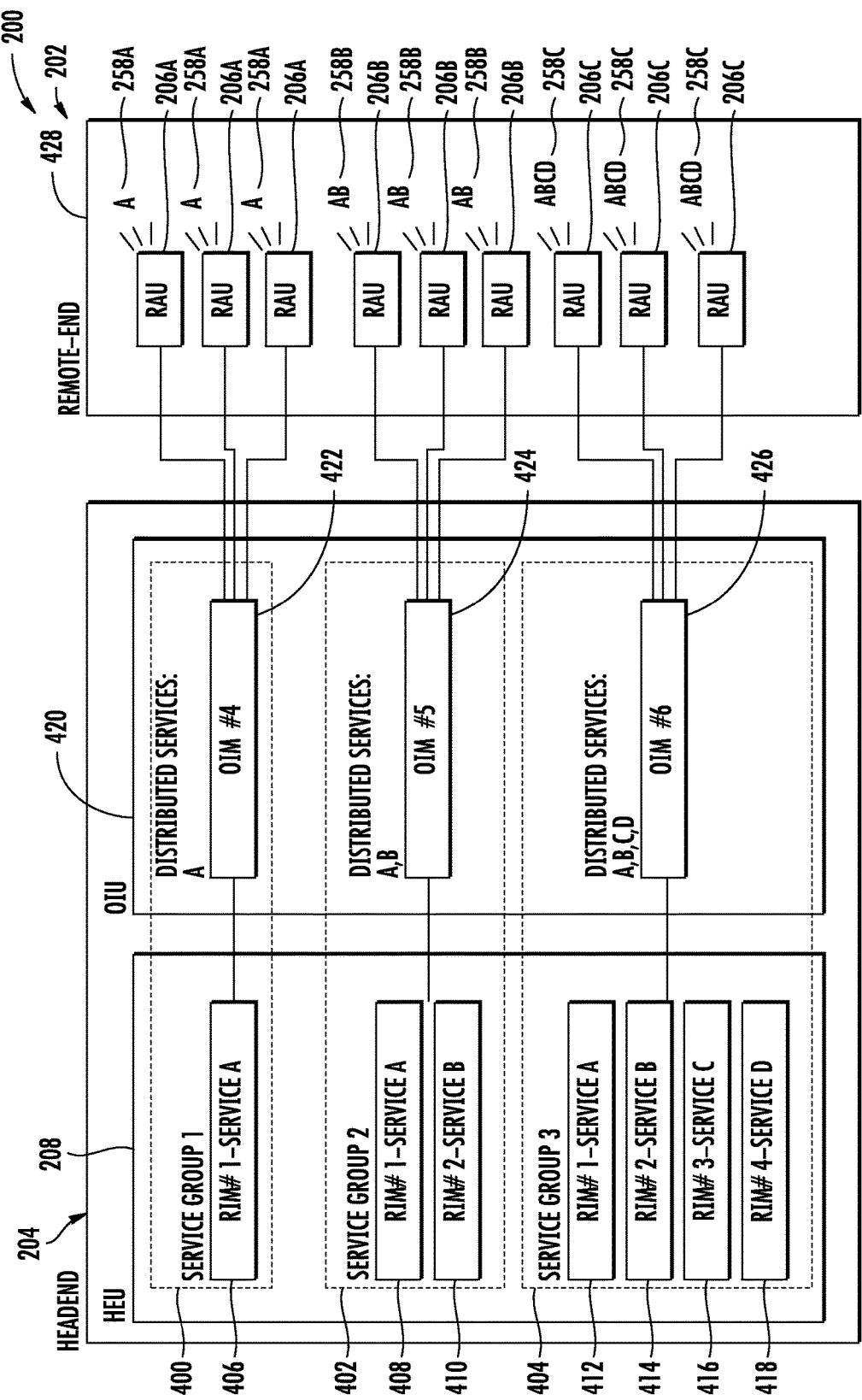
FIG. 4 is a schematic diagram of an exemplary RF path allocation between radio interface modules (RIMs) of the HEU and RAUs in the real DAS of FIG. 3.

FIG. 4 is a schematic diagram of an exemplary RF path allocation between radio interface modules (RIMs) 406-418 of the HEU 208 and RAUs 206 in the real DAS of FIG. 3. Multiple RIM modules can be assorted with a single optical interface module (OIM) in each service group, and one RIM module can be associated with a number of OIMs in a service group. For example, in one embodiment, the RF paths for up to three service groups (e.g., service specific RIMs and/or OIMs) are configured. In this example, as shown, a head-end 300 includes a head-end unit (HEU) 208 and an OIU 420. The HEU 208 comprises a first service group 400, which includes the RIM #1 module 406, which is configured to transmit supported Service A to OIM #4 module 422 of OIU 420. The OIM #4 module 422 then transmits the supported Service A to RAUs 206A at remote end 428 which then transmit Service A 258A to one or more client devices 226 (not shown). The HEU 208 comprises a second service group 402, which includes RIM #1 module 408 and RIM #2 module 410, which are configured to transmit corresponding Services A,B to OIM #5 module 424 of OIU 420. The OIM #5 module 424 then transmits the supported Services A,B to RAUs 206B at remote end 428 which then transmit Services A,B 258B to one or more client devices 226 (not shown). The HEU 208 comprises a third service group 404, which includes RIM #1 module 412, RIM #2 module 414, RIM #3 module 416, and RIM #4 module 418, which are configured to transmit corresponding services A,B,C,D to OIM #6 module 426 of OIU 420. The OIM #6 module 426 then transmits the supported Services A,B,C,D to RAUs 206C at remote end 428, which then transmit Services A,B,C,D 258C to one or more client devices 226 (not shown).

Figure 5:
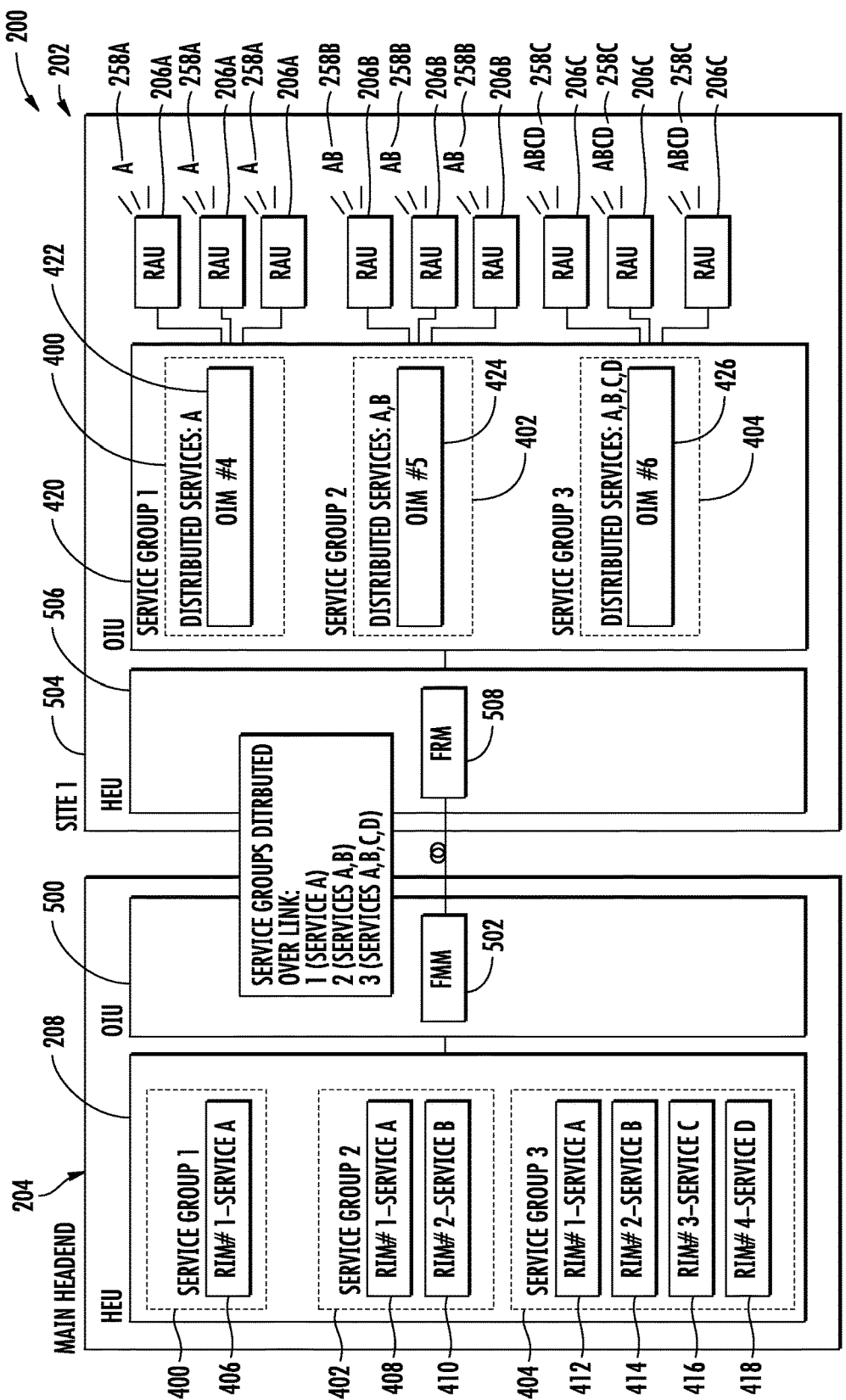
FIG. 5 is a schematic diagram of an exemplary RF path allocation between RIMs of the HEU and RAUs at a remote site using an FMM (fiber main module)-to-FRM (fiber remote module) link in the real DAS of FIG. 3.

FIG. 5 is a schematic diagram of an exemplary RF path allocation between RIMs 406-418 of the HEU 208 and RAUs 206 at a remote site 504 using an FMM-to-FRM link in the real DAS of FIG. 3. More specifically, FIG. 5 illustrates an example of RF paths configured for multiple sites, where the service signals are extended to a remote location via an FMM-FRM link.

For example, in one embodiment, the RF paths for up to three service groups (e.g., service specific RIMs and/or OIMs) are configured. In this example, the service groups are configured both at the main head-end 300 (e.g., main head-end site) and at the remote location (e.g., site 1 504) so that the services from the RIMs at the main head-end 300 are extended to OIMs at the remote location and distributed by their connected RAU remotes.

In this example, as shown (similar to that of FIG. 4), a main head-end 300 includes an HEU 208 and an OIU 500, and site 1 504 includes an HEU 506 and an OIU 420. The HEU 208 comprises a first service group 400, which includes the RIM #1 module 406, which is configured to transmit supported Service A to FMM 502 of OIU 500 of the main head-end 300. The OIU FMM 502 then transmits the supported service A to a FRM 508 of the HEU 506 of site 1 504. The site 1 HEU FRM 508 then transmits service A to OIM #4 module 422 of OIU 420. The OIM #4 module 422 then transmits the supported Service A to RAUs 206A at site 1 504, which then transmit Service A 258A to one or more client devices 226 (not shown).

The HEU 208 comprises a second service group 402, which includes RIM #1 module 408 and RIM #2 module 410, which are configured to transmit corresponding Services A,B to FMM 502 of OIU 500 of the main head-end 300. The OIU FMM 502 then transmits the supported services A,B to a FRM 508 of the HEU 506 of site 1 504. The site 1 HEU FRM 508 then transmits service A to OIM #5 module 424 of OIU 420. The OIM #5 module 424 then transmits the supported Services A,B to RAUs 206B at site 1 504, which then transmit Services A,B 258B to one or more client devices 226 (not shown).

The main head-end HEU 208 comprises a third service group 404, which includes RIM #1 module 412, RIM #2 module 414, RIM #3 module 416, and RIM #4 module 418, which are configured to transmit corresponding services A,B,C,D to FMM 502 of OIU 500 of the main head-end 300. The OIU FMM 502 then transmits the supported services A,B to a FRM 508 of the HEU 506 of site 1 504. The site 1 HEU FRM 508 then transmits service A to OIM #6 module 426 of OIU 420. The OIM #6 module 426 then transmits the supported Services A,B,C,D to RAUs 206C at site 1 504, which then transmit Services A,B,C,D 258C to one or more client devices 226 (not shown).

Figure 6:
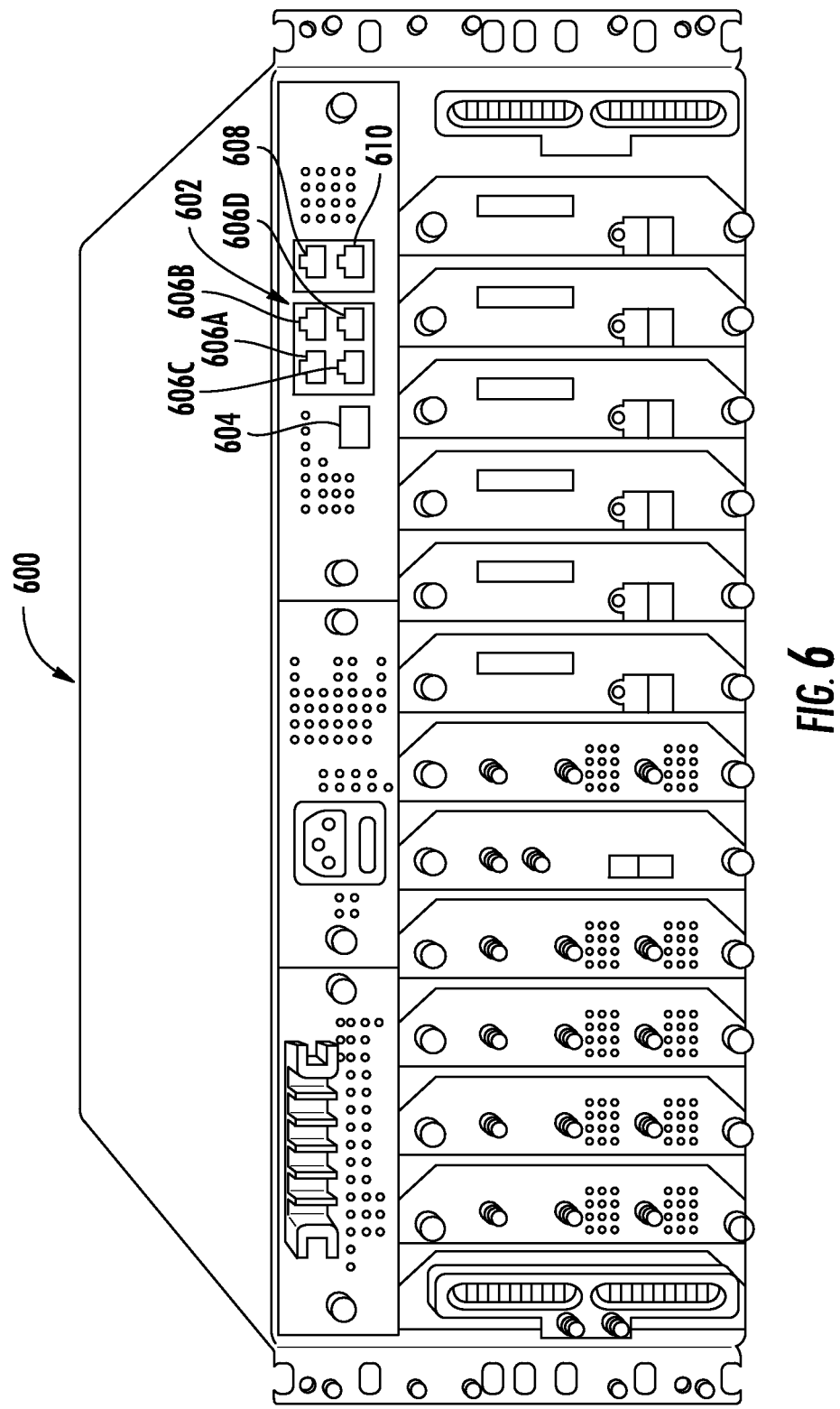
FIG. 6 is a front view of an exemplary integrated head-end unit (IHU) with an installed head-end control module (HCM) that can be employed in the real DAS of FIG. 3 for distributing and receiving RF communications signals to and from RAUs.

FIG. 6 is a front view of an exemplary integrated head-end unit (IHU) 600 with an installed head-end control module (HCM) 602 that can be employed in the real DAS of FIG. 3 for distributing and receiving RF communications signals to and from RAUs 206. More specifically, the HCM module 602 is installed at a head-end element (e.g., HEU, IHU 600) at the main site and enables centralized management and control capabilities of the DAS system. Auxiliary control modules (ACM) are installed in the remaining system head-end units and are interconnected (e.g., directly or indirectly) to the HCM enabling single source management via the HCM. The HCM could be connected to one or more HEU, OIU, and/or IHU units, whether directly or indirectly. In large configurations, the ACMs can be cascaded to each other.

In certain embodiments, the HCM module 602 interface comprises a console port 604, one or more internal ports (e.g., first internal port 606A, second internal port 606B, third internal port 606C, fourth internal port 606D, etc.), a LAN port 608, and/or a local port 610. The console port (e.g., RJ45, serial port) could be used for local configurations. The internal ports 606A-606D (e.g., RJ45, 100 Mb Ethernet ports) are used for management of connected ACMs installed in OIU chassis, HEU chassis, and/or IHU chassis. The ACM module interface would have corresponding similar internal ports for connecting to the HCM module interface 602. The LAN port 608 (e.g., RJ45, 1 Gb Ethernet port) connects to corporate LAN for remote management. The local port 610 (e.g., RJ45, 1 Gb Ethernet port) could be used for local configuration and management.

Figure 7:
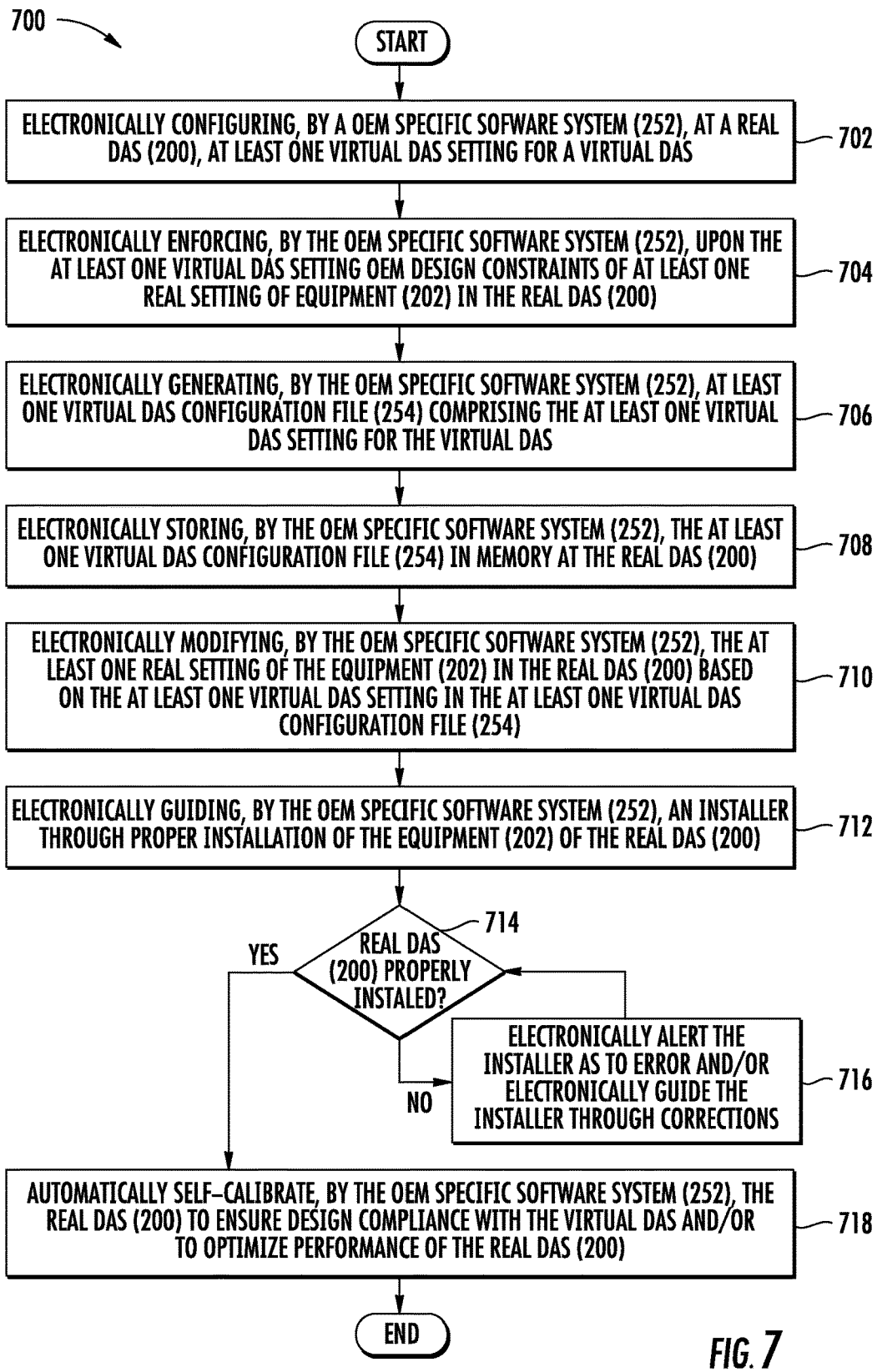
FIG. 7 is a flowchart illustrating an exemplary process for implementing a live DAS configuration from a virtual DAS design using an original equipment manufacturer (OEM) specific software system of the real DAS of FIGS. 2 and 3.

The real DAS 200 discussed above can be configured using the OEM specific software system 252 also discussed above. More specifically, the OEM specific software system 252 in the real DAS 200 can be used to implement a live DAS configuration from a virtual DAS design. In this regard, FIG. 7 is a flowchart of an exemplary process 700 for implementing a live DAS configuration from a virtual DAS design using an OEM specific software system of the real DAS of FIGS. 2 and 3 according to one embodiment. More specifically, at step 702, the OEM specific software system 252 in the real DAS 200 electronically configures at least one virtual DAS setting for a virtual DAS. At step 704, the OEM specific software system 252 electronically enforces upon the at least one virtual DAS setting OEM design constraints of at least one real setting of equipment in the real DAS 200. Thus, the OEM specific software system 252 incorporates and enforces data, information, specifications, and/or limitations of the real DAS (e.g., OEM design constraints) for example, to facilitate design and optimization of the virtual DAS for improved and optimized performance of the real DAS. In step 706, the OEM specific software system 252 electronically generates at least one virtual DAS configuration file 254 comprising the at least one virtual DAS setting for the virtual DAS. In step 708, the OEM specific software system 252 electronically stores the at least one virtual DAS configuration file in memory at the real DAS 200. In step 710, the 252 electronically modifies the at least one real setting of the equipment in the real DAS 200 based on the at least one virtual DAS setting in the at least one virtual DAS configuration file. Accordingly, the OEM specific software system 252 and local execution of the virtual DAS facilitates, improves, and optimizes DAS design and execution, and ensures that the real DAS substantially matches the DAS design. In step 712, the OEM specific software system 252 electronically guides an installer through proper installation of the equipment of the real DAS 200. Proper installation means that the real DAS 200 has been installed consistent with the design of the virtual DAS in the configuration file and the real DAS 200 has established communication among the equipment. In step 714, the OEM specific software system 252 determines whether the real DAS 200 has been properly installed. If the real DAS 200 has not been properly installed, then in step 716, the OEM specific software system 252 electronically alerts the installer as to errors and/or electronically guides the installer through corrections. Then, the process 700 reverts back to step 714. If the real DAS 200 has been properly installed in step 714, then in step 718, the OEM specific software system 252 automatically self-calibrates the real DAS 200 to ensure design compliance with the virtual DAS and/or to optimize performance of the real DAS 200 and the process 700 ends. Guiding a user through installation of the real DAS ensures compliance with the virtual DAS design. Thus, process 700 reduces errors associated with design, installation, commissioning, and/or optimization for improved performance and optimization of the real DAS 200.

Figure 8:
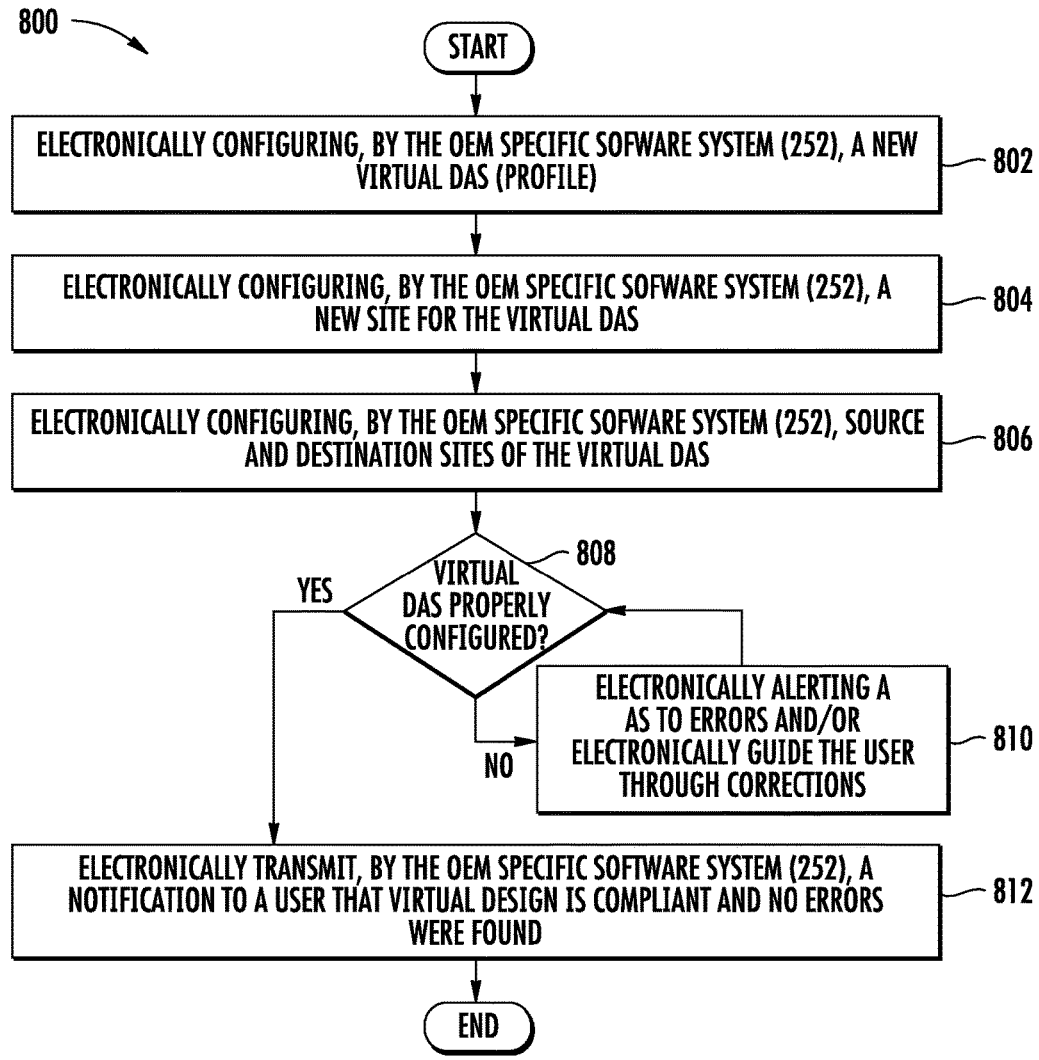
FIG. 8 is a flowchart illustrating an exemplary process for configuring a new virtual DAS (profile) using the OEM specific software system of the real DAS of FIGS. 2 and 3 according to one embodiment.

As discussed above, the virtual DAS is used to configure equipment of the real DAS 200. FIG. 8 is a flowchart illustrating an exemplary process 800 for configuring a new virtual DAS (profile) using the OEM specific software system 252 of the real DAS 200 of FIGS. 2 and 3 according to one embodiment. In step 802, the OEM specific software system 252 at a real DAS 200 electronically configures a new virtual DAS (profile). In step 804, the OEM specific software system 252 electronically configures a new site for the virtual DAS. In step 806, the OEM specific software system 252 electronically configures source and destination sites of the virtual DAS. In step 808, the OEM specific software system 252 determines whether the virtual DAS has been properly configured. If the virtual DAS has not been properly configured, then in step 810, the OEM specific software system 252 electronically alerts a user as to errors and/or electronically guides the user through corrections. Then the process 800 reverts back to step 808. If the virtual DAS has been properly configured in step 808, then in step 812, the OEM specific software system 252 electronically transmits a notification to a user that the virtual DAS design is compliant and no errors were found.

Figure 9:
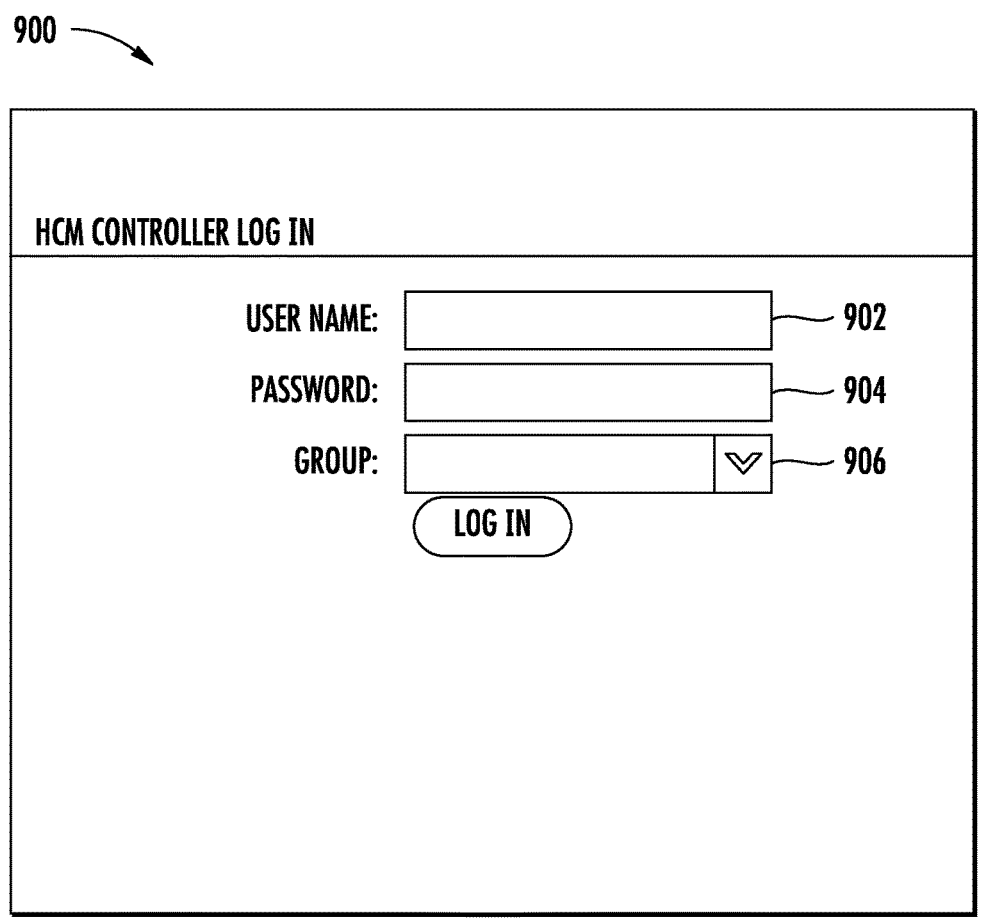
FIG. 9 is an exemplary HCM controller login graphical user interface (GUI) page provided by the OEM specific software system of the HEU of the real DAS of FIGS. 2 and 3 for further access the OEM specific software system.

FIGS. 9-19 are exemplary pages of a user interface of the OEM specific software system 252 for configuring a new virtual DAS (profile, virtual design profile, etc.) (as similarly described in FIG. 8). More specifically, FIG. 9 is an exemplary HCM controller login GUI page 900 provided by the OEM specific software system 252 of the HEU 208 of the real DAS 200 of FIGS. 2 and 3 for further access to the OEM specific software system 252. The login page 900 could be accessed through the HCM local port 610 of the HCM module 602 of the IHU 600 (or HEU) (as described above in FIG. 6). In certain embodiments, the login page 900 can be accessed through a web browser of a computer connected to the IHU 600 (or HEU) through the HCM local port 610. The login page 900 comprises a user name field 902, a password field 904, and/or group field 906. Login credentials could be set to default values for first time users, and then changed after first time login. A user, system commissioner, or installer can log into the DAS manufacturer OEM specific software system and upload and activate the settings and equipment configurations in the virtual DAS that was created by the system designer within DAS OEM specific software. A virtual DAS in a virtual DAS configuration file in the OEM specific software system can be created, accessed, modified, uploaded, downloaded, or activated locally at a real DAS and/or remotely through the internet.

Figure 10:
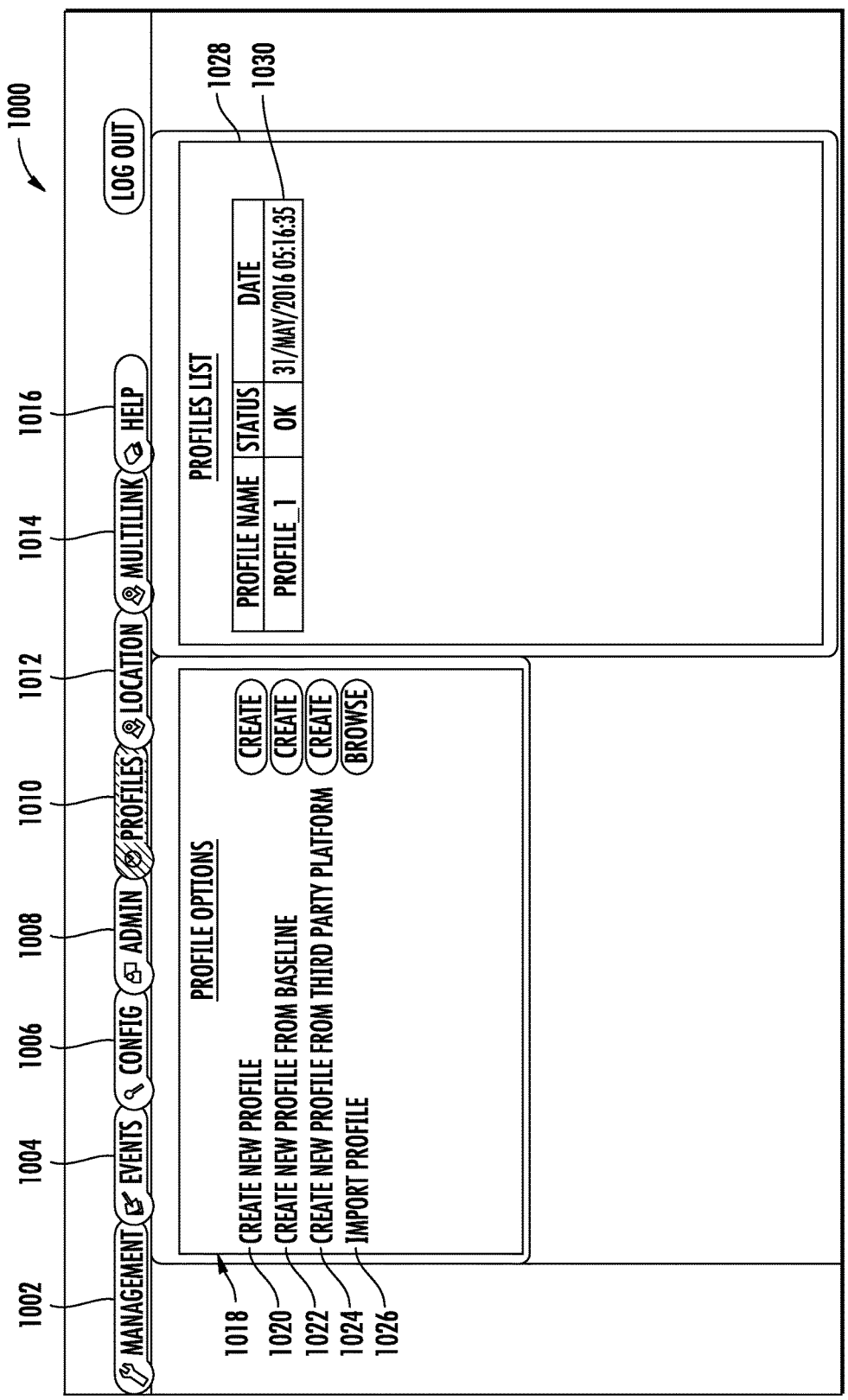
FIG. 10 is an exemplary profile management page provided by the OEM specific software system of the HEU of the real DAS of FIGS. 2 and 3 illustrating profile management options for creating and/or editing a virtual DAS (profile)

FIG. 10 is an exemplary profile management page 1000 provided by the OEM specific software system 252 of the HEU 208 of the real DAS 200 of FIGS. 2 and 3 illustrating profile management options for creating and/or editing a virtual DAS (profile). The profile management page 1000 may comprise a number of tabs, such as a management tab 1002, events tab 1004, configuration tab 1006, administration tab 1008, profiles tab 1010, location tab 1012, multilink tab 1014, and/or a help tab 1016. The management tab 1002 enables a user to view and configure network topologies, device alarms, and/or other management options. The events tab 1004 enables a user to view and configure events that occurred on the monitored devices. The configuration tab 1006 enables a user to configure and commission installed system devices and adjustment procedure. The administration tab 1008 provides a user with administration options, such as firmware upgrades, user management options, IP settings (e.g., required for receiving traps), etc. The profiles tab 1010 enables a user to create a virtual DAS (profile) offline and then activate it at a later time. Each virtual DAS includes virtual DAS equipment (e.g., a physical configuration on the installed units) and virtual DAS settings (e.g., commissioning parameters). When the virtual DAS is activated, the OEM specific software system could provide step-by-step instructions on how to configure the system. The location tab 1012 enables a user to import maps and icons to graphically display the geographical location and types of sites, as well as the floor plans and map power settings for the system elements. The multilink tab 1014 enables managing and accessing multiple setups in the same network from a single point of management (e.g., enables performing specific operations on a plurality of connected HCMs). The help tab 1016 provides access to online help files and other resources.

To configure a new profile (via a GUI) using the OEM specific software system, a user first selects the profiles tab 1010, which then displays profile options area 1018 and a profiles list 1028. A profile is a profile configuration of a virtual DAS created for, linked with, and/or derived from a real DAS. In other words, a profile is a virtual DAS. In particular, the profile may include virtual DAS equipment and settings pertaining to physical installation, connection requirements, and/or commissioning, etc. The profiles tab 1010 electronically provides a GUI for a user to manage, create, delete, copy, and/or export a profile. Upon completing the profile configuration of the virtual DAS, the virtual DAS can then be activated, and the OEM specific software system 252 may guide an installer with step-by-step instructions on how to setup the real DAS, and may apply the profile configuration on the real DAS. After the profile has been successfully activated, the system can be adjusted via the configuration tab 1006.

The profile options area 1018 electronically displays to the user several options for interactive selection, such as creating a new profile 1020, creating a new profile from baseline 1022, creating a new profile from third party platform 1024, and/or importing a profile 1026. Creating a new profile 1020 enables the user to create a completely new profile. Creating a new profile from baseline 1022 enables a user to create a new profile based on the configuration of the existing online system in use. In other words, creating a new profile from baseline 1022 enables a user to quickly create a profile which can be subsequently edited according to site requirements. Creating a new profile from third party platform 1024 enables a user to load an electronic third party platform design (e.g., third party platform file), which could include antenna locations and/or antenna deployment. More specifically, the third party platform design could include floor layouts and/or setup design, and could be used as is or as a baseline configuration (to be further modified). Importing a profile 1026 enables a user to import a profile previously created and exported using the OEM specific software system 252.

The profiles list 1028 lists any profiles accessible to the user (e.g., by previous creation, by access rights, etc.), and may also display related information. For example, as illustrated in profile management page 1000 of FIG. 10, Profile_1 1030 is listed in the profiles list 1028 and includes the status (e.g., OK) as of a particular date and time (e.g., 31/May/2016 05:16:35).

Figure 11:
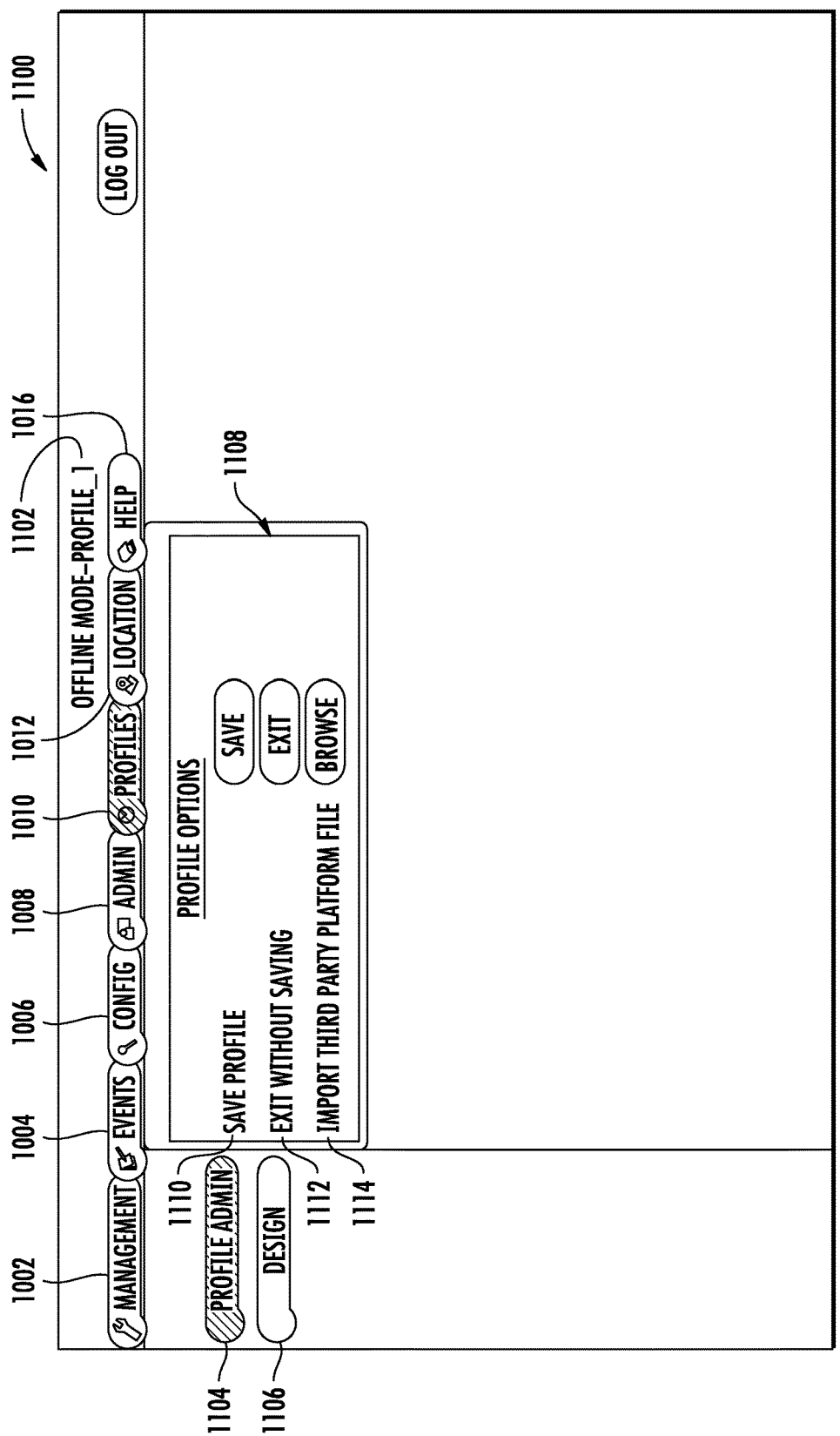
FIG. 11 is an exemplary profile management page provided by the OEM specific software system of the HEU of the real DAS of FIGS. 2 and 3 illustrating profile options.

FIG. 11 is an exemplary profile management page 1100 provided by the OEM specific software system 252 of the HEU 208 of the real DAS 200 of FIGS. 2 and 3 illustrating profile options. More specifically, once a profile has been created, edited, and/or selected, the OEM specific software system 252 shifts to offline mode, and a profile status 1102 of the profile or the system is provided (e.g., Offline mode-Profile_1, "Operating in Offline Mode", etc.). The profile status 1102 notifies the user as to whether the profile is offline (not live) or online (live). Additionally, or alternatively, a color coded background can be used to indicate that the user (e.g., designer) is working within a virtual DAS rather than on an active or live DAS.

The OEM specific software system 252 also provides a profile administration subtab 1104 and a design subtab 1106. Under the profile administration subtab 1104 is a profile options area 1108 providing a GUI for the user to save a profile 1110, exit without saving 1112, and/or import a third party platform file 1114 containing location maps used to graphically display the geographical location of the site (e.g., building) and the layout of each floor. The maps are utilized and displayed in the "Location" main menu screen, where remotes (e.g., RAU, MRU) can be assigned and placed on the maps, representing their actual physical location in the floor plan.

Figure 12:
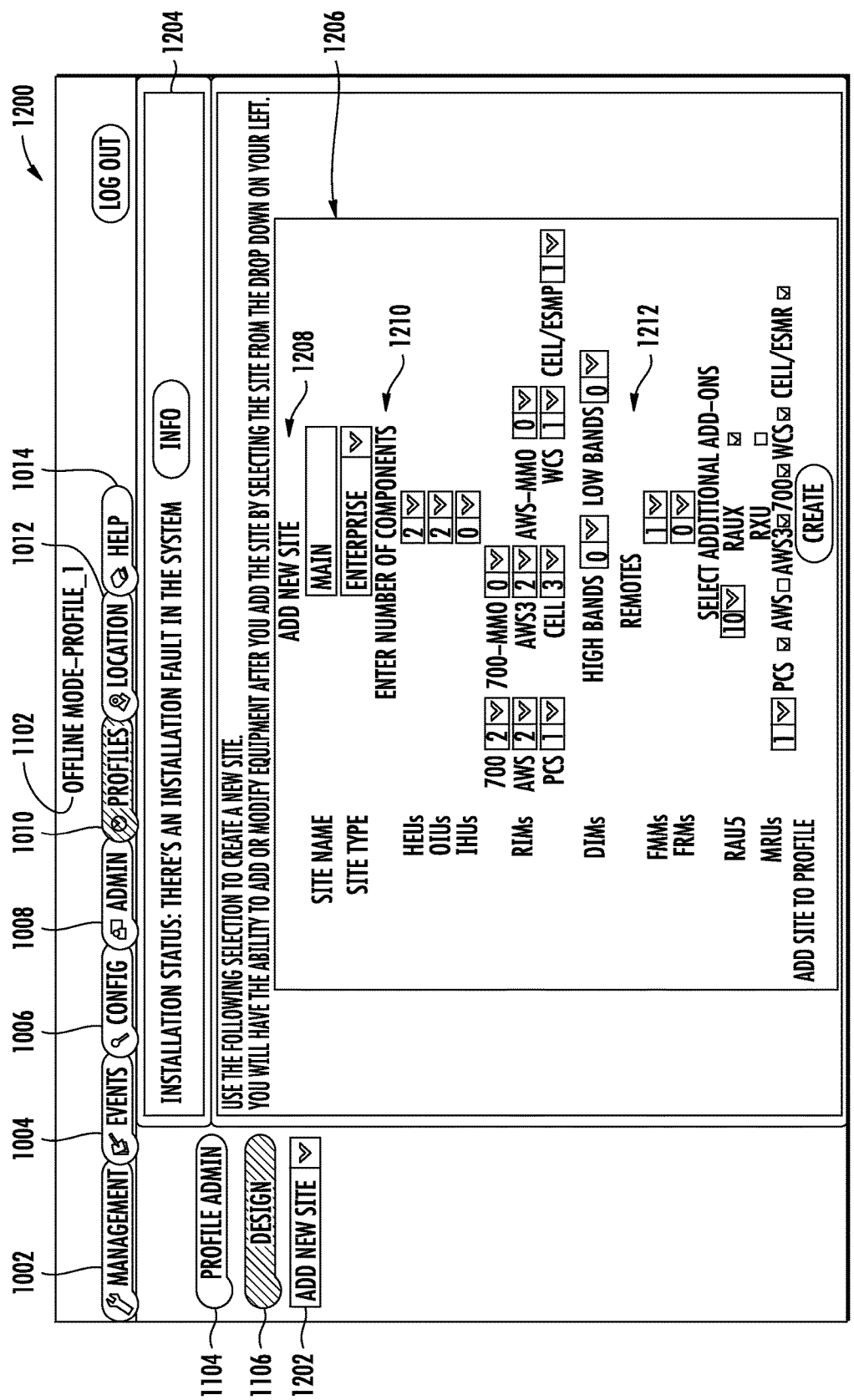
FIG. 12 is an exemplary profile management page provided by the OEM specific software system of the HEU of the real DAS of FIGS. 2 and 3 illustrating addition of a new site to a virtual DAS (profile)

FIG. 12 is an exemplary profile management page 1200 provided by the OEM specific software system 252 of the HEU 208 of the real DAS 200 of FIGS. 2 and 3 illustrating addition of a new site to a virtual DAS (profile). Under the design subtab 1106, the OEM specific software system 252 electronically provides a GUI for a user to design a virtual DAS (e.g., add or edit new sites). More specifically, the profile management page 1200 provides a field for a user to add a new site 1202, provides the installation status 1204 of the new site, and provides a new site options area 1206. The new site options area 1206 provides a number of options and settings for configuring the new site, such as an add new site general information section 1208, a number of components section 1210, and/or remotes information section 1212, etc. For example, under the add new site general information section 1208, a user can input the site name (e.g., main), the site type (e.g., enterprise), etc. Under the number of components section 1210, a user can input the number of HEUs (e.g., 0-4), the number of OIUs (e.g., 0-4), the number of IHUs (e.g., 0-2), RIMs information, and/or DIMs information, etc. More specifically, the RIMs information could include the number of different types of RIMs, such as for each supported service to be installed (e.g., 0-48). For example, a user could input the number of RIMs to support 700, 700-MMO, AWS, AWS3, AWS-MMO, PCS, CELL, WCS, and/or CELL/ESMP, etc.

The remotes information section 1212 enables a user to input the number of FMMs (e.g., 0-8) and/or the number of FRMs (e.g., 0-8), as well as select any additional add-ons, such as input the number of RAU5 units (e.g., 0-144), enable (or disable) the RAUX option if installed, enable (or disable) the RXU option if installed, etc. The remotes information section 1212 may also enable the user to input the number of MRUs (0-144) and/or select the bands supported by the one or more MRUs (e.g., PCS, AWS, AWS3, 700, WCS, Cell/ESMR, etc.).

Figure 13:
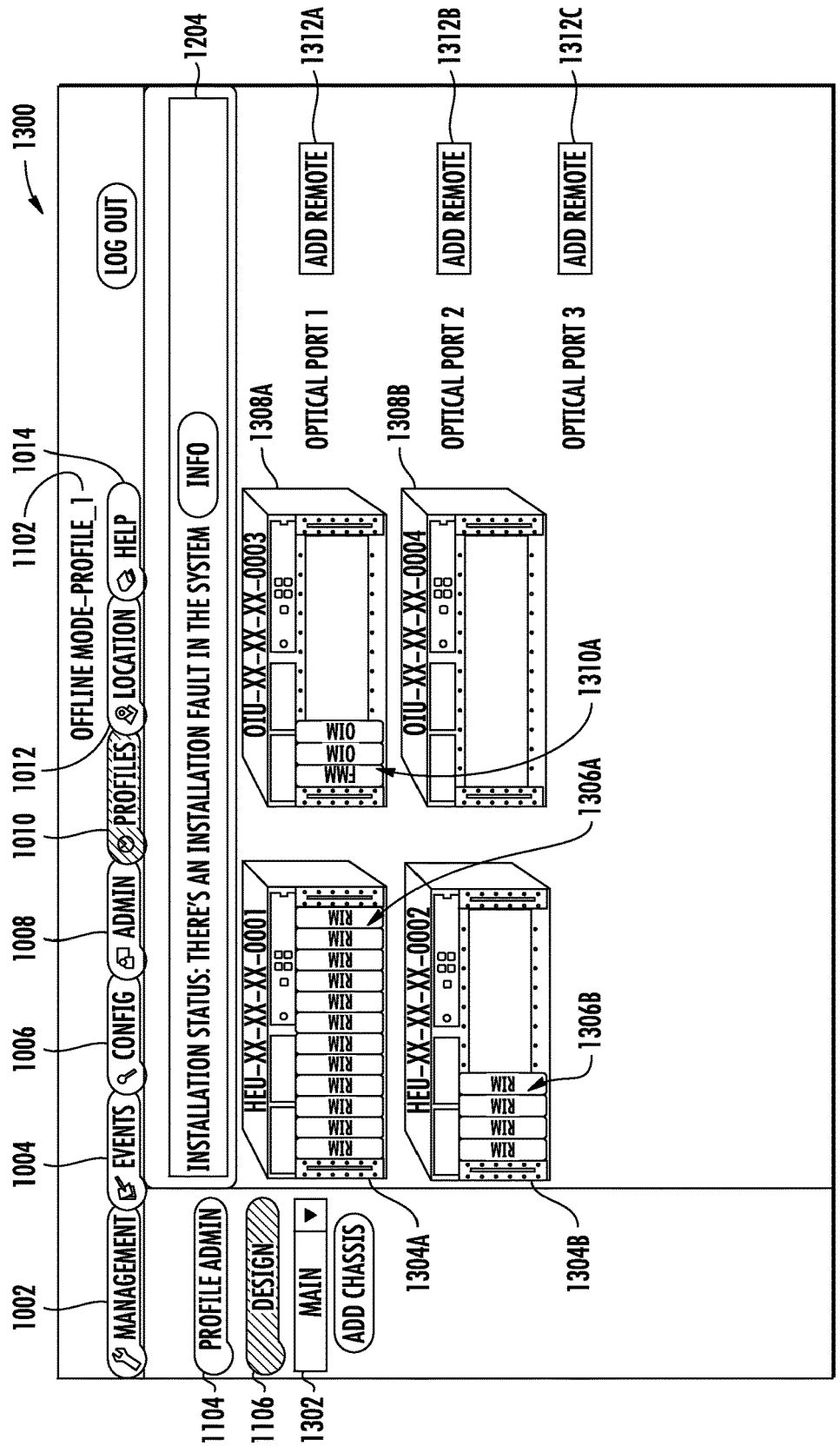
FIG. 13 is an exemplary profile management page provided by the OEM specific software system of the HEU of the real DAS of FIGS. 2 and 3 illustrating defining site elements for a site.

FIG. 13 is an exemplary profile management page 1300 provided by the OEM specific software system 252 of the HEU 208 of the real DAS 200 of FIGS. 2 and 3 illustrating defining site elements for a site. More specifically, the profile management page 1300 illustrates configuring (e.g., added, moved, removed, changed, etc.) a chassis and modules of a site (e.g., if the profile is based on a baseline configuration). In particular, illustrated is a chassis drop down menu 1302 to add a chassis (e.g., to add a particular type of chassis). As shown, the exemplary profile includes a first HEU module 1306A with first HEU modules 1306A, a second HEU chassis 1306B with second HEU modules 1306B, a first OIU chassis 1308A with first OIU chassis modules 1310A, and a second OIU chassis 1308B. Further, the exemplary profile includes first optical port 1312A, second optical port 1312B, and third optical port 1312C. As shown, the optical ports 1312A, 1312B, 1312C have not yet been configured.

FIGS. 14A-14K are exemplary profile management pages provided by the OEM specific software system 252 of the HEU 208 of the real DAS 200 of FIGS. 2 and 3 illustrating adding, editing, and/or removing a chassis and/or module. In particular, the OEM specific software system 252 enables a user to select the type of chassis, the type of modules therein, the placement of those modules within the chassis, etc.

Figure 14A:
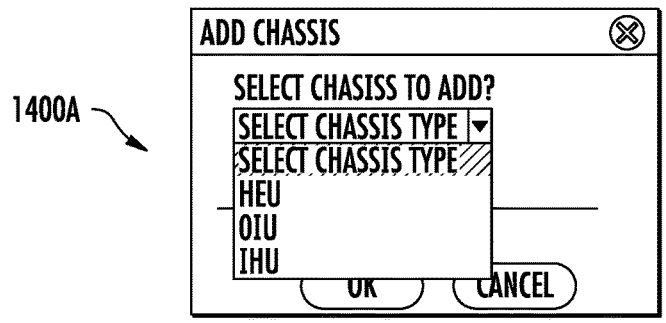
FIGS. 14A-14K are exemplary profile management pages provided by the OEM specific software system of the HEU of the real DAS of FIGS. 2 and 3 illustrating adding, editing, and/or removing a chassis and/or module from a site in a virtual DAS (profile)
Figure 14B:
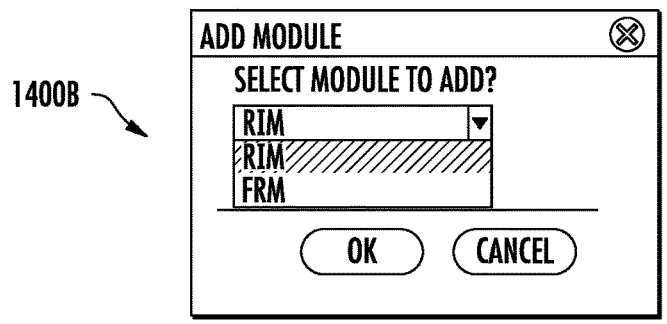
Figure 14C:
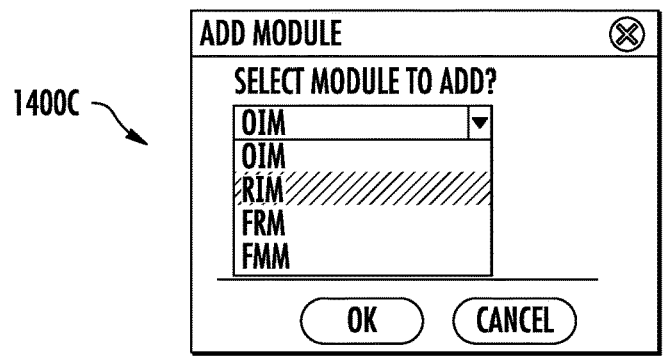
Figure 14D:
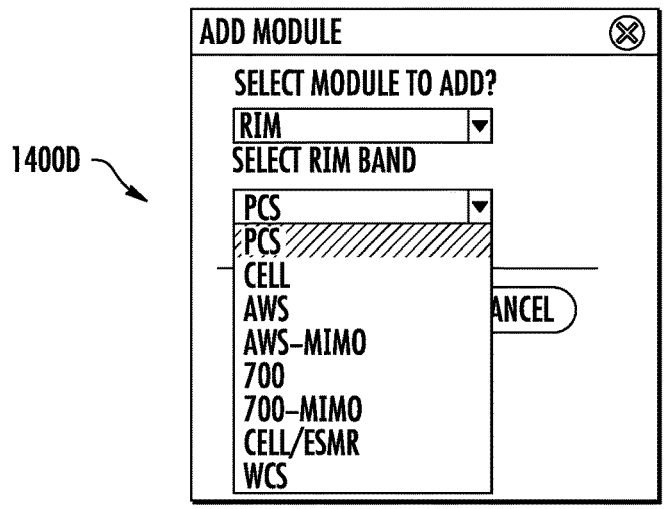
Figure 14E:
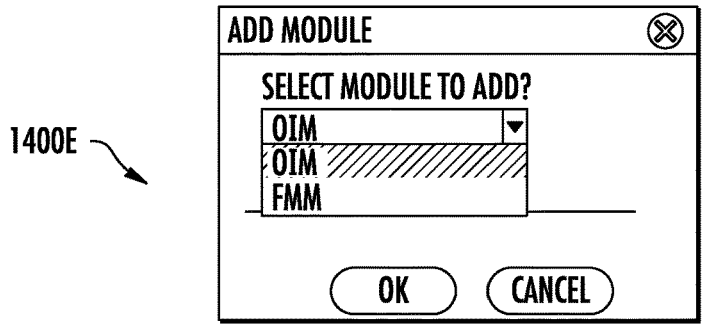
Figure 14F:
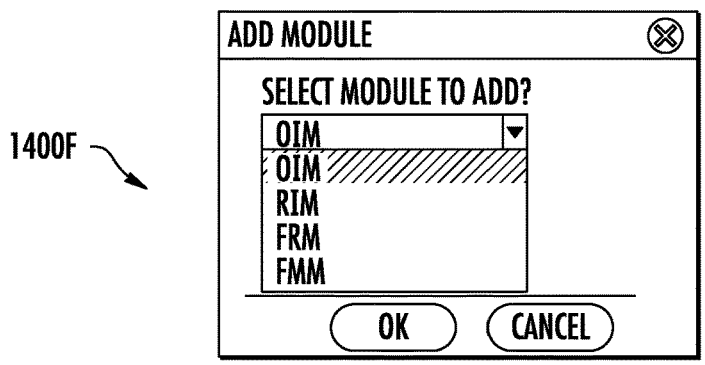
Figure 14G:
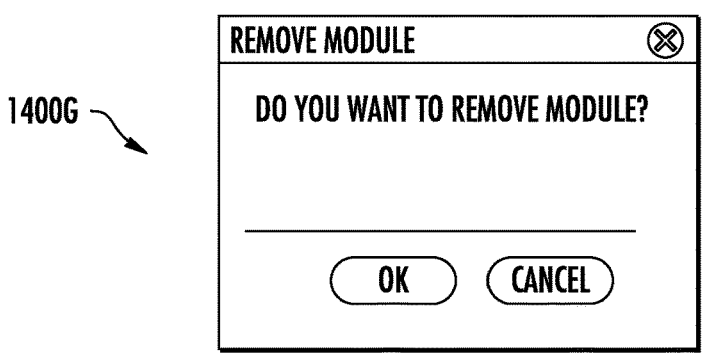
Figure 14H:
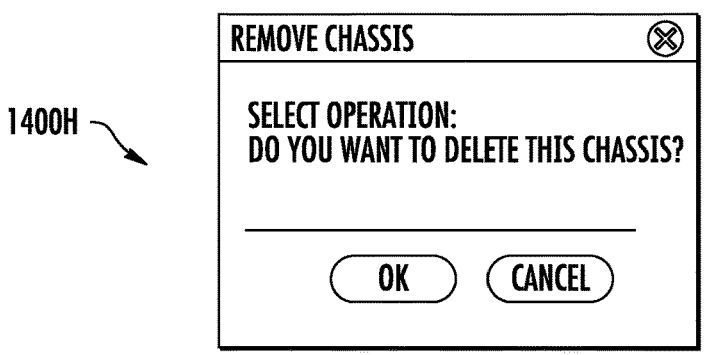
Figure 14I:
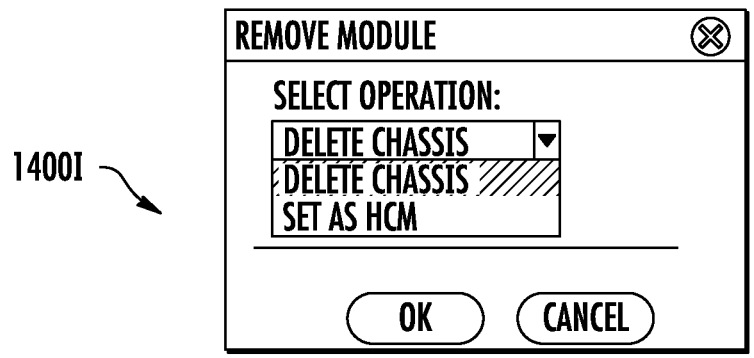
Figure 14J:
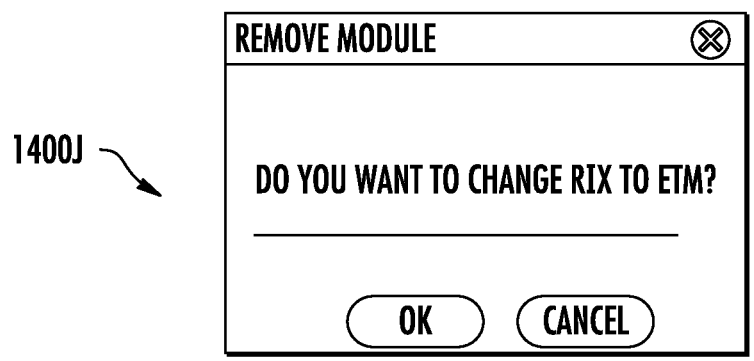
Figure 14K:
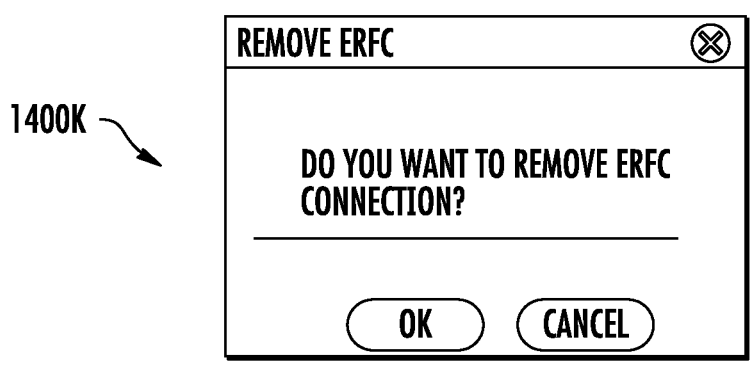

In this regard, FIG. 14A is a chassis submenu 1400A enabling a user to select the type of chassis to add (e.g., HEU, OIU, IHU, etc.). FIG. 14B is a module submenu 1400B enabling a user to select a type of module to add (e.g., RIM, FRM) for an HEU chassis. FIG. 14C is a module submenu 1400C enabling a user to select a type of module to add (e.g., RIM, FRM, FMM, etc.) for an IHU chassis. FIG. 14D is a module submenu 1400D enabling a user to select the RIM band (e.g., PCS, CELL, AWS, AWS-MIMO, 700, 700-MIMO, CELL/ESMR, WCS, etc.) for a RIM module. FIG. 14E is a module submenu 1400E enabling a user to add a module (e.g., OIM, FMM, etc.) for an OIU chassis. FIG. 14F is a module submenu 1400F enabling a user to add a module (e.g., OIM, RIM, FRM, FMM, etc.) for an IHU chassis. FIG. 14G is a module submenu 1400G enabling a user to remove a module. FIG. 14H is a chassis submenu 1400H enabling a user to delete a chassis. FIG. 14I is a module submenu 1400I enabling a user to set a control module as the HCM, such as by selecting a module and the OEM specific software system 252 presenting a number of operation options to a user (e.g., delete chassis, set as HCM, etc.). FIG. 14J is a module submenu 1400J enabling a user to change RIX/OIX to ETM. FIG. 14K is a module submenu 1400K enabling a user to remove an ERFC connection (e.g., of an RIX or OIX).

Figure 15:
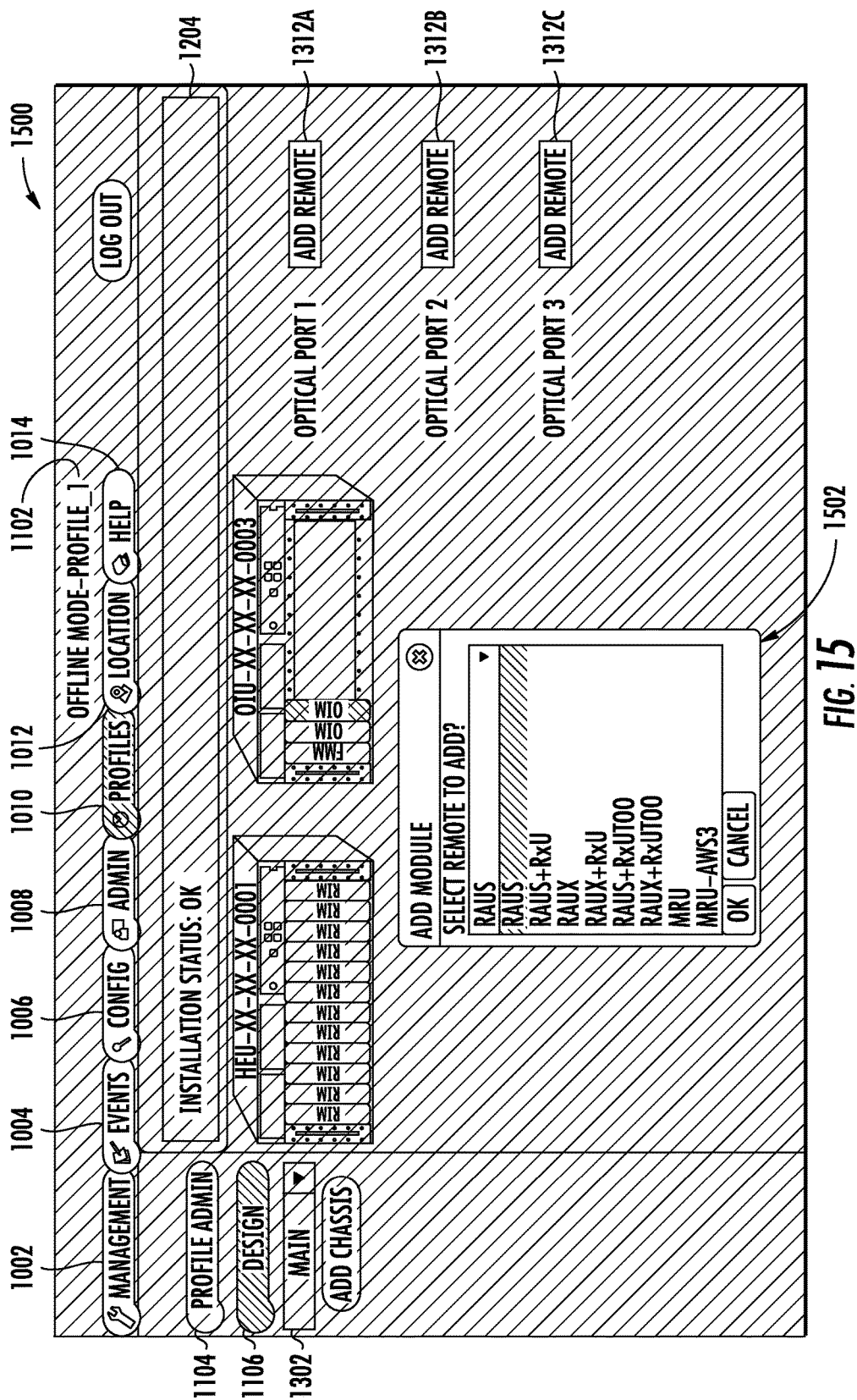
FIG. 15 is an exemplary profile management page provided by the OEM specific software system of the HEU of the real DAS of FIGS. 2 and 3 illustrating addition of a remote to a virtual DAS (profile)

FIG. 15 is an exemplary profile management page 1500 provided by the OEM specific software system 252 of the HEU 208 of the real DAS 200 of FIGS. 2 and 3 illustrating addition of a remote to a virtual DAS (profile). As shown, the profile also includes a first optical port 1312A, a second optical port 1312B, and a third optical port 1312C. Each of the optical ports 1312A, 1312B, 1312C enable a user to add a remote to the optical port 1312A, 1312B, 1312C by add module subwindow 1502, which includes a drop down menu of types of remotes to add (e.g., RAUS, RAUS+RXU, RAUX, RAUX+RXU, RAUS+RXUTOO, RAUX+TOO, MRU, MRU-AWS3, etc.).

Figure 16:
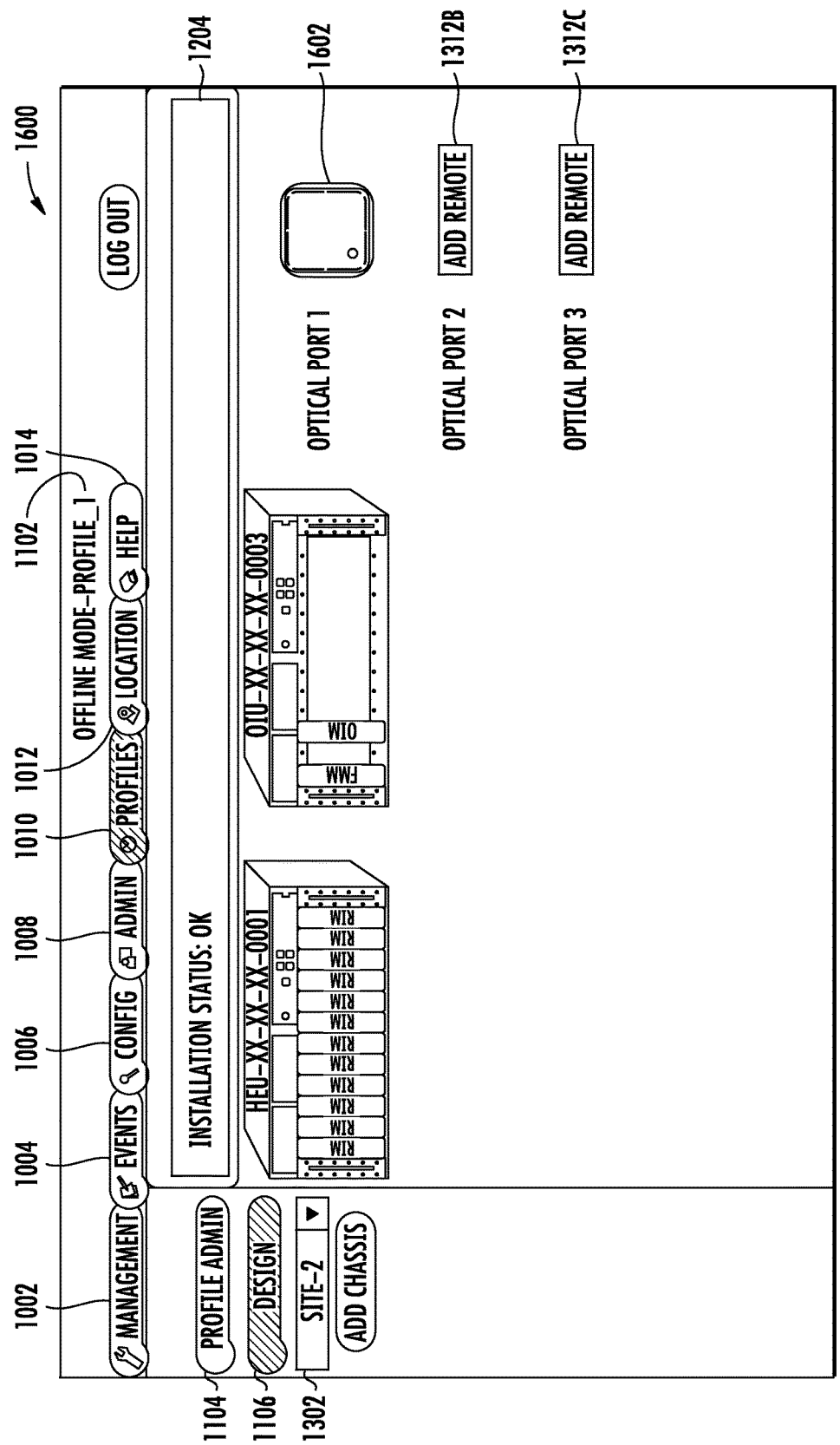
FIG. 16 is an exemplary profile management page provided by the OEM specific software system of the HEU of the real DAS of FIGS. 2 and 3 after a remote has been added to the virtual DAS (profile)

FIG. 16 is an exemplary profile management page 1600 provided by the OEM specific software system 252 of the HEU 208 of the real DAS 200 of FIGS. 2 and 3 after a remote 1602 has been added to the virtual DAS (profile) (e.g., at a first optical port 1512A).

Figure 17:
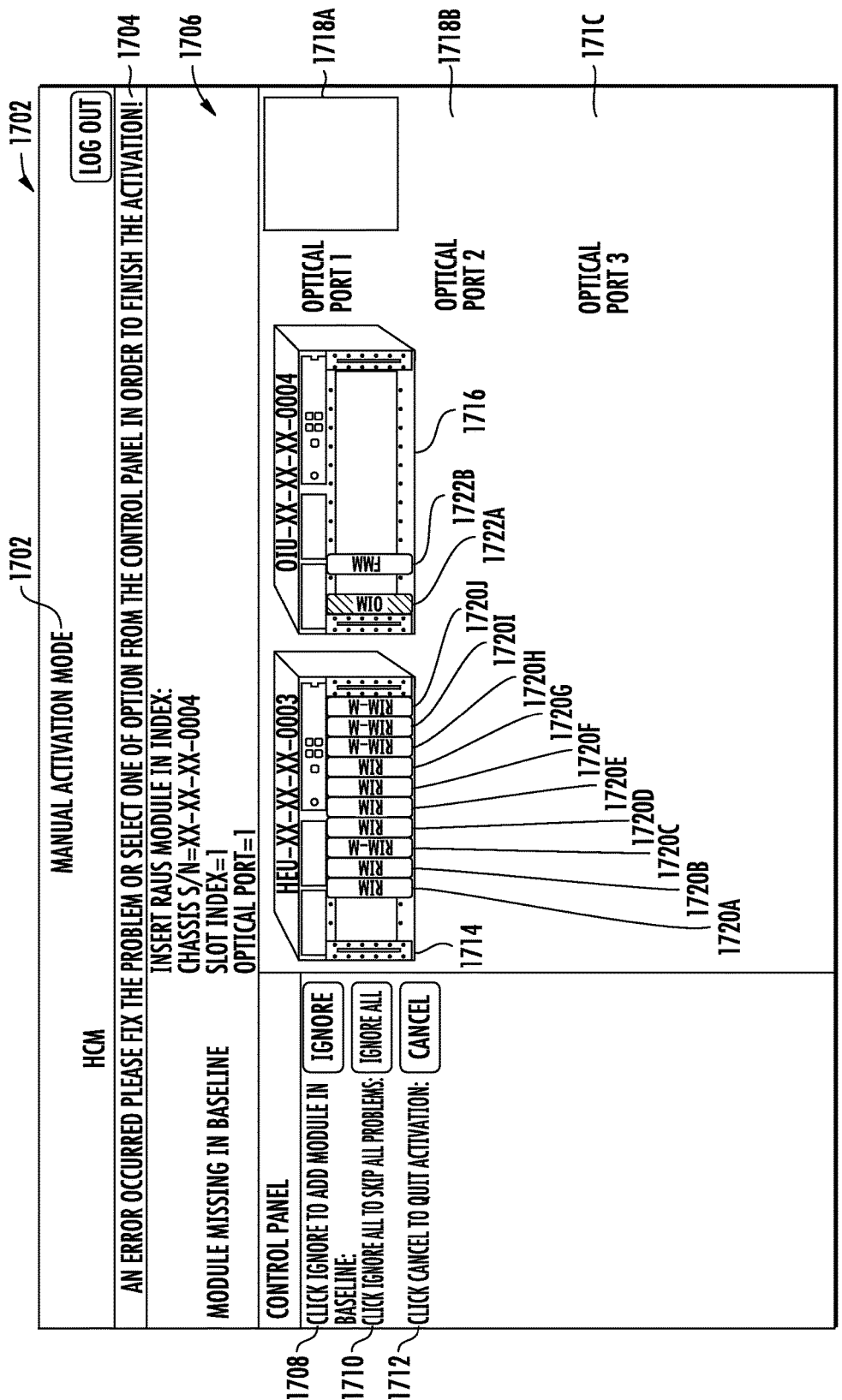
FIG. 17 is an exemplary profile management page provided by the OEM specific software system of the HEU of the real DAS of FIGS. 2 and 3 illustrating manual activation of a virtual DAS (profile)

FIG. 17 is an exemplary profile management page 1700 provided by the OEM specific software system 252 of the HEU 208 of the real DAS 200 of FIGS. 2 and 3 illustrating manual activation of a virtual DAS (profile). More specifically, manual activation mode 1702 may be required if an error is found in the profile at the time of activation of the profile. The manual activation mode 1702 of the OEM specific software system 252 includes an error alert section 1704 to alert a user that an error was found (e.g., "An error occurred please fix the problem or select one of option from the control panel in order to finish the activation"). The OEM specific software system 252 then guides a user through each detected error that requires correction at the correction guide section 1706. A user can click the ignore button 1708 to ignore the error currently displayed and continue to the next error. A user can click the ignore all button 1710 to skip all minor errors that prevent the profile from being successfully activated. A user can click the cancel button 1712 to quit manual activation and return to another screen. The OEM specific software system 252 notifies the user once all the errors are corrected or, at the minimum, if all the major errors are corrected.

Figure 18:
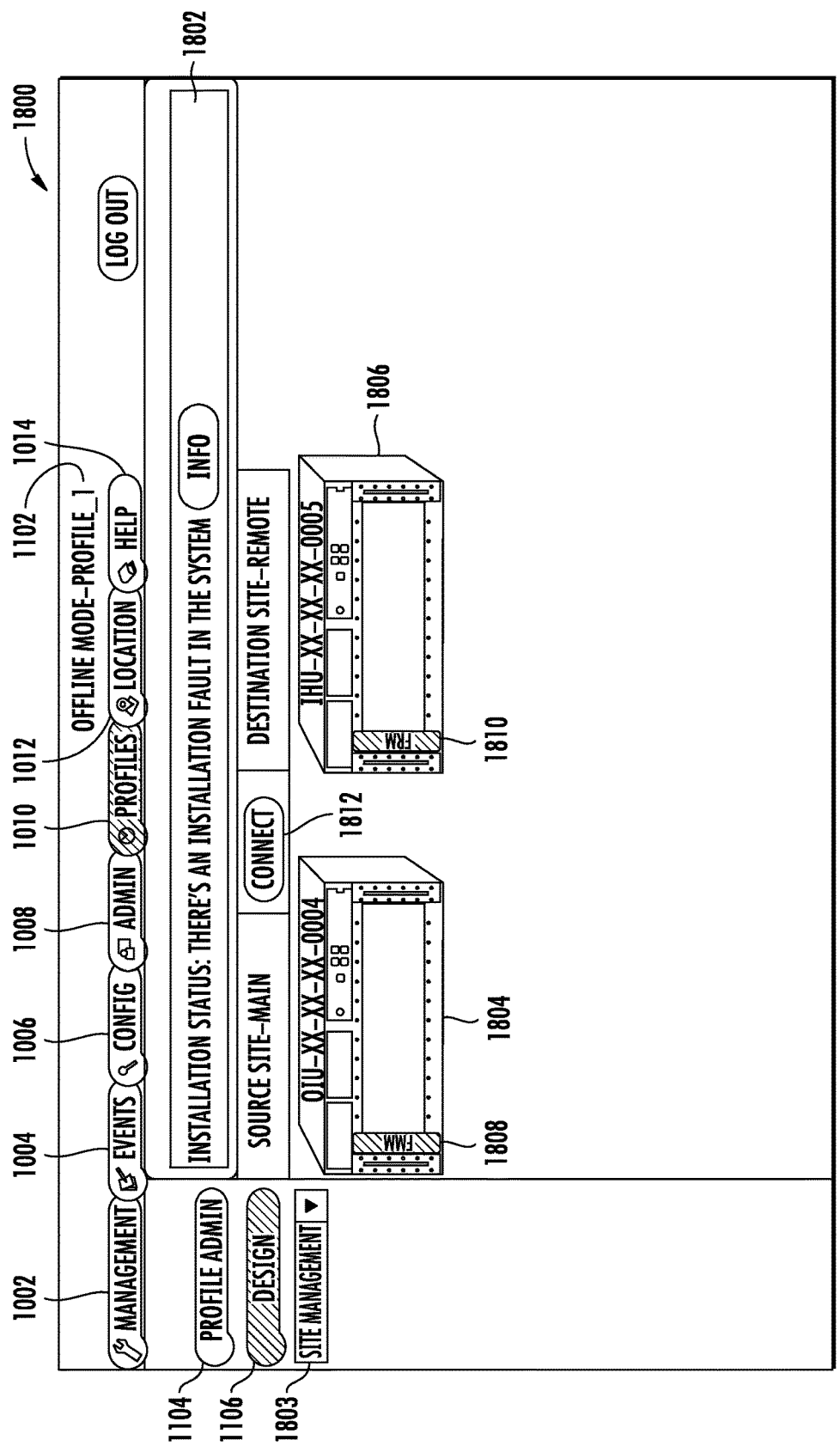
FIG. 18 is an exemplary profile management page provided by the OEM specific software system of the HEU of the real DAS of FIGS. 2 and 3 illustrating connecting fiber main modules (FMM) to fiber remote modules (FRM) in a virtual DAS (profile)

FIG. 18 is an exemplary profile management page 1800 provided by the OEM specific software system 252 of the HEU 208 of the real DAS 200 of FIGS. 2 and 3 illustrating connecting fiber main modules (FMM) to fiber remote modules (FRM) in a virtual DAS (profile). More specifically, the profile management page 1800 provides an installation status 1802 (e.g., "There's an installation fault in the system."). Using the OEM specific software system 252, and after all the sites are added to the profile, source and destination sites can be determined and connected, where each of the sites include the appropriate FMM and FRM modules for connectivity. A user can select the site management option 1803 under the design subtab 1106 under the profiles tab 1010. Using the OEM specific software system 252, a user can select a first module 1808 (e.g., FMM module) of a first chassis 1804 (e.g., OIU chassis) of a source site (e.g., source site-main) and then select a second module 1810 (e.g., FRM module) of a second chassis 1806 (e.g., IHU chassis) of a destination site (e.g., destination site-remote), and clicks the connect button 1812 to create an FMM-to-FRM connection between the two modules. The OEM specific software system 252 could guide a user through connecting the modules by indicating which modules are available for connection. For example, in certain embodiments, a gray module indicates that the module is available for connection, a green highlight indicates that the module is selected to be connected, etc.

Figure 19:
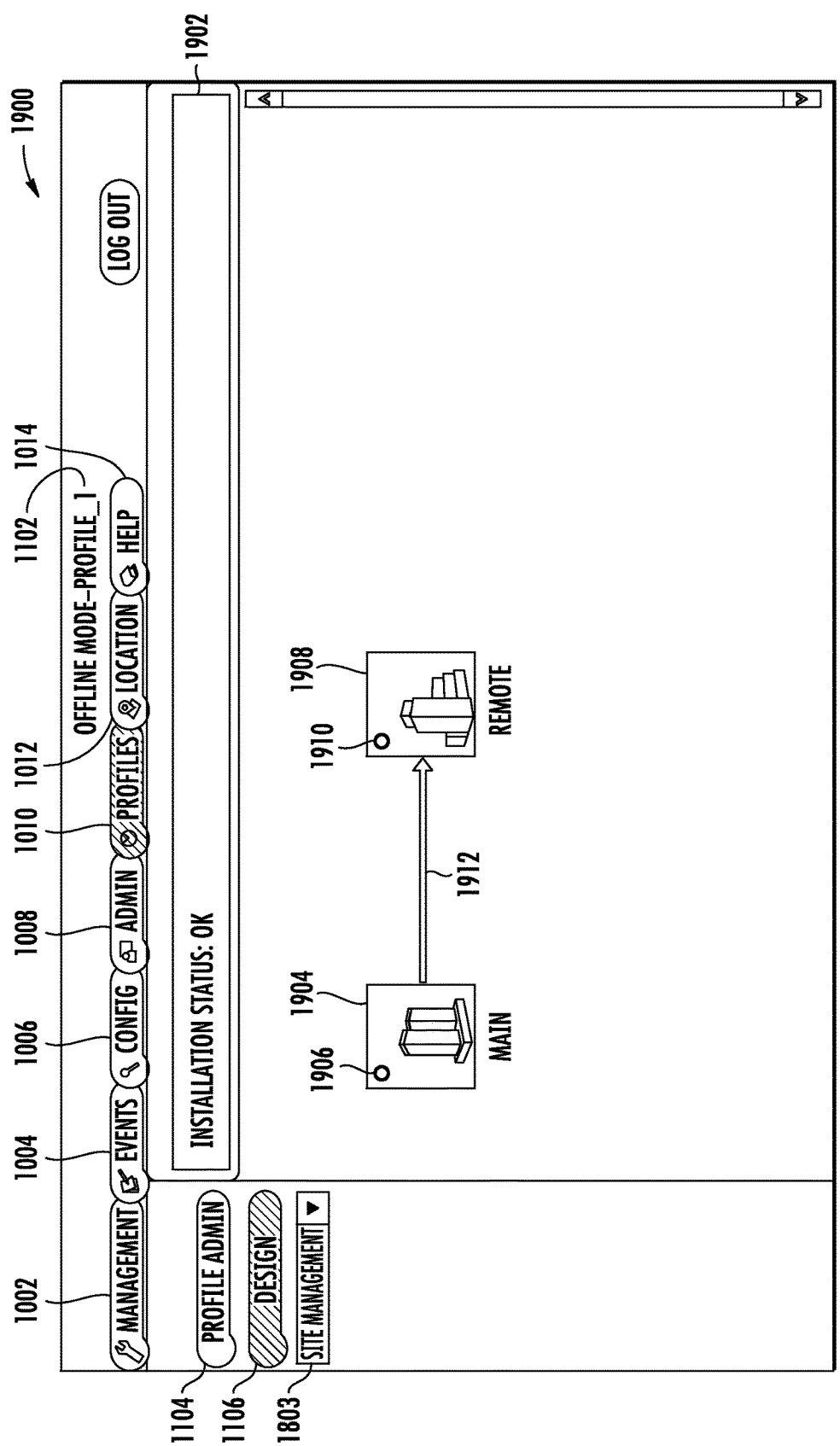
FIG. 19 is an exemplary profile management page provided by the OEM specific software system of the HEU of the real DAS of FIGS. 2 and 3 illustrating a successful connection between a source and destination site in a virtual DAS (profile)

FIG. 19 is an exemplary profile management page 1900 provided by the OEM specific software system 252 of the HEU 208 of the real DAS 200 of FIGS. 2 and 3 illustrating a successful connection between a source and destination site in a virtual DAS (profile). More specifically, the profile management page 1900 provides a main site icon 1904 with a main site status indicator 1906 (e.g., red if the site is not properly installed, green if the site is properly installed, etc.), and a remote site icon 1908 with a remote site status indicator 1910 (e.g., red if the site is not properly installed, green if the site is properly installed, etc.). Once the FMM-to-FRM connection between the two sites is properly configured, a connection indicator can be used to indicate a successful connection between the two sites (e.g., a red arrow if the connection is not properly configured, a green arrow if the connection is properly configured, etc.).

Figure 20:
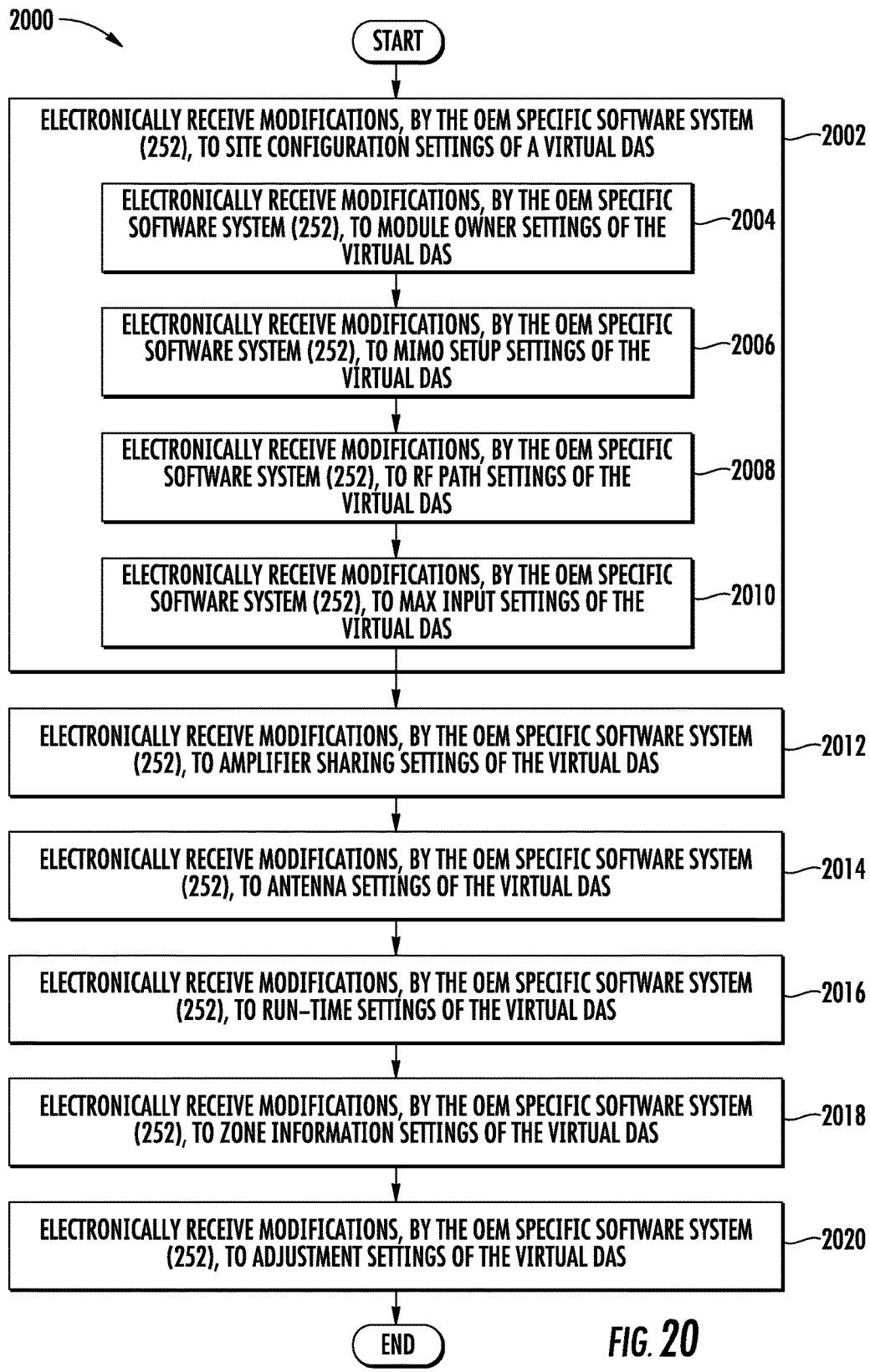
FIG. 20 is a flowchart illustrating an exemplary process for modifying site settings for commissioning at least one site in a virtual DAS (profile) using the OEM specific software system of the real DAS of FIGS. 2 and 3.

FIG. 20 is a flowchart of an exemplary process 2000 for modifying site settings for commissioning at least one site of a virtual DAS (profile) using the OEM specific software system 252 of the real DAS 200 of FIGS. 2 and 3. After defining the new site and selecting the system elements to be configured for the site, the user uses the OEM specific software system 252 to configure as many system parameters as possible (e.g., in offline mode) to provide a complete virtual DAS (e.g., system configuration profile) to be applied and installed upon activation. Note that the OEM specific software system 252 could provide an error message if the virtual DAS has any errors in the configuration. However, the exemplary process 2000 could also be specified after the profile is activated and the system is in online mode.

More specifically, in step 2002, the OEM specific software system 252 electronically receives modifications to the site configuration settings of a virtual DAS. The step may include several substeps. In certain embodiments, in substep 2004, the OEM specific software system 252 electronically receives modifications to module owner settings of the virtual DAS. In substep 2006, the OEM specific software system 252 electronically receives modifications to (multiple-input multiple-output) (MIMO) setup settings of the virtual DAS. In substep 2008, the OEM specific software system 252 electronically receives modifications to RF path settings of the virtual DAS. In substep 2010, the OEM specific software system 252 electronically receives modifications to max input settings of the virtual DAS.

Continuing to step 2012, the OEM specific software system 252 electronically receives modifications to amplifier sharing settings of the virtual DAS. In step 2014, the OEM specific software system 252 electronically receives modifications to antenna settings of the virtual DAS. In step 2016, the OEM specific software system 252 electronically receives modifications to run-time settings of the virtual DAS. In step 2018, the OEM specific software system 252 electronically receives modifications to zone information settings of the virtual DAS. In step 2020, the OEM specific software system 252 electronically receives modifications to adjustment settings of the virtual DAS, and the process 2000 ends.

Figure 21:
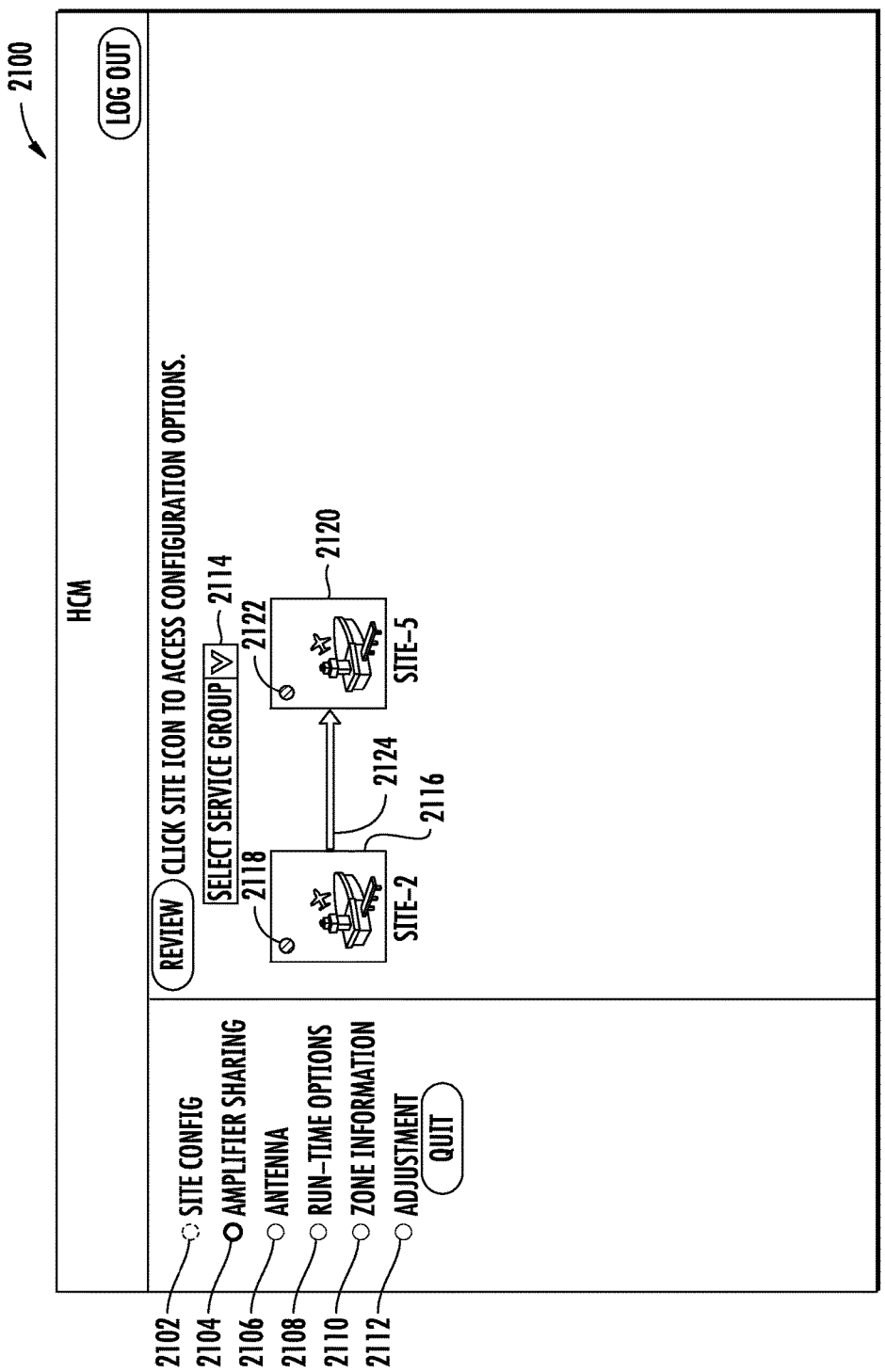
FIG. 21 is an exemplary site configuration page provided by the OEM specific software system of the HEU of the real DAS of FIGS. 2 and 3 illustrating site configuration settings for a site configuration phase.

FIGS. 21-25 are exemplary pages of a user interface of the OEM specific software system 252 for configuring a new profile (as similarly described in FIG. 20). More specifically, FIG. 21 is an exemplary site configuration page 2100 provided by the OEM specific software system 252 of the HEU 208 of the real DAS 200 of FIGS. 2 and 3 illustrating site configuration settings for a site configuration phase. As shown, the site configuration page 2100 comprises a number of configuration phases with status indicators. For example, in certain embodiments, the configuration phases comprise a site configuration phase 2102, an amplifier sharing phase 2104, an antenna configuration phase 2106, a run-time options phase 2108, a zone information phase 2110, an adjustment phase 2112, etc.

The configuration phase 2102 enables a user to configure site specific parameters. The amplifier sharing phase 2104 enables the user to allocate different percentages of amplification for same band RIMs. The antenna configuration phase 2106 enables a user to select the antenna source type (e.g., internal, external) for each of the installed modules (e.g., RAU/RAU5 units). The run-time options phase 2108 enables a user to expand and/or replace modules. The zone information phase 2110 enables a user to label each unit in the system to help classify and locate the different units (e.g., Building 1; Floor 1; Room 1). The adjustment phase 2112 enables a user to perform the adjustment procedure for uplink and downlink gains of the RIMs and OIMs, as well as to adjust the target output power of the services transmitted by the remote-end units.

In certain embodiments, the status indicator indicates to a user whether a particular phase is currently being configured (e.g., red as shown in the site configuration phase 2102), is completed (e.g., green as shown in the amplifier sharing phase 2104), or has not yet been performed (e.g., transparent as shown in the antenna configuration phase 2106, the run-time options phase 2108, the zone information phase 2110, and the adjustment phase 2112).

The site configuration page 2100 further includes a select service group drop down menu 2114 enabling a user to select a particular service group (as discussed in FIGS. 4 and 5). The site configuration page 2100 also includes a first site icon 2116 with a first site status indicator 2118, a second site icon 2120 with a second site status indicator 2122, and a connection indicator 2124 illustrating the status of the connection between the first site and the second site. A user can access configuration options for each of these sites (e.g., by clicking on the first site icon 2116 or the second site icon 2120).

Figure 22:
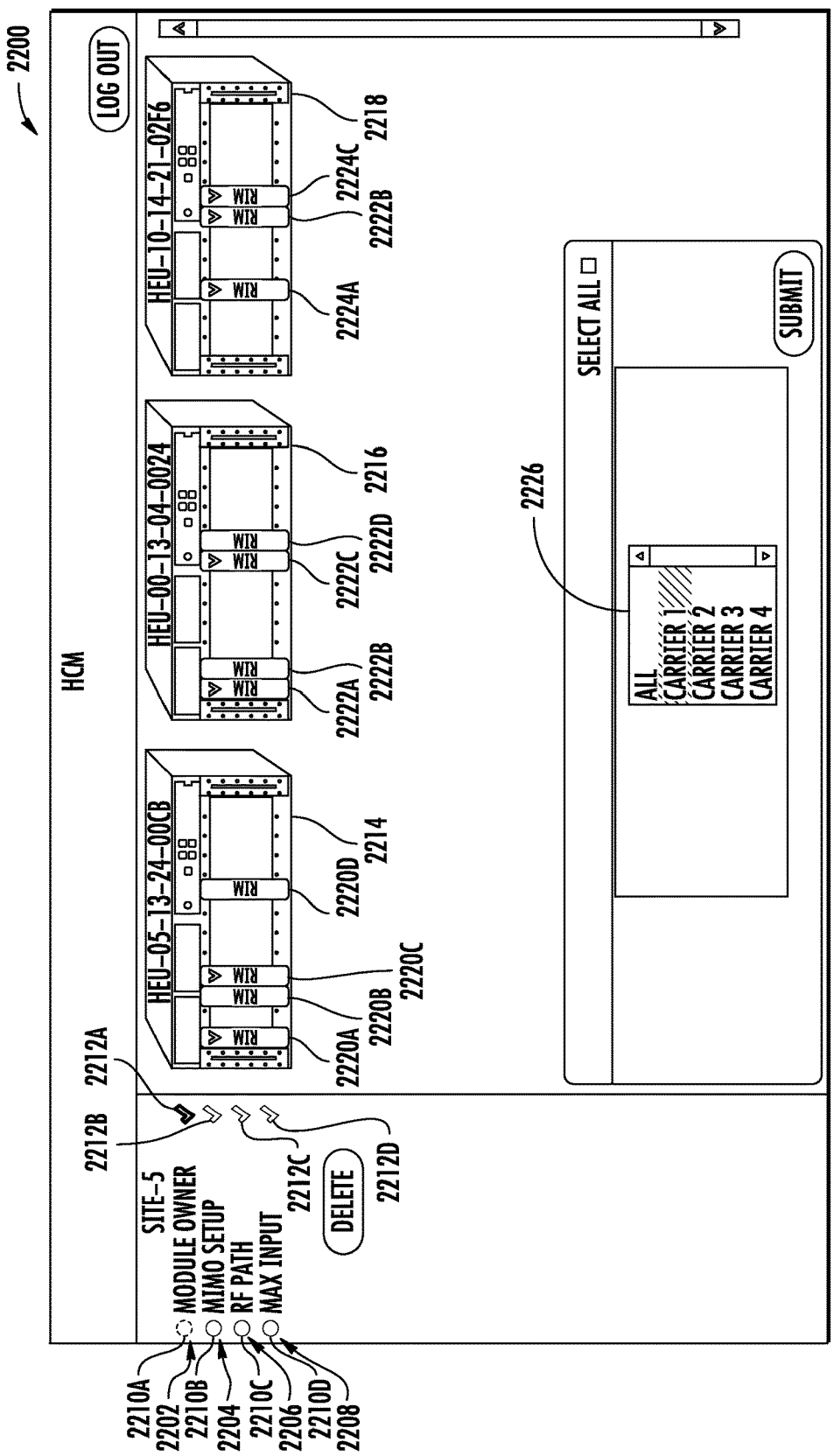
FIG. 22 is an exemplary site configuration page provided by the OEM specific software system of the HEU of the real DAS of FIGS. 2 and 3 illustrating a module owner subphase of the site configuration phase.

FIG. 22 is an exemplary site configuration page 2200 provided by the OEM specific software system 252 of the HEU 208 of the real DAS 200 of FIGS. 2 and 3 illustrating a module owner subphase of the site configuration phase. More specifically, the site configuration page 2200 provides a module owner subphase 2202 (with a first module owner status indicator 2210A and/or a second first module owner status indicator 2212A), a MIMO setup subphase 2204 (with a first module owner status indicator 2210B and/or a second first module owner status indicator 2212B), an RF path subphase 2206 (with a first module owner status indicator 2210C and/or a second first module owner status indicator 2212C), and/or a max input subphase 2208 (with a first module owner status indicator 2210D and/or a second first module owner status indicator 2212D).

The site configuration page 2200 could also include a first HEU chassis 2214 (with one or more modules 2220A-2220D), a second HEU chassis 2216 (with one or more modules 2222A-2222D), and/or a third HEU chassis 2218 (with one or more modules 2224A-2224C). Further, the site configuration page provides a carrier selection drop down menu 2226 requesting a user to select from one of a plurality of carriers (e.g., all, carrier 1, carrier 2, carrier 3, carrier 4, etc.). This enables a user to assign service specific RIM modules to one or more groups (e.g., corresponding to operators). The module owner subphase displays all connected HEUs and/or IHUs in a device view area. Unconfigured and unassigned RIM modules appear gray. All modules could be assigned to all groups or to specific groups (where groups include operators, carriers, etc.). Blue checkmarks could be applied to modules to indicate which modules are configured.

Figure 23:
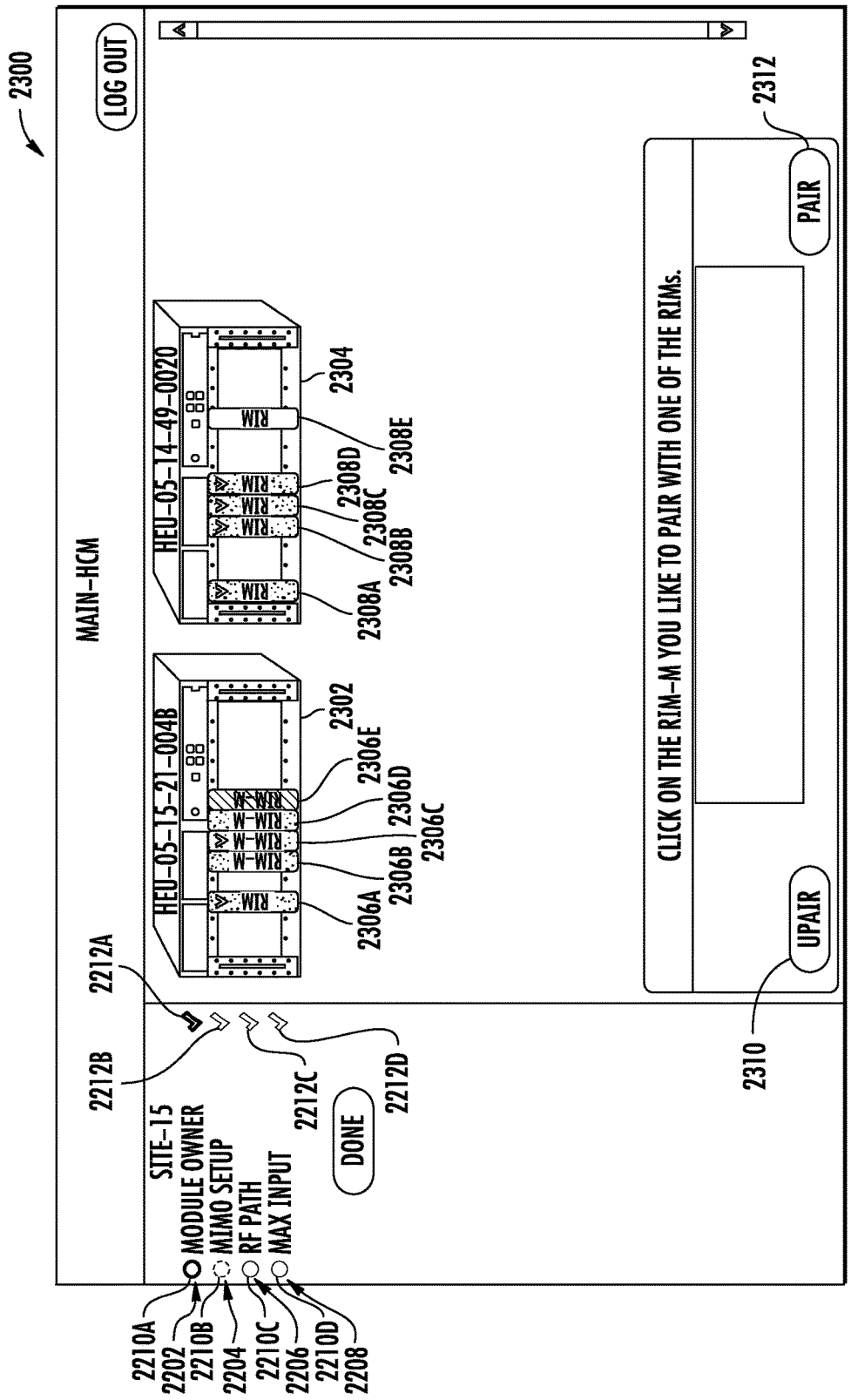
FIG. 23 is an exemplary site configuration page provided by the OEM specific software system of the HEU of the real DAS of FIGS. 2 and 3 illustrating a MIMO (multiple-input multiple-output) setup subphase of the site configuration phase.

FIG. 23 is an exemplary site configuration page 2300 provided by the OEM specific software system 252 of the HEU 208 of the real DAS 200 of FIGS. 2 and 3 illustrating a MIMO setup subphase of the site configuration phase. The MIMO setup subphase enables a user to configure the modules (e.g., RIM modules) for the MIMO paths.

As shown in FIG. 23, the site configuration page 2300 could include a first HEU chassis 2302 (with a plurality of modules 2306A-2306E) and a second HEU chassis 2304 (with a plurality of modules 2308A-2308E). Each of the modules could have one or more status indicators to indicate to a user the status of the modules. For example, each of the modules could include a first colored status indicator and/or a second status indicator. The first colored status indicator could include green (e.g., to indicate a selected module), gray (e.g., to indicate a not selected module), and/or transparent (e.g., to indicate a disabled or disconnected module). The second status indicator could be a checkmark (e.g., a blue checkmark) to indicate if a module has been assigned and configured.

A user can select a first module (e.g., RIM-M module 2306E) in the first chassis 2302, and a second module (e.g., RIM module 2308E) in the second chassis 2304, and then indicate whether the two modules should be disconnected (e.g., by clicking a UPAIR button 2310) or connected (e.g., by clicking a PAIR button 2312). In this way, for example, the user can connect pairs of RIM-M and RIM modules supporting the same band (e.g., AWS) which will then be extended to the corresponding remote unit (e.g., via the OIM). The OEM specific software system 252 can guide a user through connecting modules. For example, modules that are available for pairing can be identified to a user. When the RIM-M module 2306E in the first chassis 2302 is selected, the compatible RIM modules in the second chassis 2304 will appear gray (e.g., RIM module 2308E), and incompatible or unavailable modules will appear transparent (e.g., RIM modules 2308A-2308D).

Figure 24:
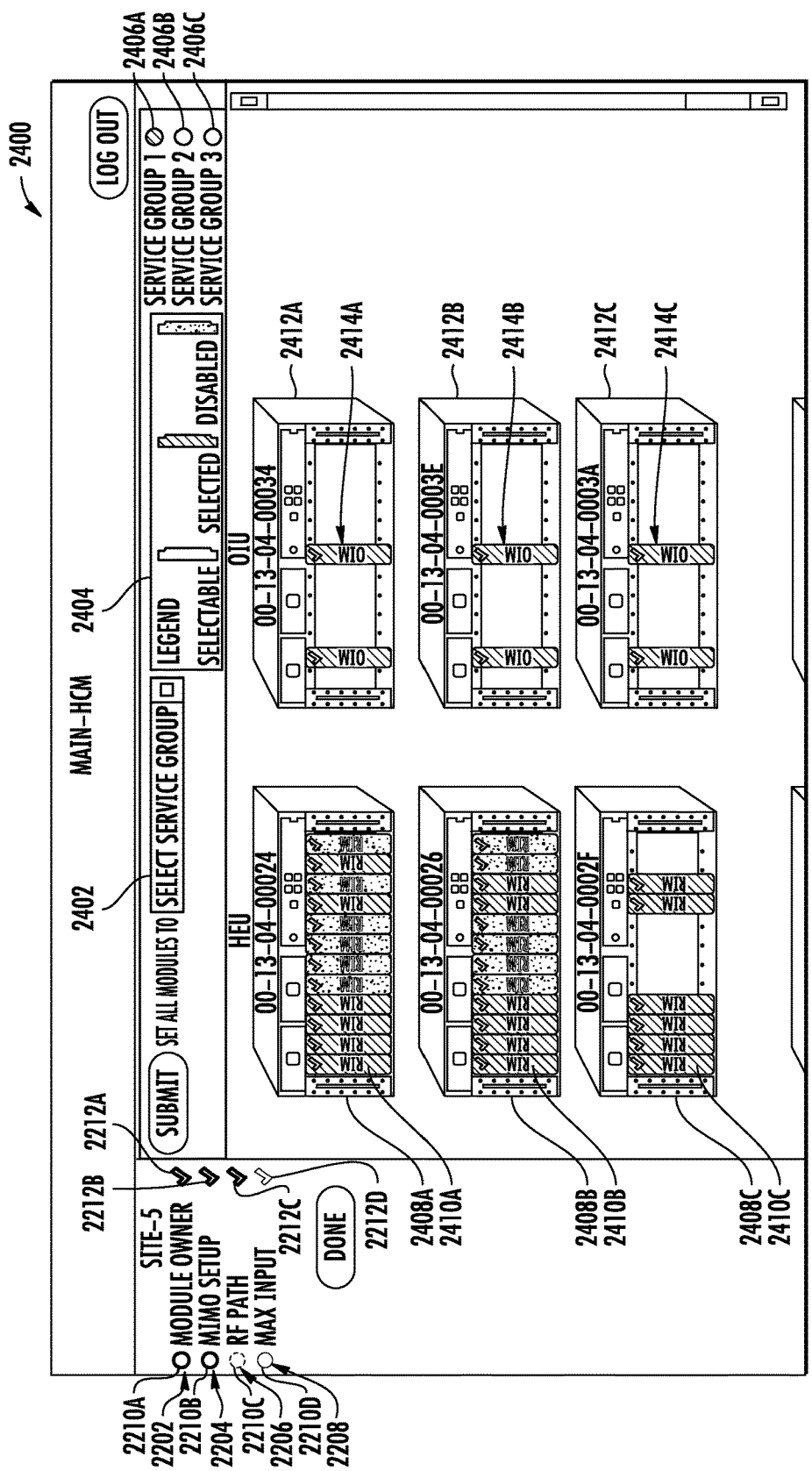
FIG. 24 is an exemplary site configuration page provided by the OEM specific software system of the HEU of the real DAS of FIGS. 2 and 3 illustrating RF path configuration setup subphase of the site configuration phase.

FIG. 24 is an exemplary site configuration page 2400 provided by the OEM specific software system 252 of the HEU 208 of the real DAS 200 of FIGS. 2 and 3 illustrating RF path configuration setup subphase of the site configuration phase (as discussed in FIGS. 4 and 5). The OEM specific software system 252 enables configuration of user controlled service groups, where each service group could be transferred to a specified remote site. As shown, the site configuration page 2400 provides a service group drop down menu 2402, and service group identifiers 2406A, 2406B, 2406C, displaying to a user which service group has been selected. Further, a module legend 2404 is provided that indicates whether a module is selectable, selected, and/or disabled, as shown in the first HEU chassis 2408A (with a plurality of first chassis modules 2410A), a second HEU chassis 2408B (with a plurality of first chassis modules 2410B), a third HEU chassis 2408C (with a plurality of first chassis modules 2410C), a first OIU chassis 2412A (with a plurality of first chassis modules 2414A), a second OIU chassis 2412B (with a plurality of first chassis modules 2414B), and a third OIU chassis 2412C (with a plurality of first chassis modules 2414C).

This arrangement could be used where different combinations of services are distributed at various locations on the same floor of a building according to coverage requirements. The RF path configuration setup subphase determines the services distributed at the remote site. Note that each RIM can be configured for all service groups, and each RIM can be assigned to each OIM in a service group. The OEM specific software system 252 could be configured such that selecting a RIM-M module automatically selects the connected RIM module as well, and configures the RIM module for the same service group.

Figure 25:
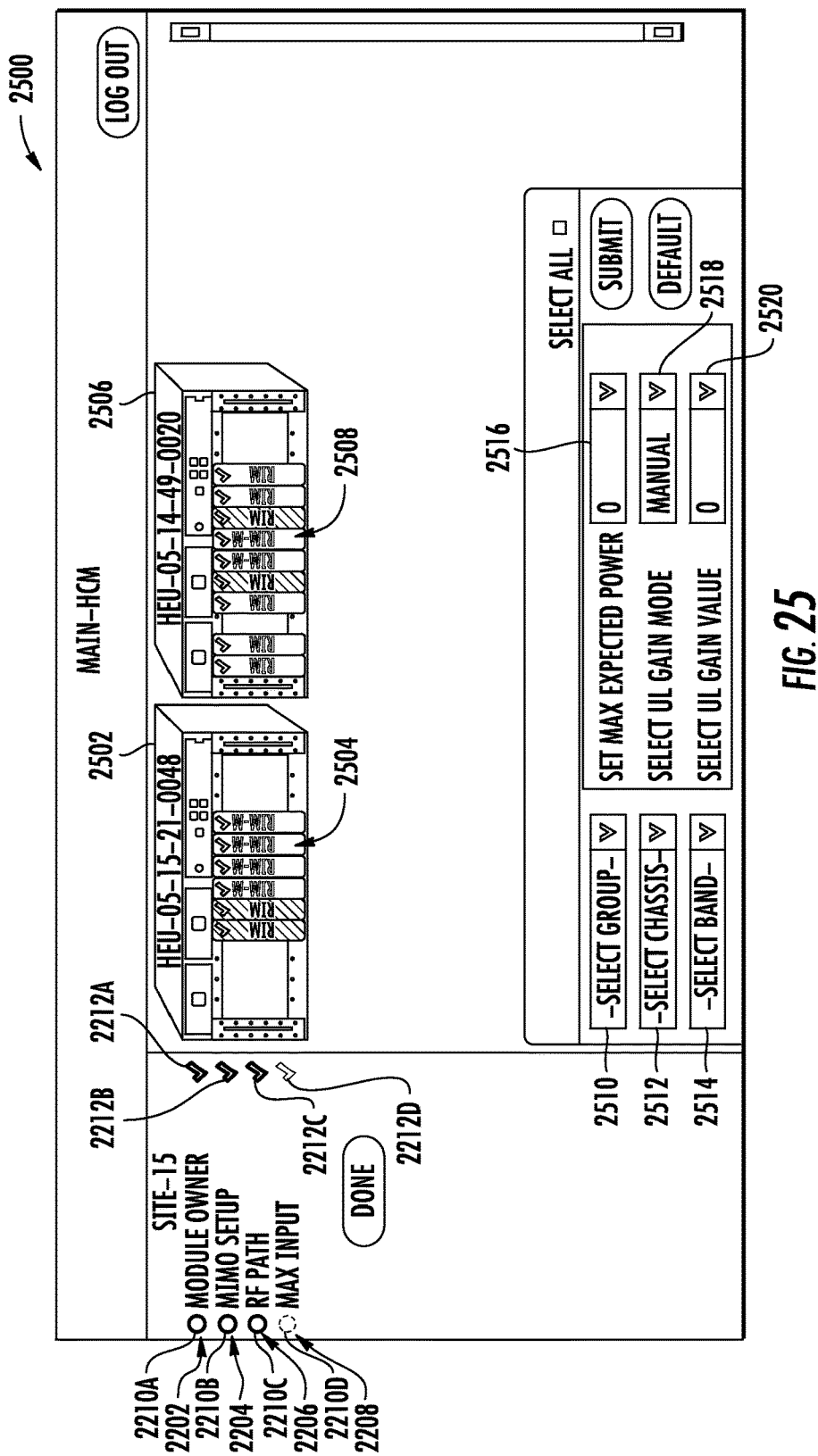
FIG. 25 is an exemplary site configuration page provided by the OEM specific software system of the HEU of the real DAS of FIGS. 2 and 3 illustrating a max-input configuration setup subphase of the site configuration phase.

FIG. 25 is an exemplary site configuration page 2500 provided by the OEM specific software system 252 of the HEU 208 of the real DAS 200 of FIGS. 2 and 3 illustrating a max-input configuration setup subphase of the site configuration phase. The max-input configuration setup subphase is used to set the DL maximum expected power (e.g., −10 to 37 dBm) for each RIM and the UL gain. The configured max expected power determines the maximum UL gain range enabled for configuration. As shown, the site configuration page 2500 includes a first chassis 2502 with a plurality of first chassis modules 2504, and a second chassis 2506 with a plurality of second chassis modules 2508. The exemplary site configuration page 2500 provides a plurality of drop down menus and/or fields for configuration of the max-input. More specifically, a select group drop down menu 2510, a select chassis drop down menu 2512, a select band drop down menu 2514, a set max expected power drop down menu 2516, a select UL gain mode drop down menu 2518 (e.g., manual, asymmetrical, etc.), a select UL gain value drop down menu 2520 (e.g., −28 dB to +15 dB). Here, and at other steps throughout, the OEM specific software system 252 enforces upon the profile OEM design constraints of real settings of equipment in the real DAS.

Figure 26:
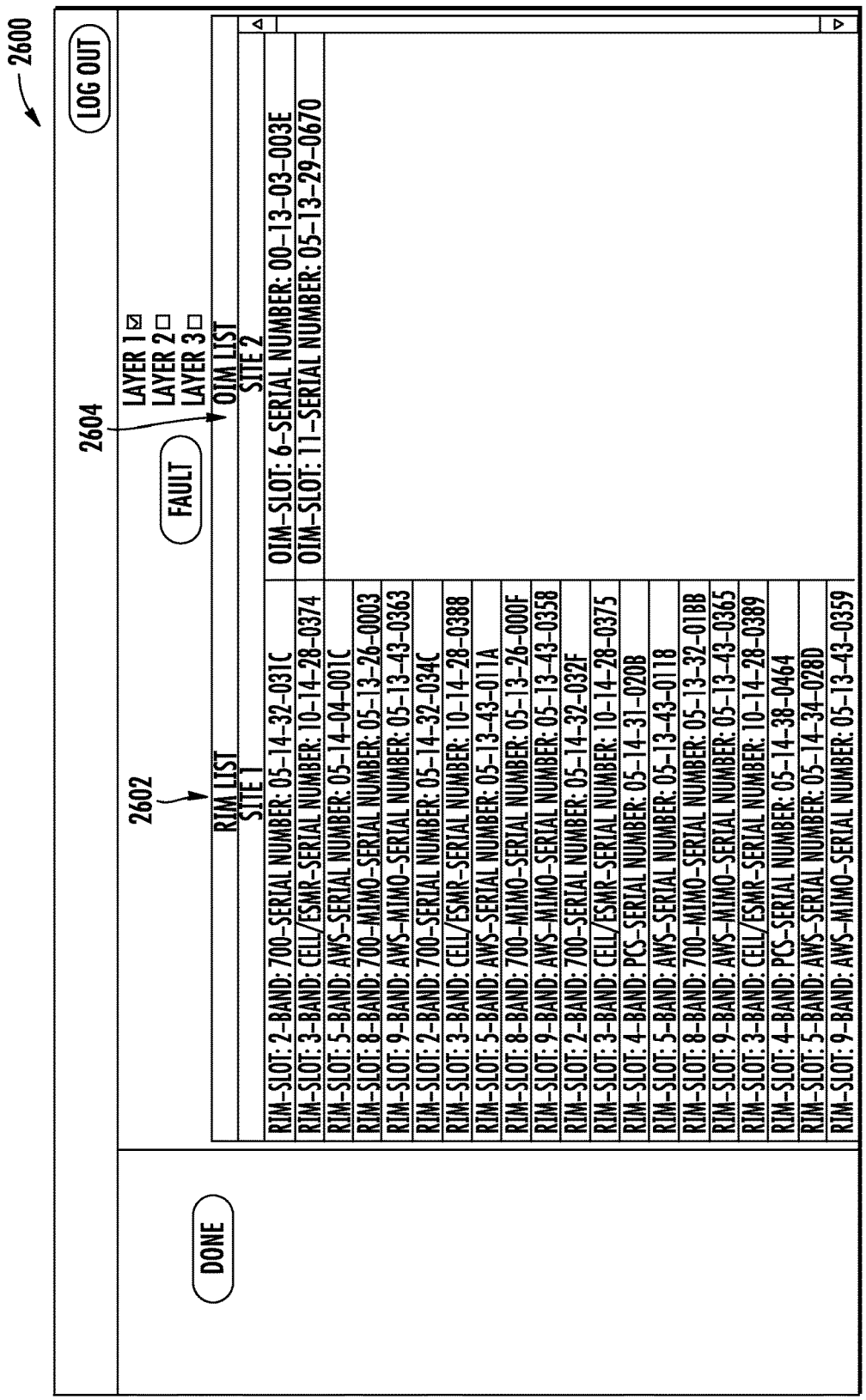
FIG. 26 is an exemplary site configuration page provided by the OEM specific software system of the HEU of the real DAS of FIGS. 2 and 3 illustrating a selected layer for a link RF path of the site configuration phase.

FIG. 26 is an exemplary site configuration page 2600 provided by the OEM specific software system 252 of the HEU 208 of the real DAS 200 of FIGS. 2 and 3 illustrating a selected layer for a link RF path of the site configuration phase. More specifically, the site configuration page 2600 includes a first site RIM list 2602 and a second site OIM list 2604. This enables the user to select service groups to be distributed between the linked sites and open the RF path for the link (e.g., for campus connectivity topologies with FMM-FRM modules.

Figure 27:
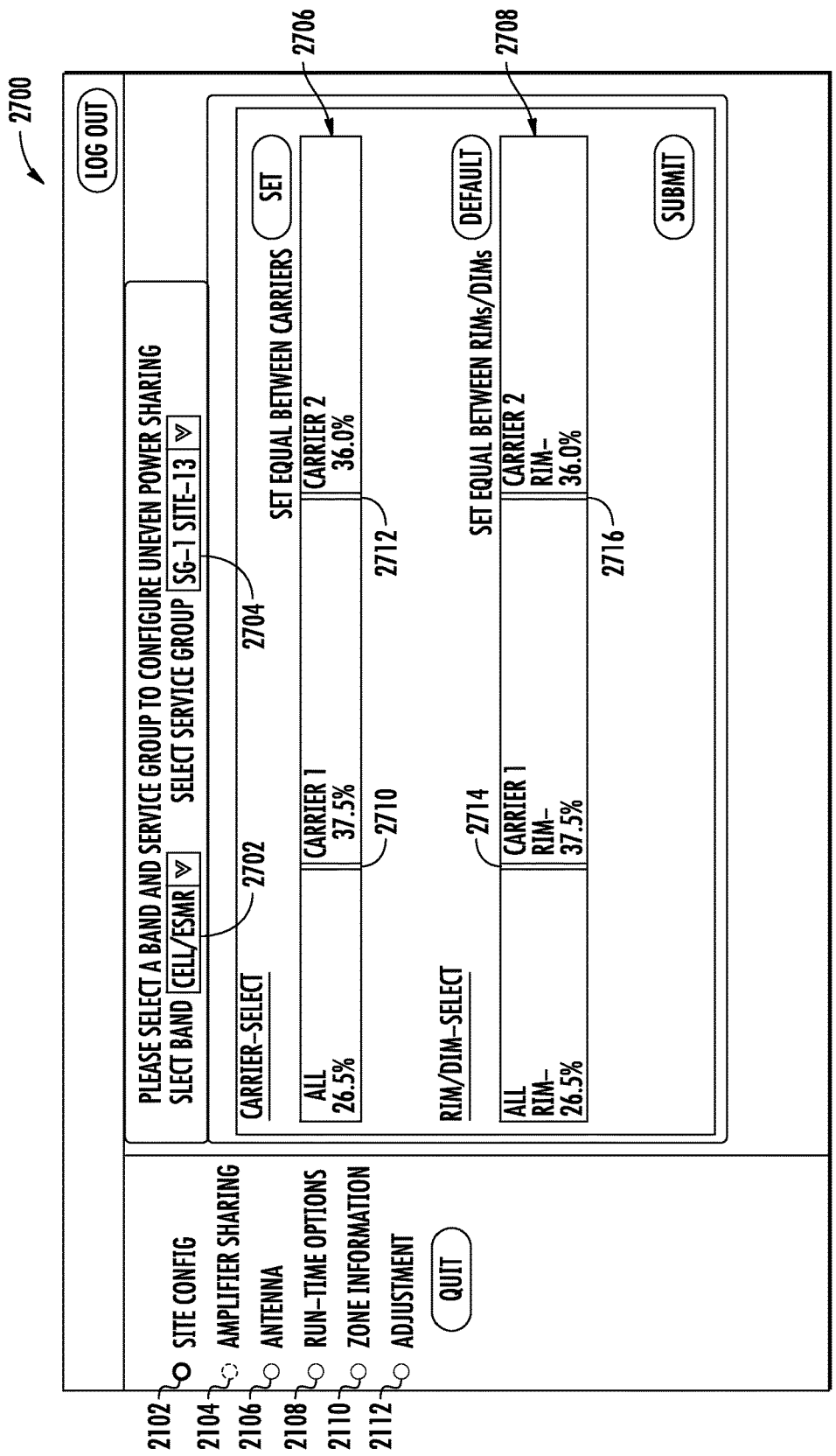
FIG. 27 is an exemplary site configuration page provided by the OEM specific software system of the HEU of the real DAS of FIGS. 2 and 3 illustrating amplifier sharing settings of an amplifier setting phase.

FIG. 27 is an exemplary site configuration page 2700 provided by the OEM specific software system 252 of the HEU 208 of the real DAS 200 of FIGS. 2 and 3 illustrating amplifier sharing settings of an amplifier setting phase. More specifically, the site configuration page 2700 comprises a select band drop down menu 2702 (e.g., CELL/ESMR) and a select service group drop down menu 2704 (e.g., SG-1 SITE-13). The site configuration page 2700 further includes a carrier-select section 2706 and RIM/DIM-select section 2708. The carrier-select section 2706 enables a user to allocate by carrier or group. For example, a carrier-select total amplifier sharing sliding bar 2710 enables a user to adjust the percentage of amplifier sharing (e.g., 26.5%), and a carrier-select amplifier sharing between carriers sliding bar 2712 enables a user to adjust the percentage of amplifier sharing between carriers (e.g., 37.5% for Carrier 1 and 36% for Carrier 2). The RIM/DIM-select section 2708 enables a user to allocate by RIM. For example, a RIM/DIM-select total amplifier sharing sliding bar 2714 enables a user to adjust the percentage of amplifier sharing (e.g., 26.5%), and a RIM/DIM-select amplifier sharing between RIMs/DIMs sliding bar 2716 enables a user to adjust the percentage of amplifier sharing between RIMs/DIMs (e.g., 37.5% for Carrier 1 RIM and 36% for Carrier 2 RIM).

Figure 28:
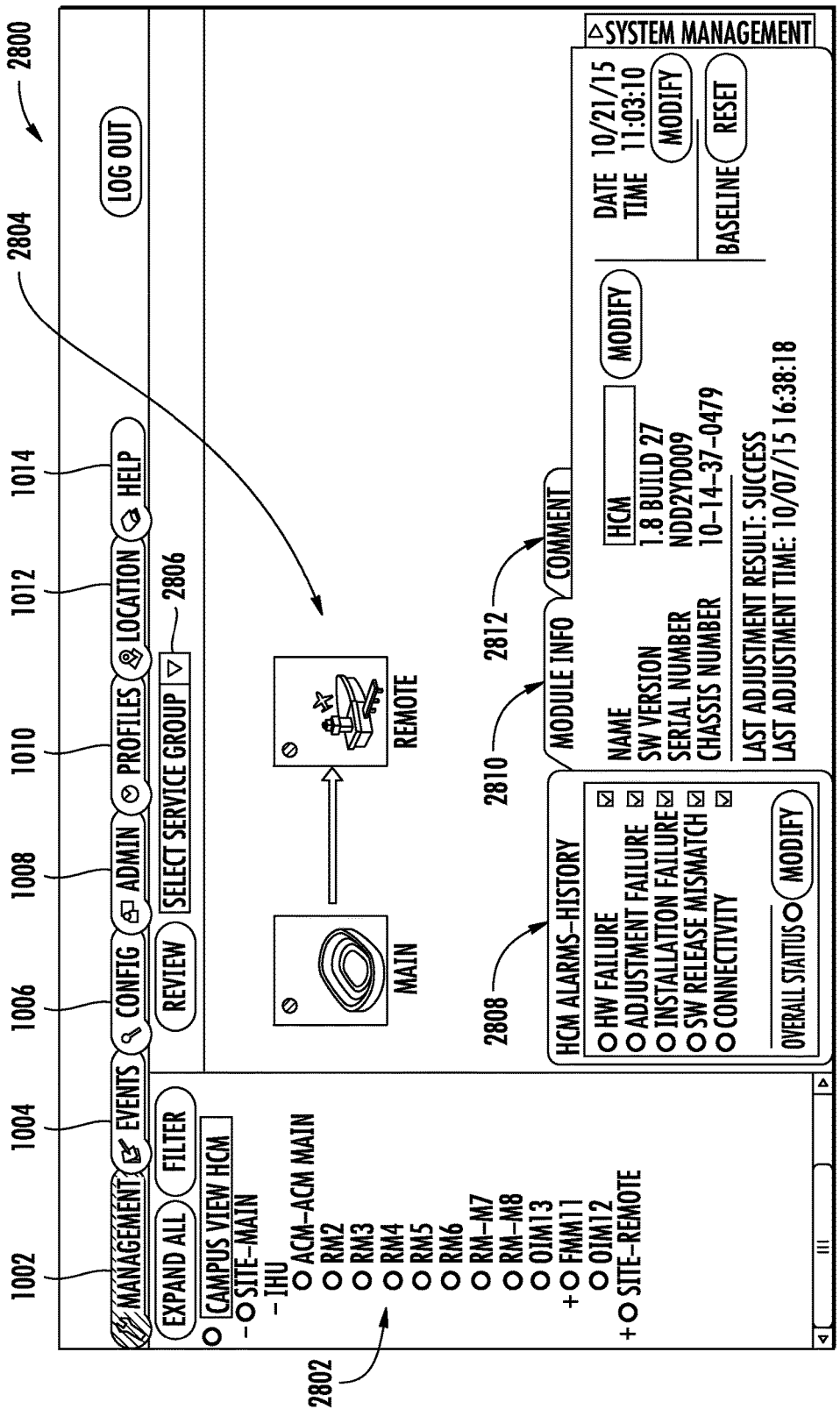
FIG. 28 is an exemplary site management page provided by the OEM specific software system of the HEU of the real DAS of FIGS. 2 and 3 illustrating a campus view for site management.

FIGS. 28-35 are exemplary site management pages provided by the OEM specific software system 252 of the HEU 208 of the real DAS 200 of FIGS. 2 and 3 enabling a user to monitor, manage, and control campuses, connected sites, system elements, etc. More specifically, FIG. 28 is an exemplary site management page 2800 provided by the OEM specific software system 252 of the HEU 208 of the real DAS 200 of FIGS. 2 and 3 illustrating a campus view for site management. The site management page 2800 could be accessible through the management tab 1002.

The site management page 2800 comprises a network topology tree 2802 which hierarchically displays the connected and available system devices and their status. The network topology tree 2802 could include status colors to indicate the status of each detected element (e.g., green represents OK, yellow represents a minor error, red represents a major error, gray represents no communication to a device set in base line, etc.). The DAS elements could comprise head-end units (e.g., HEU, OIU, IHU, etc.) and other elements (e.g., ACMs, RIMs, OIMs, RAUs, etc.) per site. In certain embodiments, the OEM specific software system 252 enables a user to specify the type of site (e.g., airport, high building, stadium, hospital, resident building, mall, campus, parking, hotel, etc.).

The site management page 2800 further comprises a campus view 2804 graphically displaying the sites (e.g., represented by icons indicating the overall status of each). The site management page 2800 further comprises a select service group drop down menu 2806, a device alarms section 2808, and a module info tab 2810, and a comment tab 2812. More specifically, the device alarms section 2808 comprises information corresponding to fault sourcing and provides alarm masking options (e.g., HW failure, adjustment failure, installation failure, SW release mismatch, connectivity, etc.). The module info tab 2810 provides device specific information, such as configurable parameters (e.g., service control, RF parameters) and/or general information (e.g., device name, firmware version, reset option, etc.). The comment tab 2812 enables a user to provide additional comments for a particular component selected.

Figure 29:
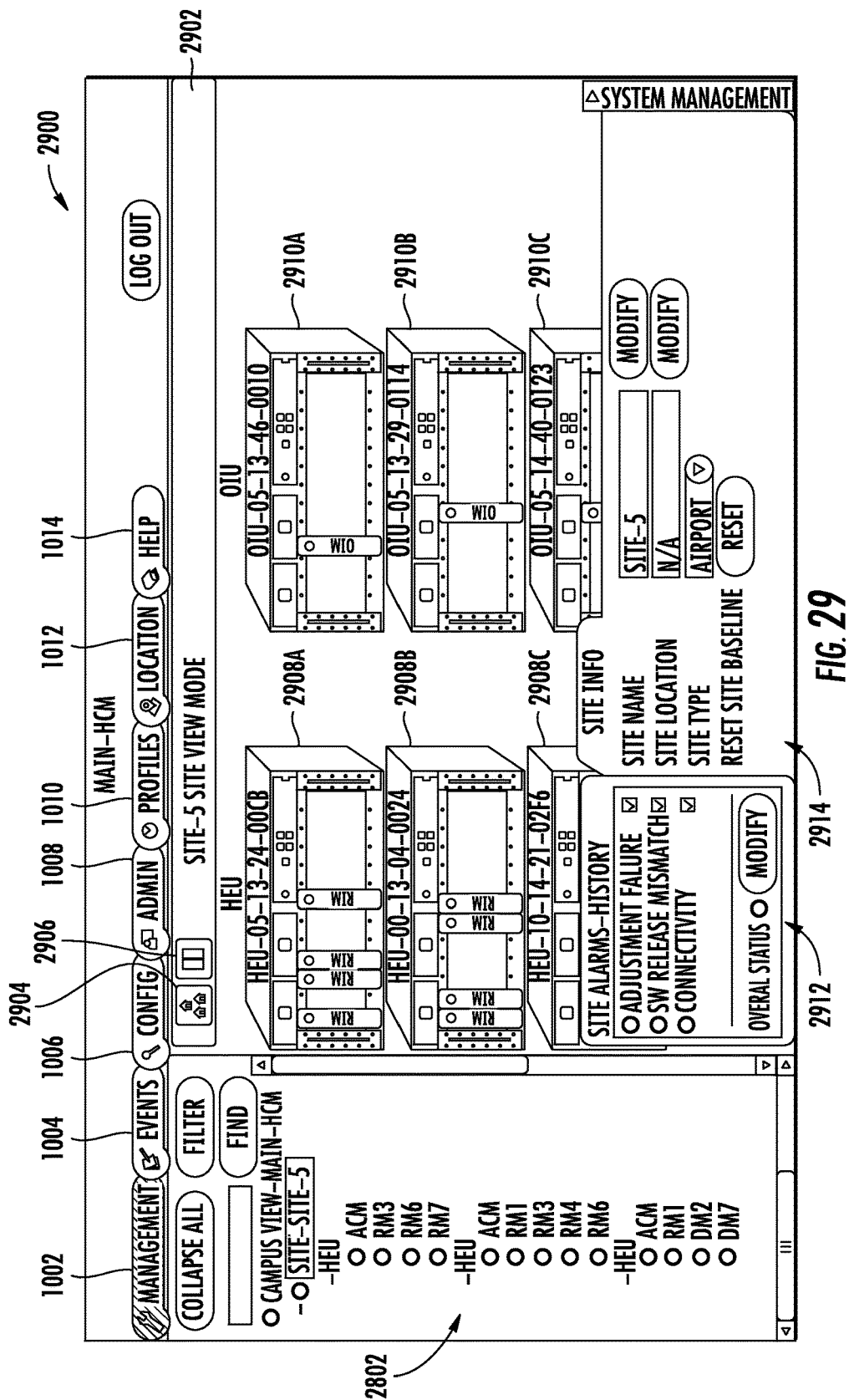
FIG. 29 is an exemplary site management page provided by the OEM specific software system of the HEU of the real DAS of FIGS. 2 and 3 illustrating a site view for site management.

FIG. 29 is an exemplary site management page 2900 provided by the OEM specific software system 252 of the HEU 208 of the real DAS 200 of FIGS. 2 and 3 illustrating a site view for site management. More specifically, the site management page 2900 provides a view mode status bar 2902 indicating view mode information (e.g., Site-5 Site View Mode), as well as a first view button 2904 (e.g., to toggle between campus view and site view) and a second view button 2906 (e.g., to toggle between site view and rack view). More specifically, campus view graphically displays the sites which are represented by icons indicating the overall status of each site. The site view provides visualization of the selected device, with LEDs corresponding to the device status. The rack view provides a graphical display of all head-end elements which reflect the physical head-end rack installation on-site. The order of the chassis could be rearranged to reflect the physical installation of the chassis in the communication rack. The site management page further comprises a site alarm section 2912 providing site alarm information (e.g., adjustment failure, SW release mismatch, connectivity, overall status, etc.) and site info section 2914 providing site information (e.g., site name, site location, site type, etc.).

Figure 30:
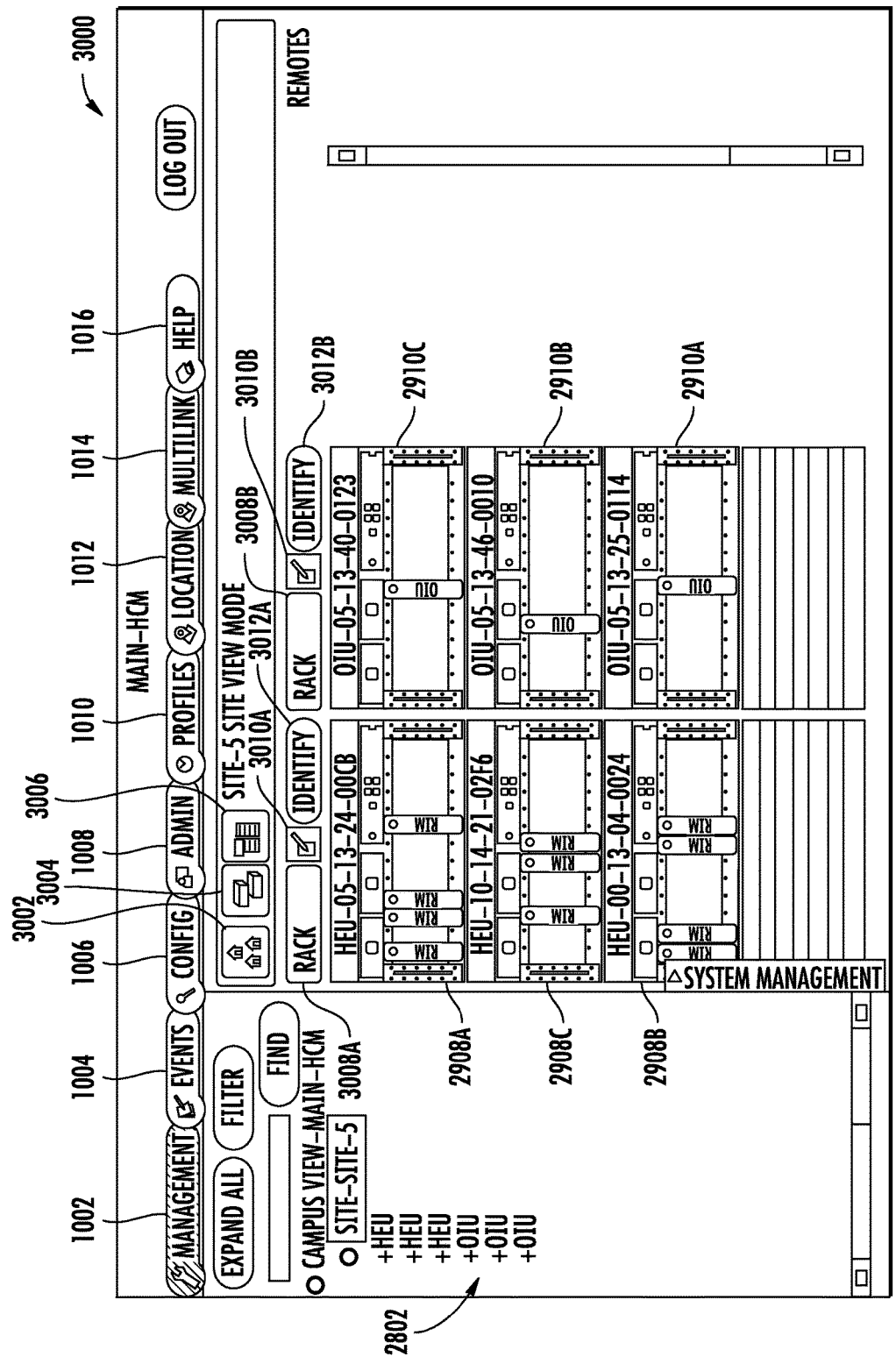
FIG. 30 is an exemplary site management page provided by the OEM specific software system of the HEU of the real DAS of FIGS. 2 and 3 illustrating a rack view for site management.

FIG. 30 is an exemplary site management page 3000 provided by the OEM specific software system 252 of the HEU 208 of the real DAS 200 of FIGS. 2 and 3 illustrating a rack view for site management. As shown, the site management page 3000 provides a rack view including a campus view button 3002, a device view button 3004, and an edit rack button 3006). Further the site management page 3000 comprises a first edit rack name button 3008A to edit HEU rack names, a second edit rack name button 3008B to edit OIU rack names, a first edit rack button 3010A to edit HEU rack parameters, a second edit rack button 3010B to edit OIU rack parameters, a first identify button 3012A to identify all chassis in a HEU rack, and a second identify button 3012B to identify all chassis in an OIU rack. The site management page 3000 enables a user to add racks (e.g., including rack size) and add devices. Further, the rack view allows placeholder views for passive devices (e.g., ICU, Six-channel power amplifier unit (PAU6), fiber management unit (FMU) and custom unit).

Figure 31:
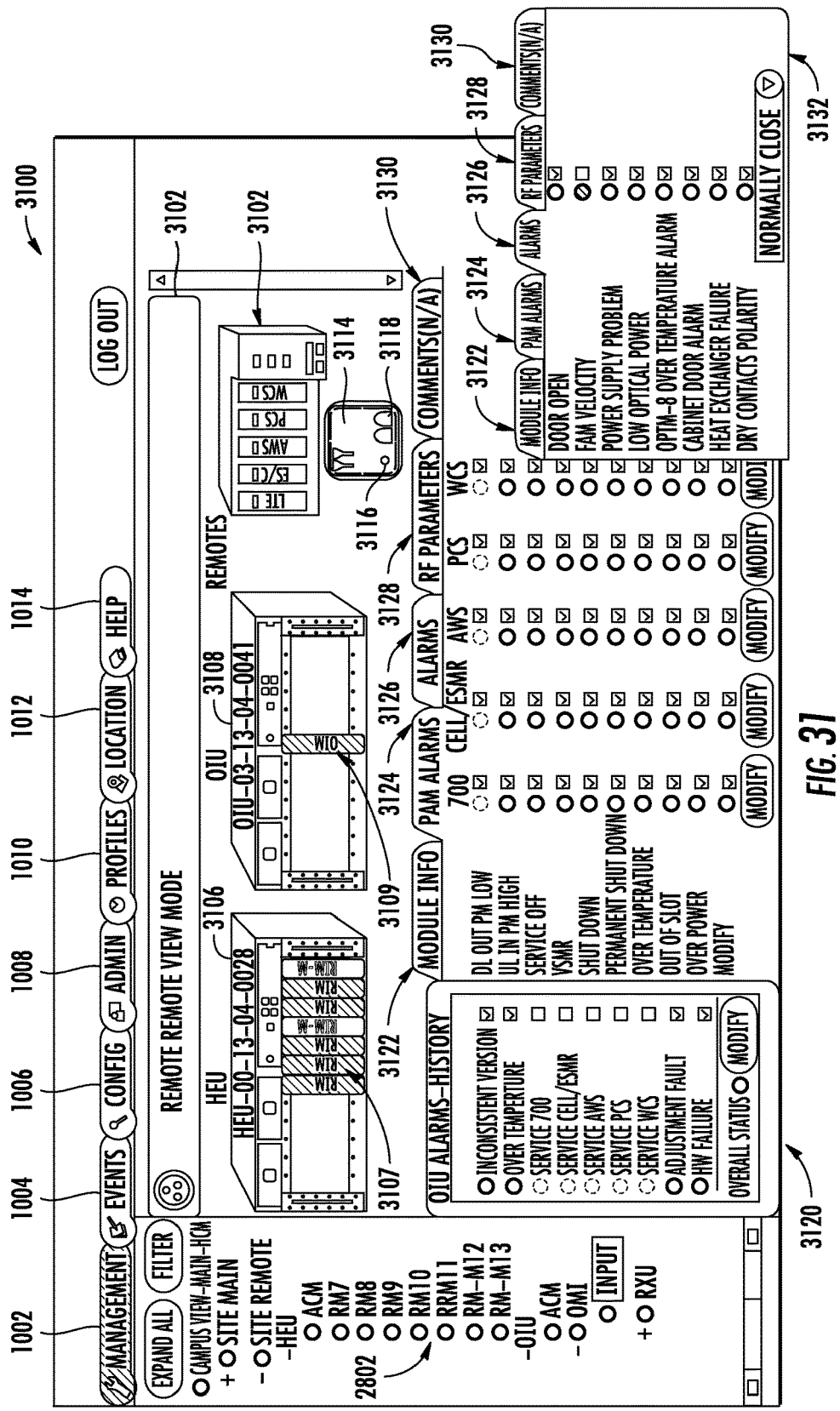
FIG. 31 is an exemplary site management page provided by the OEM specific software system of the HEU of the real DAS of FIGS. 2 and 3 illustrating PAM (priority alarm message) alarms and alarm configurations.

FIG. 31 is an exemplary site management page 3100 provided by the OEM specific software system 252 of the HEU 208 of the real DAS 200 of FIGS. 2 and 3 illustrating PAM alarms and alarm configurations. The site management page 3100 includes a HEU chassis 3106 with a plurality of HEU modules 3107, and an OIU chassis 3108 with a plurality of OIU modules 3109. Further, the site management page 3100 shows an MRU device 3110 and a remote device 3112. The remote device 3112 includes a plurality of icons, including an RxU module icon 3114 (e.g., representing an installed RxU module), a GEM module icon 3118 (e.g., representing an installed GEM module), and/or an overall status LED 3116.

The site management page 3100 includes an alarms history section 3120 (e.g., inconsistent version, over temperature, service 700, service CELL/ESMR, service AWS, service PCS, service WCS, adjustment fault, hw failure, overall status, etc.). The site management page further includes a module info tab 3122 (provides device version and identification definitions), a PAM alarms tab 3124 (displays specific alarms for each supported device), an alarms tab 3126 (displays device alarms, such as module specific alarms for fault sourcing), an RF parameters tab 3128 (includes configurable RF parameters (e.g., RIM gain, RAU output power, etc.) relevant to the selected device, and a comments tab 3130 (for entering additional information relevant to the selected device). The content of the alarms history section 3120, module info tab 3122, PAM alarms tab 3124, alarms tab 3126, RF parameters tab 3128, and comments tab 3130 varies depending on the DAS element selected (e.g., OIU, HEU, RAU, etc.). The alarms ensure that the real DAS is performing as the virtual DAS intended. If a problem is identified, the OEM specific software system identifies the source of the potential problem and guides a user through fixing the problem.

For an HCM module, the OEM specific software system 252 can alert a user (and help troubleshoot) as to the following device alarms: HW failure (indicates HCM faulty hardware), adjustment failure (indicates unsuccessful adjustment procedure), installation failure (indicates faulty physical connection between chassis), SW release mismatch (indicates that a module(s) in the system does not have the defined active release), connectivity (indicates faulty connectivity state in one of the (baseline) system modules), and overall status (indicates overall status of enabled (unmasked) alarms), etc.

For a site, the system can alert a user (and help troubleshoot) as to the following device alarms: adjustment failure (indicates unsuccessful adjustment procedure for a module(s) in the selected site), SW release mismatch (indicates module(s) in the selected site have been detected with mismatched software versions), connectivity (indicates disconnected modules have been detected in the site), and overall status (indicates overall status of enabled (unmasked) alarms), etc.

For an ACM, the OEM specific software system 252 can alert a user (and help troubleshoot) as to the following device alarms: inconsistent version (indicates that the module does not have the defined active release), over temperature (indicates ambient temperature inside the ACM is greater than a predefined threshold temperature (e.g., >75° C.)), HW failure (indicates faulty HW upon initialization or during operation), adjustment fault (indicates unsuccessful adjustment procedure for the selected module), power failure (indicates a power failure or overheating in one or more of the PSM (power supply module)), fan failure (indicates a fault in at least one of the fans in the fan module), Ext1/Ext2 Clock Failed (indicates failure in master reference clock in HEU and/or IHU units), pilot clock failed (indicates failure in reference in the pilot clock in the OIX expander for IHU and/or OIU), and Overall Status (indicates overall status of enabled (unmasked) alarms), etc.

For an ACM, the OEM specific software system 252 can also alert a user (and help troubleshoot) as to the following power alarms: temperature (indicates that the temperature of one or more of the PSM modules is greater than a predefined threshold (e.g., >+70° C.)), output under voltage (indicates that the ACM has detected an input voltage value less than a predefined threshold (e.g., <10.8V DC) from one or more of the PSM modules), and input under voltage (indicates that the ACM has detected an input voltage value below a predefined threshold (e.g., <60V AC) from one or more of the PSM modules), etc.

For a RIM, the OEM specific software system 252 can alert a user (and help troubleshoot) as to the following device alarms: inconsistent versions (indicates that the module does not have the defined active release), DL input power low (indicates that the BTS RF power input to the RIM is below a predefined threshold (e.g., at least 15 dB lower than the configured max expected power)), DL power overload (indicates that the BTS RF power input to the RIM is over a predefined threshold (e.g., at least 3 dB higher than the value measured during the adjustment procedure)), service OFF (indicates that service has been disabled), output power, over temperature (indicates ambient temperature inside the RIM is above a predefined threshold (e.g., >75° C.)), adjustment fault (unsuccessful adjustment procedure for the selected module), HW failure (indicates hardware problem during startup or during normal operation), overall clock alarms (indicates that at least one of the RIM-M clock alarms is set), and overall status (indicates overall status of enabled (unmasked) alarms), etc.

For a RIM, the OEM specific software system 252 can also alert a user (and help troubleshoot) as to the following clock alarms: UL synthesizer unlocked (indicates unlocked state of UL synthesizer), DL synthesizer unlocked (indicates unlocked state of DL synthesizer), and reference clock unlocked (indicates unlocked state of reference clock), etc.

For an OIM, the OEM specific software system 252 can alert a user (and help troubleshoot) as to the following device alarms: inconsistent version (indicates that the module does not have the defined active release), optical power low (indicates optical link power (PDI) is <0 dBm), over temperature (indicates that the ambient temperature in the OIM is over a predefined threshold (e.g., ≥75° C.)), adjustment fault (indicates unsuccessful adjustment procedure for the selected module), HW failure (indicates hardware problem during startup or during normal operation), and overall status (indicates overall status of enabled (unmasked) alarms), etc.

For a FMM/FRM, the OEM specific software system 252 can alert a user (and help troubleshoot) as to the following device alarms: inconsistent version (indicates that the module does not have the defined active release), optical power low (indicates that the optical power is below a predefined threshold (e.g., <−10.5 dBm)) MNG optical power low (indicates that the SFP Rx power is below a predefined threshold (e.g., <−34 dBm)), over temperature (indicates that the ambient temperature in the FMM/FRM is above a predefined threshold (e.g., >75° C.)), adjustment fault (indicates unsuccessful adjustment procedure for the selected module), HW failure (indicates HW problem during startup or during normal operation), and overall status (indicates overall status of enabled (unmasked) alarms), etc.

For a RAU, the OEM specific software system 252 can alert a user (and help troubleshoot) as to the following device alarms: inconsistent version (indicates that the module does not have the defined active release), over temperature (indicates that the ambient temperature in the RAU is above a predefined threshold (e.g., >75° C.)), service (indicates that service (e.g. LTE, CELL, etc.) has been disabled by user), adjustment fault (indicates unsuccessful adjustment procedure for the selected module), HW failure (indicates hardware problem during startup or during normal operation), and overall status (indicates overall status of enabled (unmasked) alarms), etc.

For RAU, the OEM specific software system 252 can also alert a user (and help troubleshoot) as to the following service alarms: DL out pwr low (indicates that the RF signal power is below a predefined threshold (e.g., ≤15 dB below the configured power level), UL in pwr high (indicates that the RF signal power is greater than required maximum expected power), and service off (indicates that service has been disabled by user), etc.

For a RXU, the OEM specific software system 252 can alert a user (and help troubleshoot) as to the following device alarms: inconsistent version (indicates that the module does not have the defined active release), over temperature (indicates that the ambient temperature in the RXU is above a predefined threshold (e.g., ≥75° C.)), Service LTE_MIMO/AWS_MIMO (indicates service disabled by user), adjustment fault (indicates unsuccessful adjustment procedure for the selected module), HW failure (indicates hardware problem during startup or during normal operation), synthesizer clock (indicates unlocked synthesizer clock), and overall status (indicates overall status of enabled (unmasked) alarms), etc.

For a RXU, the OEM specific software system 252 can also alert a user (and help troubleshoot) as to the following service alarms: DL out pwr low (indicates that the RF signal power is below a predefined threshold (e.g., ≤15 dB below the configured power level)), UL in pwr high (indicates that the RF signal power is greater than required maximum expected power), service off (indicates that service has been disabled by user), synthesizer DL (indicates that DL synthesizer state is detected as "unlocked"), and synthesizer UL (indicates that UL synthesizer state is detected as "unlocked"), etc.

For a MRU, the OEM specific software system 252 can alert a user (and help troubleshoot) as to the following MRU alarms: inconsistent version (indicates that the device does not have the defined active release), over temperature (indicates that the ambient temperature in the MRU is above a predetermined threshold (e.g., >65° C.)), service (indicates that service (e.g., 700, CELL, etc.) has been disabled by user), adjustment fault (indicates unsuccessful adjustment procedure for the selected module), HW failure (indicates a hardware component problem (including FAMs) during startup or during normal operation), and overall status (indicates overall status of enabled (unmasked) alarms), etc.

For a MRU, the OEM specific software system 252 can also alert a user as to the following PAM alarms: DL out pwr low (indicates that the RF signal power is less than a predefined threshold (e.g., ≤15 dB below the configured power level)), UL in pwr high (indicates that the RF signal power is greater than expected UL power and cannot be limited due to limiter reaching full capacity), service off (indicates that service has been disabled by user), VSWR (indicates that the PAM has reported a VSWR problem), shut down (indicates power amplifier module shut down), permanent shut down (indicates that 10 shut downs have occurred during the last 100 minutes), over temperature (indicates that the ambient temperature of the power amplifier modules is above a predetermined threshold (e.g., >65° C.)), out of slot (indicates that the PAM has been extracted from the slot), and over power (indicates that PA output power has exceeded maximum threshold (thresholds depends on band)), etc.

For a MRU, the OEM specific software system 252 could also alert a user as to the following additional alarms: door open (indicates that the MRU chassis door is open), fan velocity (indicates that the fan velocity is below the minimum threshold determined by the controller), over temperature when door open (indicates that the door has been open (e.g., for over 5 seconds) and that one of the PA modules is below the shut down limit temperature (e.g., 4° C. below the shut down limit)), power supply problem (indicates detected problem in power supply), low optical power (indicates that the detected optical power is lower than the configured threshold), OPTM-S over temperature alarm, cabinet door alarm (indicates that the door of the outdoor enclosure is open), and heat exchanger failure (indicates failure in the heat exchange unit of the outdoor enclosure), etc.

Figure 32:
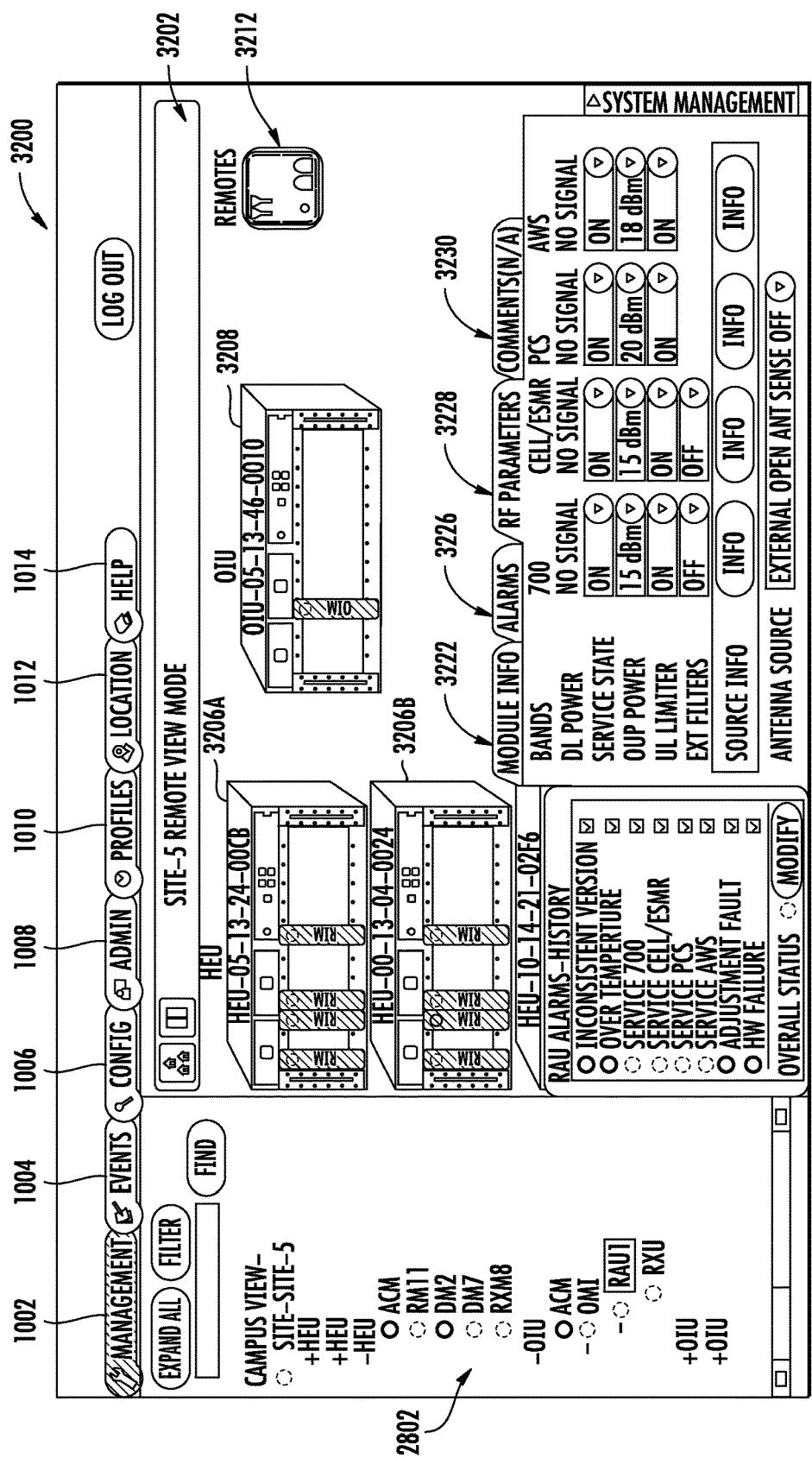
FIG. 32 is an exemplary site management page provided by the OEM specific software system of the HEU of the real DAS of FIGS. 2 and 3 illustrating RF parameter configurations.

FIG. 32 is an exemplary site management page 3200 provided by the OEM specific software system 252 of the HEU 208 of the real DAS 200 of FIGS. 2 and 3 illustrating RF parameter configurations. Similar to the site management page 3100 of FIG. 31, site management page 3200 of FIG. 32 includes an alarms history section 3220, module info tab 3222, alarms tab 3226, RF parameters tab 3228, and comments tab 3230. As mentioned above, a user could configure RF parameters for RIM/RIM-M modules (e.g., max expected power, UL gain mode, UL gain, DL power detector, automatic limit control, service state, temperature, etc.). A user could also configure RF parameters for an OIM module (e.g., DL power state, out power, UL limiter, ext. filters, antenna source). A user could also configure RF parameters for an RXU module (e.g., DL power, state, UL limiter, ext. filter, antenna source, etc.). A user could also configure RF parameters for an MRU (e.g., DL power state, out power, UL limiter, etc.). Each of these RF parameters could be configured for each of one or more bands (e.g., 700, CELL, PCS, AWS, CELL/ESMR, etc.). As also mentioned above, the OEM specific software system 252 electronically enforces upon the RF parameters (virtual DAS setting) OEM design constraints of real setting(s) of equipment in the real DAS 200.

Figure 33:
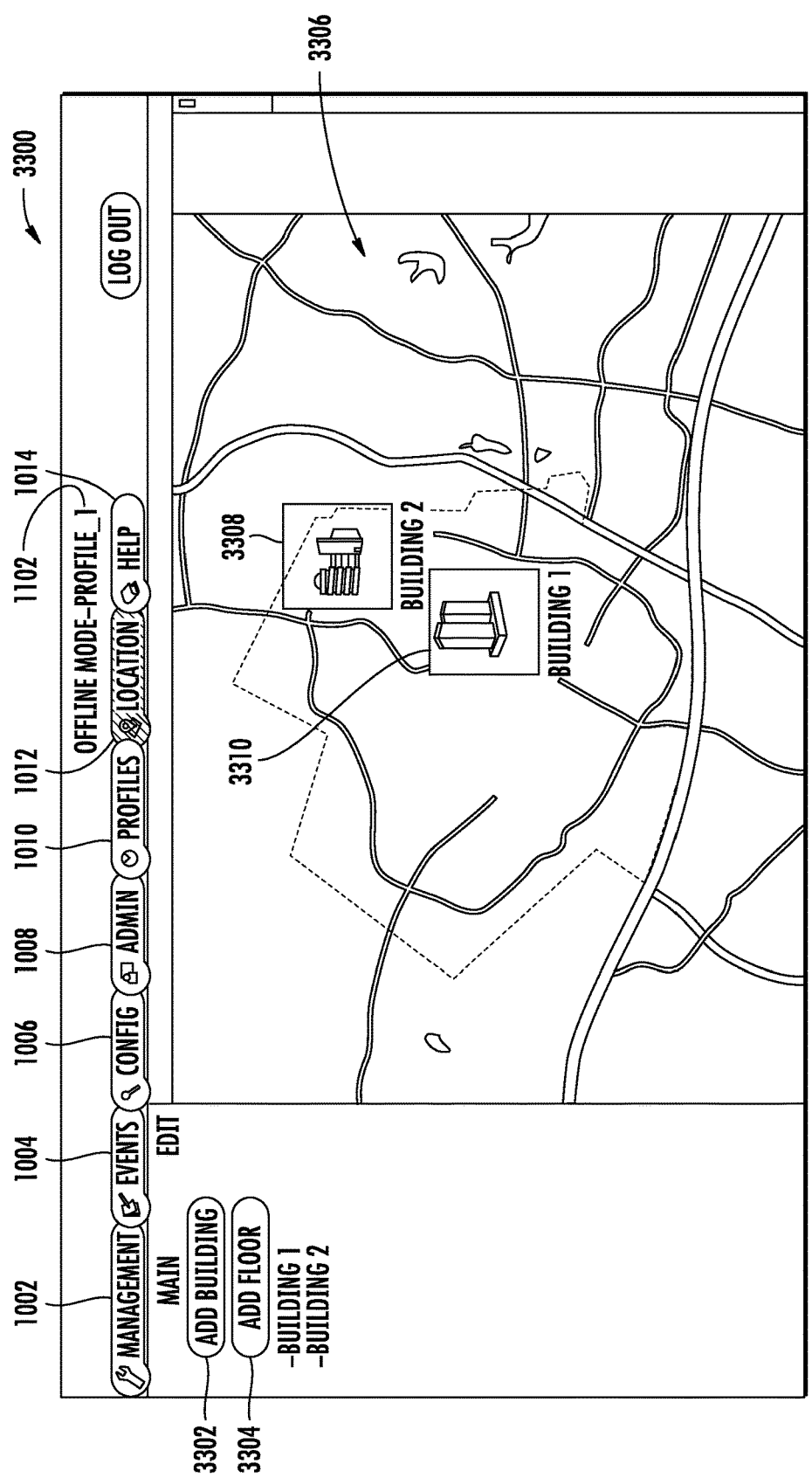
FIG. 33 is an exemplary site management page provided by the OEM specific software system of the HEU of the real DAS of FIGS. 2 and 3 illustrating a location map for displaying geographical location information for configured sites of a virtual DAS.
Figure 34:
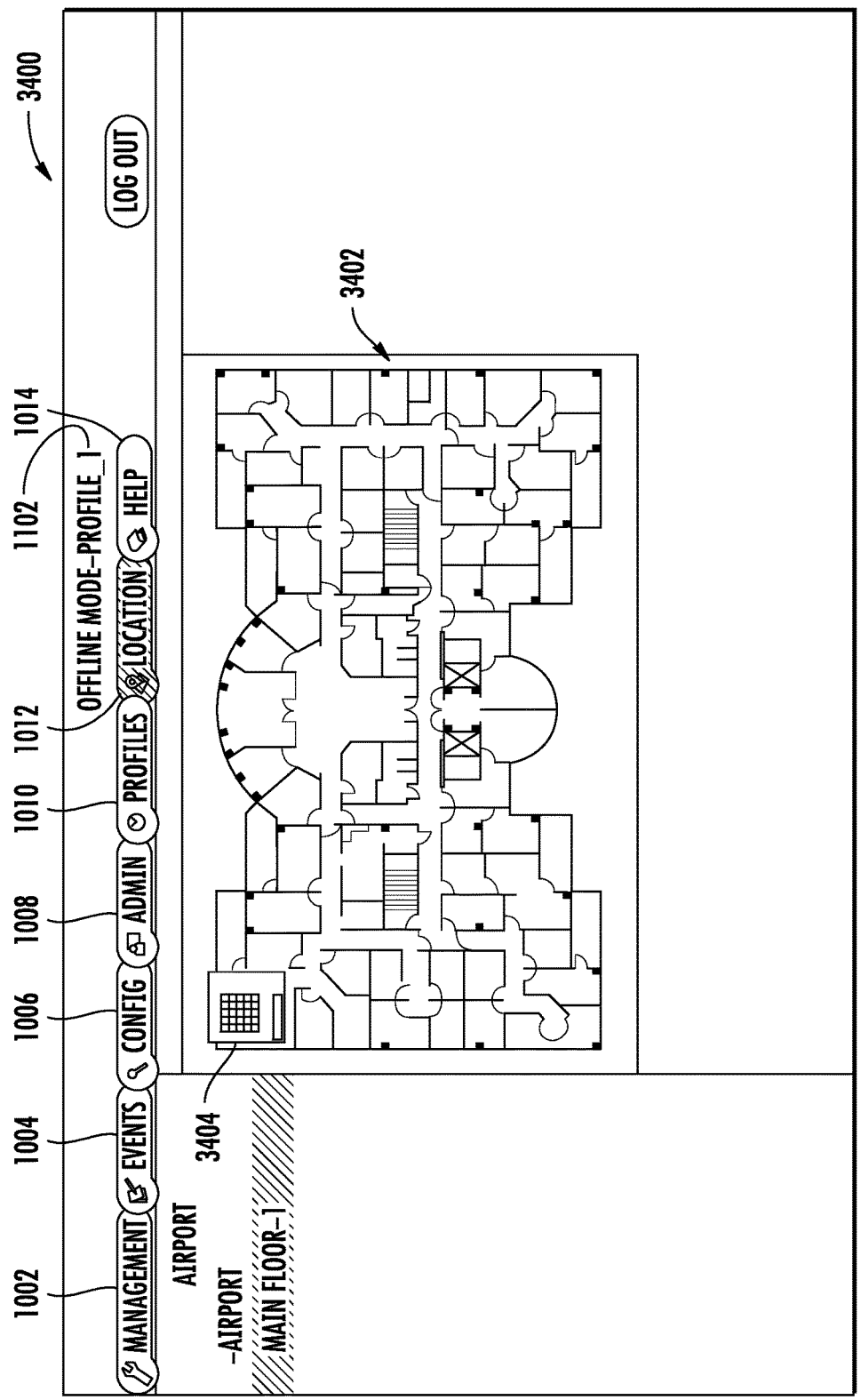
FIG. 34 is an exemplary site management page provided by the OEM specific software system of the HEU of the real DAS of FIGS. 2 and 3 illustrating placement of a remote to a desired location on a floor blueprint of a building for a virtual DAS.
Figure 35:
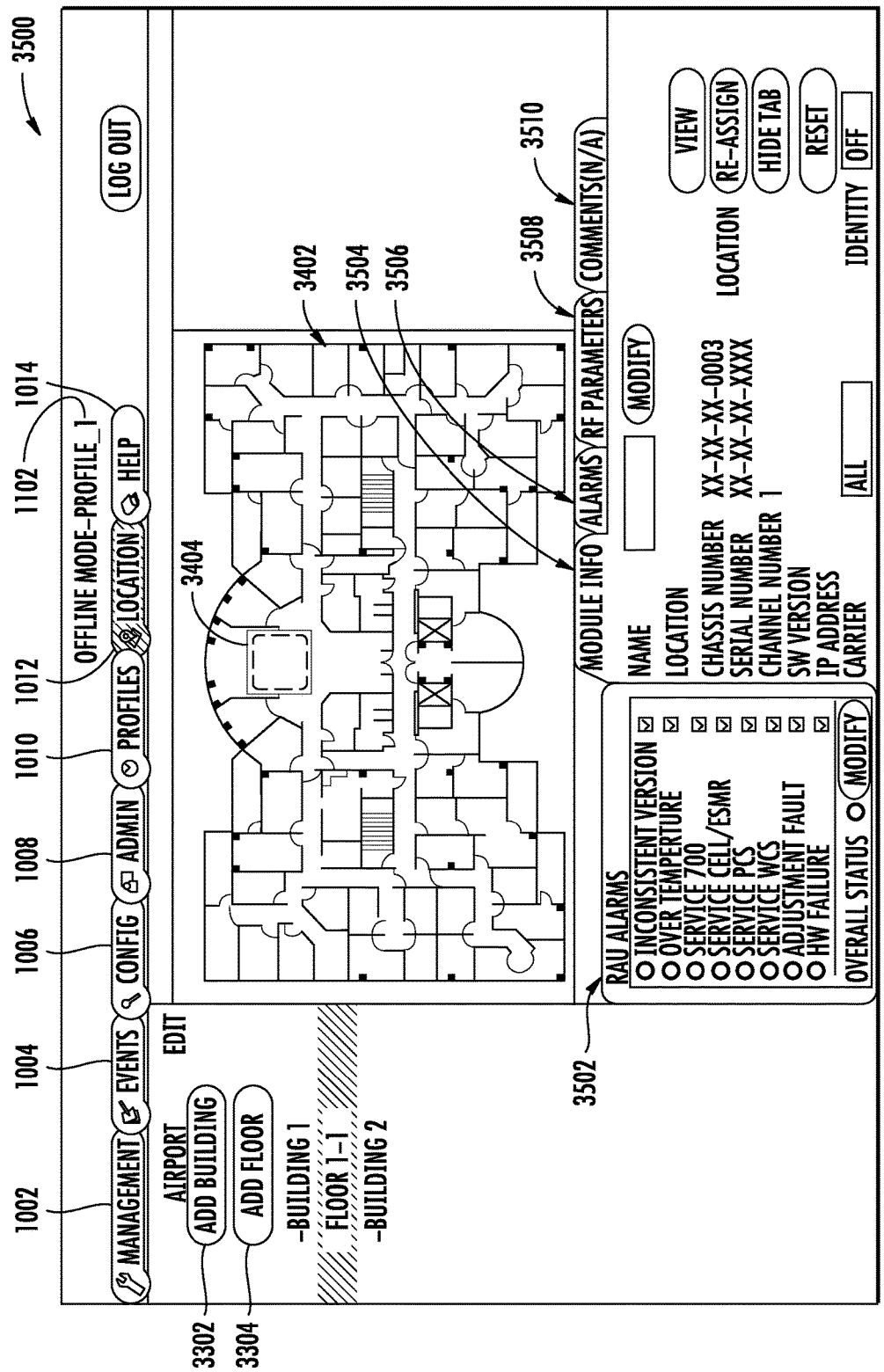
FIG. 35 is an exemplary site management page provided by the OEM specific software system of the HEU of the real DAS of FIGS. 2 and 3 illustrating module information for a selected remote of a virtual DAS.

FIGS. 33-35 are exemplary pages provided by the OEM specific software system 252 of the HEU 208 of the real DAS 200 of FIGS. 2 and 3 illustrating use of location maps. The location maps are used to display geographical location information of configured sites and graphically display their floor plans. Remote units can be assigned to floors of buildings and then placed within the floors to provide a view of the actual layout and coverage of the installed DAS system throughout the different floors.

More specifically, FIG. 33 is an exemplary site management page 3300 provided by the OEM specific software system 252 of the HEU 208 of the real DAS 200 of FIGS. 2 and 3 illustrating a location map for displaying geographical location information for configured sites of a virtual DAS. The site management page 3300 comprises an add building button 3302 and an add floor button 3304. The add building button 3302 adds a building (e.g., first building 3308, second building 3310, etc.) to the location map 3306 for placement therein. The location of the building 3308, 3310 can be moved within the location map 3306 by a user. The add floor button 3304 adds one or more floors to one or more of the buildings 3308, 3310. The location map can be imported into the OEM specific software system 252 (e.g., from a third party platform or locally from a user's computer, etc.).

FIG. 34 is an exemplary site management page 3400 provided by the OEM specific software system 252 of the HEU 208 of the real DAS 200 of FIGS. 2 and 3 illustrating placement of a remote 3404 to a desired location on a floor blueprint 3402 of a building for a virtual DAS. The OEM specific software system 252 enables a user to assign a remote to, and place the remote within, a floor plan of a building. The remote can then be placed anywhere on the floorplan (see FIG. 38), such as by dragging and dropping.

FIG. 35 is an exemplary view of a site management page 3500 provided by the OEM specific software system 252 of the HEU 208 of the real DAS 200 of FIGS. 2 and 3 illustrating module information for a selected remote of a virtual DAS. By clicking on the remote within the floor plan, the site management page displays remote information, such as RAU alarm history 3502, module information in the module info tab 3504, alarms information in the alarm tab 3506, RF parameter information in the RF tab 3508, and/or comments in the comment tab 3510.

Figure 36:
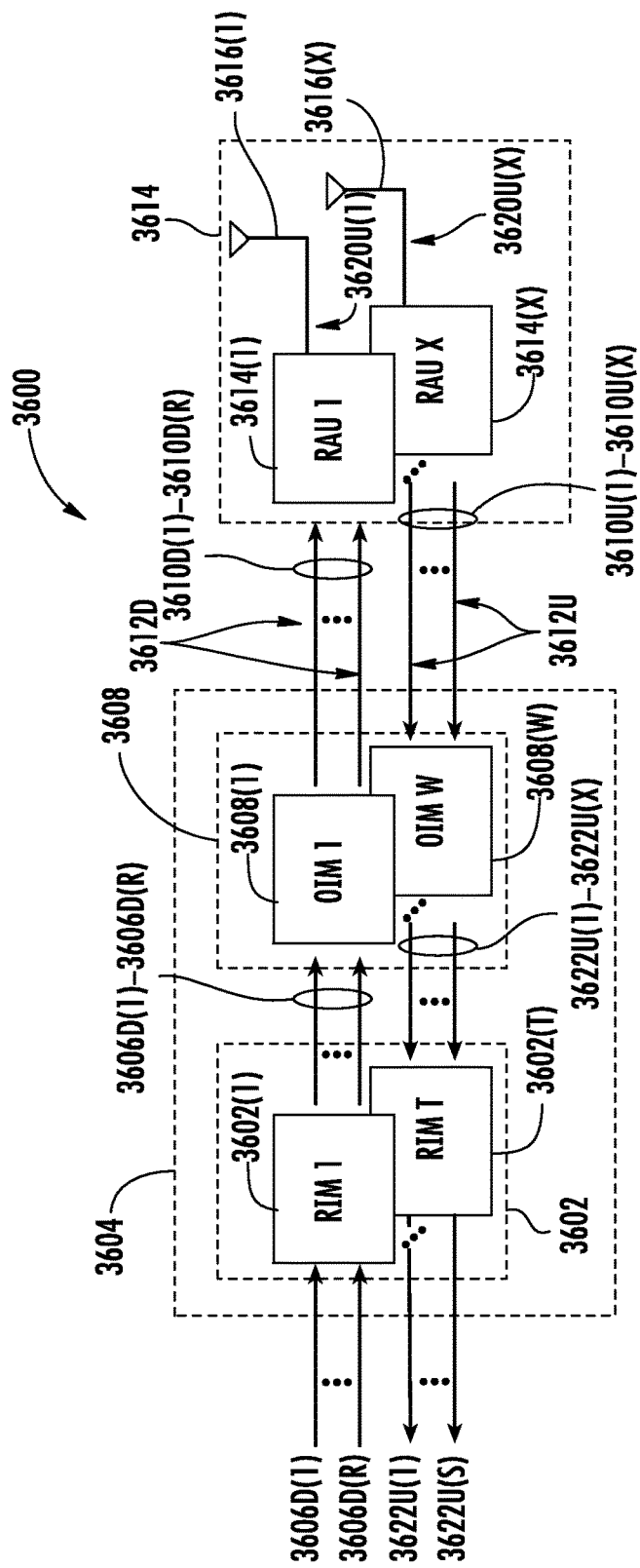
FIG. 36 is a schematic diagram of an exemplary WDCS provided in the form of an optical fiber-based DAS.

FIG. 36 is a schematic diagram of an exemplary WDCS provided in the form of an exemplary optical fiber-based DAS 3600. The DAS 3600 in this example is an optical fiber-based DAS. The DAS 3600 in this example is comprised of three (3) main components. One or more radio interfaces provided in the form of radio interface modules (RIMs) 3602(1)-3602(T) are provided in a central unit 3604 to receive and process downlink electrical communications signals 3606D(1)-3606D(S) prior to optical conversion into downlink optical communications signals. The downlink electrical communications signals 3606D(1)-3606D(S) may be received from a base station (not shown) as an example. The RIMs 3602(1)-3602(T) provide both downlink and uplink interfaces for signal processing. The notations "1-S" and "1-T" indicate that any number of the referenced component, 1-S and 1-T, respectively, may be provided.

With continuing reference to FIG. 36, the central unit 3604 is configured to accept the plurality of RIMs 3602(1)-3602(T) as modular components that can easily be installed and removed or replaced in the central unit 3604. In one embodiment, the central unit 3604 is configured to support up to twelve (12) RIMs 3602(1)-3602(12). Each RIM 3602(1)-3602(T) can be designed to support a particular type of radio source or range of radio sources (i.e., frequencies) to provide flexibility in configuring the central unit 3604 and the DAS 3600 to support the desired radio sources. For example, one RIM 3602 may be configured to support the Personal Communication Services (PCS) radio band. Another RIM 3602 may be configured to support the 700 MHz radio band. In this example, by inclusion of these RIMs 3602, the central unit 3604 could be configured to support and distribute RF communications signals, including those for the communications services and communications bands described above as examples.

The RIMs 3602(1)-3602(T) may be provided in the central unit 3604 that support any frequencies desired, including but not limited to licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 36, the downlink electrical communications signals 3606D(1)-3606D(S) may be provided as downlink electrical spectrum chunks to a plurality of optical interfaces provided in the form of optical interface modules (OIMs) 3608(1)-3608(W) in this embodiment to convert the unlicensed and/or licensed downlink electrical communications signals 3606D(1)-3606D(S) ("downlink electrical communications signals 3606D(1)-3606D(S)") into downlink optical spectrum chunks 3610D(1)-3610D(S). The notation "1-W" indicates that any number of the referenced component 1-W may be provided. The OIMs 3608 may be configured to provide one or more optical interface components (OICs) that contain optical-to-electrical (O-E) and electrical-to-optical (E-O) converters, as will be described in more detail below. The OIMs 3608 support the radio bands that can be provided by the RIMs 3602, including the examples previously described above.

The OIMs 3608(1)-3608(W) each include E-O converters to convert the downlink electrical communications signals 3606D(1)-3606D(S) into the downlink optical spectrum chunks 3610D(1)-3610D(S). The downlink optical spectrum chunks 3610D(1)-3610D(S) are communicated over downlink optical fiber communications medium 3612D to a plurality of remote units provided in the form of RAUs 3614(1)-3614(X). The notation "1-X" indicates that any number of the referenced component 1-X may be provided. O-E converters provided in the RAUs 3614(1)-3614(X) convert the downlink optical spectrum chunks 3610D(1)-3610D(S) back into the downlink electrical communications signals 3606D(1)-3606D(S), which are provided to antennas 3616(1)-3616(X) in the RAUs 3614(1)-3614(X) to user equipment (not shown) in the reception range of the antennas 3616(1)-3616(X).

E-O converters are also provided in the RAUs 3614(1)-3614(X) to convert uplink electrical communications signals 3620U(1)-3620U(X) received from user equipment (not shown) through the antennas 3616(1)-3616(X) into uplink optical spectrum chunks 3610U(1)-3610U(X). The RAUs 3614(1)-3614(X) communicate the uplink optical spectrum chunks 3610U(1)-3610U(X) over an uplink optical fiber communications medium 3612U to the OIMs 3608(1)-3608(W) in the central unit 3604. The OIMs 3608(1)-3608(W) include O-E converters that convert the received uplink optical spectrum chunks 3610U(1)-3610U(X) into uplink electrical communications signals 3622U(1)-3622U(X), which are processed by the RIMs 3602(1)-3602(T) and provided as uplink electrical communications signals 3622U(1)-3622U(X). The central unit 3604 may provide the uplink electrical communications signals 3622U(1)-3622U(X) to a source transceiver such as a base station or other communications system.

Note that the downlink optical fiber communications medium 3612D and uplink optical fiber communications medium 3612U connected to each RAU 3614(1)-3614(X) may be a common optical fiber communications medium, wherein for example, wave division multiplexing (WDM) may be employed to provide the downlink optical spectrum chunks 3610D(1)-3610D(S) and the uplink optical spectrum chunks 3610U(1)-3610U(X) on the same optical fiber communications medium.

Figure 37:
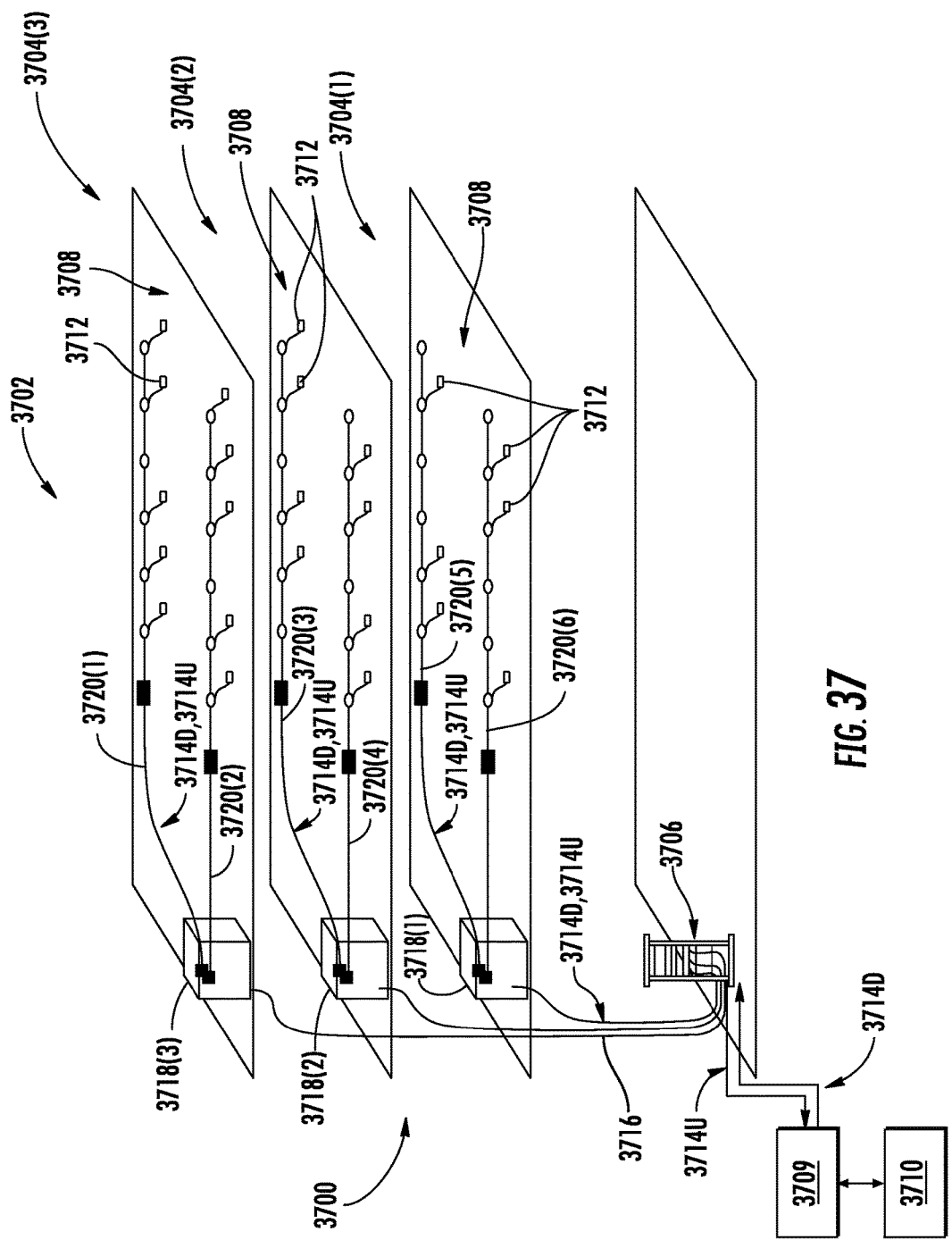
FIG. 37 is a partially schematic cut-away diagram of an exemplary building infrastructure in which a WDCS can be provided.

FIG. 37 is a partially schematic cut-away diagram of an exemplary indoor environment (e.g., building infrastructure) in which a WDCS can be provided. In this regard, FIG. 37 is a partially schematic cut-away diagram of a building infrastructure 3700 employing a WDCS 3702 employing a programmable digital signal processing circuit for scaling supported communications services. The building infrastructure 3700 in this embodiment includes a first (ground) floor 3704(1), a second floor 3704(2), and a third floor 3704(3). The floors 3704(1)-3704(3) are serviced by the central unit 3706 to provide the antenna coverage areas 3708 in the building infrastructure 3700. The central unit 3706 is communicatively coupled to a base station 3709 to receive downlink communications signals 3714D from the base station 3709. The base station 3709 may be coupled to an operational and support system (OSS) 3710 to receive data about the performance of RAUs 3712 in the WDCS 3702 on a per remote unit basis for determining WDCS optimizations. The central unit 3706 is communicatively coupled to the RAUs 3712 to receive uplink communications signals 3714U from the RAUs 3712, similar to as previously discussed above for other WDCSs. The central unit 3706 may be configured to employ spectrum chunk construction for construction of spectrum chunks from individually received communications channels for distribution to RAUs 3712. The downlink and uplink communications signals 3714D, 3714U communicated between the central unit 3706 and the RAUs 3712 are carried over a riser cable 3716 in this example. The riser cable 3716 may be routed through interconnect units (ICUs) 3718(1)-3718(3) dedicated to each floor 3704(1)-3704(3) that route the downlink and uplink communications signals 3714D, 3714U to the RAUs 3712 and also provide power to the RAUs 3712 via array cables 3720(1)-3720(6).

Figure 38:
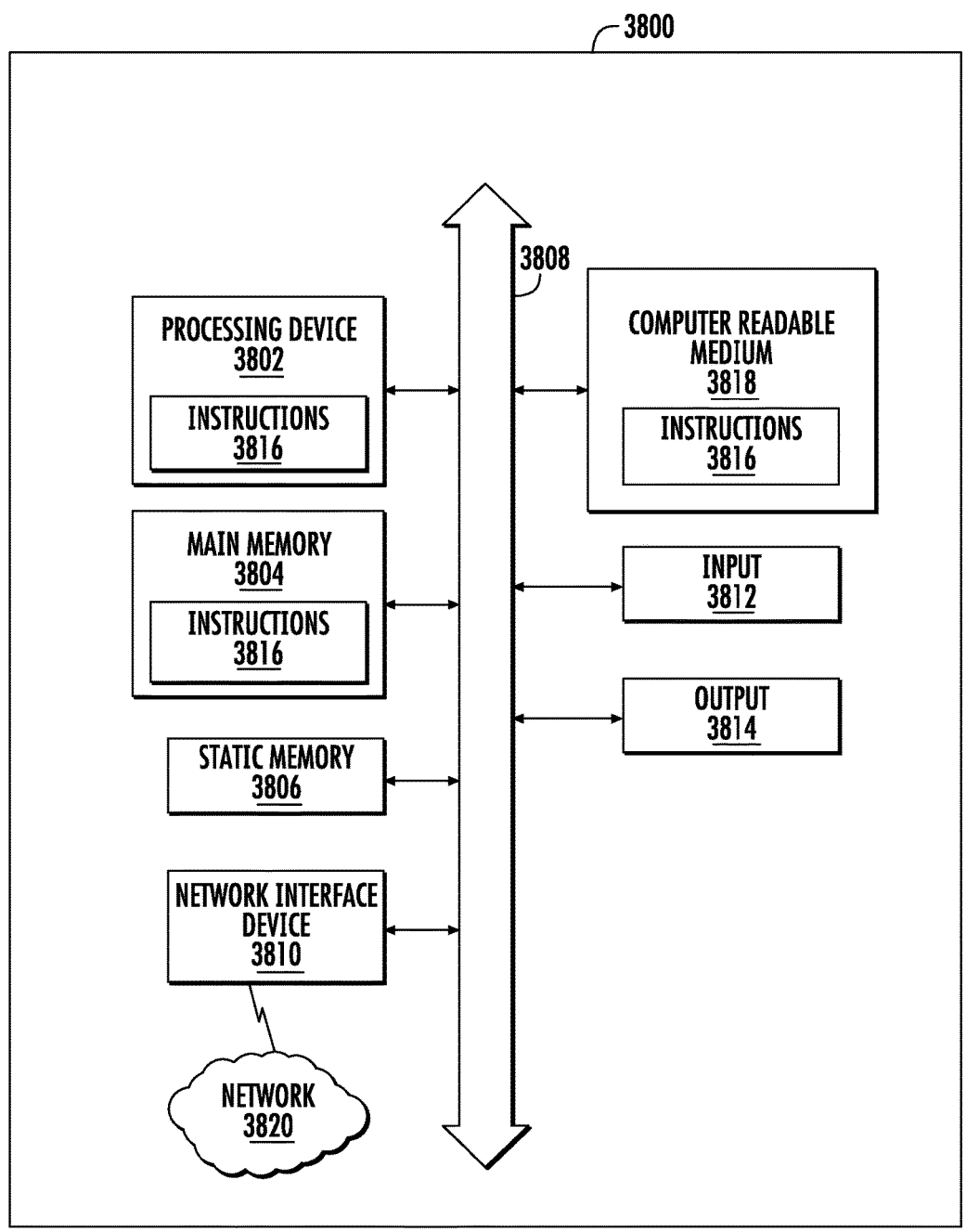
FIG. 38 is a schematic diagram of a generalized representation of an exemplary computer system that can be included in any component in a WDCS and/or DAS.

FIG. 38 is a schematic diagram of a generalized representation of an exemplary computer system 3800 that can be included in any component in a WDCS and/or DAS. In this regard, the computer system 3800 is adapted to execute instructions from an exemplary computer-readable medium to perform these and/or any of the functions or processing described herein.

In this regard, the computer system 3800 in FIG. 38 may include a set of instructions that may be executed to program and configure programmable digital signal processing circuits in a WDCS for supporting scaling of supported communications services. The computer system 3800 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 3800 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 3800 in this embodiment includes a processing device or processor 3802, a main memory 3804 (e.g., read-only memory (ROM), flash memory, dynamic random access memory (DRAM), such as synchronous DRAM (SDRAM), etc.), and a static memory 3806 (e.g., flash memory, static random access memory (SRAM), etc.), which may communicate with each other via a data bus 3808. Alternatively, the processor 3802 may be connected to the main memory 3804 and/or static memory 3806 directly or via some other connectivity means. The processor 3802 may be a controller, and the main memory 3804 or static memory 3806 may be any type of memory.

The processor 3802 represents one or more general-purpose processing devices, such as a microprocessor, central processing unit, or the like. More particularly, the processor 3802 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 3802 is configured to execute processing logic in instructions for performing the operations and steps discussed herein.

The computer system 3800 may further include a network interface device 3810. The computer system 3800 also may or may not include an input 3812, configured to receive input and selections to be communicated to the computer system 3800 when executing instructions. The computer system 3800 also may or may not include an output 3814, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 3800 may or may not include a data storage device that includes instructions 3816 stored in a computer-readable medium 3818. The instructions 3816 may also reside, completely or at least partially, within the main memory 3804 and/or within the processor 3802 during execution thereof by the computer system 3800, the main memory 3804 and the processor 3802 also constituting computer-readable medium. The instructions 3816 may further be transmitted or received over a network 3820 via the network interface device 3810.

While the computer-readable medium 3818 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A non-transitory computer readable medium comprising program instructions for implementing a live wireless communication system configuration from a virtual wireless communication system design using a software system in a real wireless communication system, the program instructions, when executed, comprising:
    configuring, by a software system in a real wireless communication system, at least one virtual wireless communication system setting for a virtual wireless communication system, wherein configuring the at least one virtual wireless communication system setting comprises creating the at least one virtual wireless communication system setting;
    enforcing, by the software system, upon the at least one virtual wireless communication system setting OEM design constraints of at least one real setting of signal distribution equipment in the real wireless communication system;
    generating, by the software system, at least one virtual wireless communication system configuration file comprising the at least one virtual wireless communication system setting for the virtual wireless communication system;
    storing, by the software system, the at least one virtual wireless communication system configuration file in memory at the real wireless communication system; and
    modifying, by the software system, the at least one real setting of the signal distribution equipment in the real wireless communication system based on the at least one virtual wireless communication system setting in the at least one virtual wireless communication system configuration file.

2. The non-transitory computer readable medium of claim 1, wherein configuring, by the software system in the real wireless communication system, the at least one virtual wireless communication system setting for the virtual wireless communication system comprises importing the at least one virtual wireless communication system setting for the virtual wireless communication system.

3. The non-transitory computer readable medium of claim 2, wherein configuring, by the software system in the real wireless communication system, the at least one virtual wireless communication system setting for the virtual wireless communication system comprises modifying the at least one virtual wireless communication system setting for the virtual wireless communication system.

4. The non-transitory computer readable medium of claim 1, wherein the at least one real setting of the signal distribution equipment in the real wireless communication system comprises at least one of an RF path configuration, power amplifier setting, attenuator setting, and RF input power setting.

5. The non-transitory computer readable medium of claim 1, wherein the at least one virtual wireless communication system setting comprises a virtual wireless communication system placeholder setting of a virtual placeholder component and a virtual wireless communication system existing setting of a virtual existing component.

6. The non-transitory computer readable medium of claim 5, wherein the at least one real setting of the signal distribution equipment in the real wireless communication system comprises at least one real existing setting of real existing equipment and at least one real placeholder setting of real placeholder equipment.

7. The non-transitory computer readable medium of claim 6, wherein modifying, by the software system, the at least one real setting of the signal distribution equipment in the real wireless communication system based on the at least one virtual wireless communication system setting in the at least one virtual wireless communication system configuration file comprises:

modifying, by the software system, the at least one real existing setting of the real existing equipment electronically connected to the real wireless communication system when the virtual wireless communication system is activated based on the virtual wireless communication system existing setting of the virtual existing component in the at least one virtual wireless communication system configuration file.

8. The non-transitory computer readable medium of claim 7, wherein modifying, by the software system, the at least one real setting of the signal distribution equipment in the real wireless communication system based on the at least one virtual wireless communication system setting in the at least one virtual wireless communication system configuration file further comprises:

modifying, by the software system, at least one real placeholder setting of real placeholder equipment based on the virtual wireless communication system placeholder setting of the virtual placeholder component in the at least one virtual wireless communication system configuration file when the real placeholder equipment is electronically connected to the real wireless communication system after the virtual wireless communication system is activated.

9. The non-transitory computer readable medium of claim 1, further comprising guiding, by the software system, a user through setup of the signal distribution equipment in the real wireless communication system for execution of the virtual wireless communication system in the real wireless communication system.

10. The non-transitory computer readable medium of claim 9, wherein the setup of the signal distribution equipment comprises at least one of placement of real components in a signal distribution equipment rack, placement of signal distribution equipment modules within a real chassis, connections between the signal distribution equipment, and geographic placement of the signal distribution equipment for execution of the virtual wireless communication system in the real wireless communication system.

11. The non-transitory computer readable medium of claim 10, further comprising alerting, by the software system, the user if the signal distribution equipment is improperly set up.

12. The non-transitory computer readable medium of claim 10, further comprising alerting, by the software system, the user if the signal distribution equipment is properly set up.

13. The non-transitory computer readable medium of claim 1, wherein the wireless communication system comprises a plurality of remote units coupled to an optical cable infrastructure.

14. A method for implementing a live wireless communication system configuration from a virtual wireless communication system design using a software system in a real wireless communication system comprising at least one remote unit, comprising:

configuring, by an software system in a real wireless communication system, at least one virtual wireless communication system setting for a virtual wireless communication system, wherein configuring the at least one virtual wireless communication setting comprises modifying the at least one virtual wireless communication setting;

enforcing, by the software system, upon the at least one virtual wireless communication system setting OEM design constraints of at least one real setting of signal distribution equipment in the real wireless communication system;

generating, by the software system, at least one virtual wireless communication system configuration file comprising the at least one virtual wireless communication system setting for the virtual wireless communication system;

storing, by the software system, the at least one virtual wireless communication system configuration file in memory at the real wireless communication system; and modifying, by the software system, the at least one real setting of the signal distribution equipment in the real wireless communication system based on the at least one virtual wireless communication system setting in the at least one virtual wireless communication system configuration file, wherein configuring, by the software system in the real wireless communication system, the at least one virtual wireless communication system setting for the virtual wireless communication system comprises importing the at least one virtual wireless communication system setting for the virtual wireless communication system.

15. The method of claim 14, wherein the wireless communication system comprises a plurality of remote units each coupled to an optical cable infrastructure.

16. A method for implementing a live wireless communication system configuration from a virtual wireless communication system design using a software system in a real wireless communication system comprising at least one remote unit, comprising:

configuring, by an software system in a real wireless communication system, at least one virtual wireless communication system setting for a virtual wireless communication system;

enforcing, by the software system, upon the at least one virtual wireless communication system setting OEM design constraints of at least one real setting of signal distribution equipment in the real wireless communication system;

generating, by the software system, at least one virtual wireless communication system configuration file comprising the at least one virtual wireless communication system setting for the virtual wireless communication system;

storing, by the software system, the at least one virtual wireless communication system configuration file in memory at the real wireless communication system;

modifying, by the software system, the at least one real setting of the signal distribution equipment in the real wireless communication system based on the at least one virtual wireless communication system setting in the at least one virtual wireless communication system configuration file, wherein the at least one real setting of the signal distribution equipment in the real wireless communication system comprises at least one of an RF path configuration, power amplifier setting, attenuator setting, and RF input power setting; and guiding, by the software system, a user through setup of the signal distribution equipment in the real wireless communication system for execution of the virtual wireless communication system in the real wireless communication system.

17. The method of claim 16, further comprising alerting, by the software system, the user if the signal distribution equipment is improperly set up.

18. The method of claim 16, wherein the wireless communication system comprises a plurality of remote units coupled to an optical cable infrastructure.

* * * * *